United States Patent
Watanabe et al.

(10) Patent No.: US 12,511,323 B2
(45) Date of Patent: Dec. 30, 2025

(54) COMMUNICATION SYSTEM, TERMINAL APPARATUS, AND INFORMATION PROCESSING SYSTEM

(71) Applicants: Eri Watanabe, Shizuoka (JP); Yuki Hori, Aichi (JP); Yuuki Suzuki, Kanagawa (JP); Hiroaki Tanaka, Tokyo (JP); Terunori Koyama, Tokyo (JP); Takuroh Naitoh, Tokyo (JP)

(72) Inventors: Eri Watanabe, Shizuoka (JP); Yuki Hori, Aichi (JP); Yuuki Suzuki, Kanagawa (JP); Hiroaki Tanaka, Tokyo (JP); Terunori Koyama, Tokyo (JP); Takuroh Naitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/608,165

(22) Filed: Mar. 18, 2024

(65) Prior Publication Data

US 2024/0320250 A1    Sep. 26, 2024

(30) Foreign Application Priority Data

Mar. 23, 2023  (JP) ................. 2023-046427

(51) Int. Cl.
| | | |
|---|---|---|
| *G06F 16/00* | (2019.01) | |
| *G06F 3/0482* | (2013.01) | |
| *G06F 16/335* | (2019.01) | |
| *G10L 15/07* | (2013.01) | |
| *G10L 15/26* | (2006.01) | |

(52) U.S. Cl.
CPC .......... *G06F 16/335* (2019.01); *G06F 3/0482* (2013.01); *G10L 15/07* (2013.01); *G10L 15/26* (2013.01)

(58) Field of Classification Search
CPC ............................. G06F 16/335; G06F 3/0482
See application file for complete search history.

(56) References Cited

U.S. PATENT DOCUMENTS

| | | | | |
|---|---|---|---|---|
| 9,430,447 | B1 * | 8/2016 | Paglia | ................. G06F 40/295 |
| 9,501,519 | B1 * | 11/2016 | Joinson | ................. G06F 3/04817 |
| 9,851,869 | B2 * | 12/2017 | Kannan | ................. G06F 3/0482 |
| 9,948,699 | B1 * | 4/2018 | Tauber | ................. G06Q 50/01 |

(Continued)

FOREIGN PATENT DOCUMENTS

| | | |
|---|---|---|
| JP | 2006-024135 A | 1/2006 |
| JP | 2013-186823 A | 9/2013 |

(Continued)

*Primary Examiner* — Cheryl Lewis
(74) *Attorney, Agent, or Firm* — IPUSA, PLLC

(57) ABSTRACT

A system, apparatus, and method each: displays, to a first user belonging to a particular group of a plurality of groups, an information display screen for the particular group, the information display screen including a first area and a second area, the first area including a plurality of pieces of language information each converted from a speech in a chronological order, the second area including contents based on the displayed plurality of pieces of language information; and displays, to a second user who manages the plurality of groups, a status check screen including a list of a plurality of information display screens for the plurality of groups, the plurality of information display screens including the information display screen for the particular group.

11 Claims, 38 Drawing Sheets

(56) References Cited

U.S. PATENT DOCUMENTS

| | | | |
|---|---|---|---|
| 10,210,261 B2* | 2/2019 | Ju | H04L 51/52 |
| 10,523,613 B1* | 12/2019 | Alm | H04L 67/10 |
| 10,757,057 B2* | 8/2020 | Friend | G06F 3/0482 |
| 11,463,492 B1* | 10/2022 | Swerdlow | H04L 12/1822 |
| 2014/0200895 A1* | 7/2014 | Stephens, Jr. | G06F 16/9535 |
| | | | 704/260 |
| 2019/0087154 A1* | 3/2019 | Hirukawa | G10L 15/08 |
| 2019/0102061 A1* | 4/2019 | Fu | H04L 51/216 |
| 2022/0114367 A1 | 4/2022 | Hori et al. | |
| 2022/0115020 A1* | 4/2022 | Bradley | G06F 3/0334 |
| 2023/0376265 A1 | 11/2023 | Suzuki et al. | |
| 2023/0419720 A1* | 12/2023 | Doh | G06V 10/454 |
| 2024/0354672 A1* | 10/2024 | Shoji | G06F 16/00 |

FOREIGN PATENT DOCUMENTS

| | | |
|---|---|---|
| JP | 2017-004270 A | 1/2017 |
| JP | 2019-174894 A | 10/2019 |
| JP | 2019-192230 A | 10/2019 |
| JP | 2022-064243 A | 4/2022 |
| WO | 2022/224584 A1 | 10/2022 |

\* cited by examiner

FIG. 9

| Group A | | | | |
|---|---|---|---|---|
| LANGUAGE INFORMATION ID | LANGUAGE INFORMATION | INPUT TIME | USER ID | NUMBER OF LIKES |
| ...... | ...... | ...... | ...... | ...... |
| t00n | Well, I think it's important that newcomers can relax the most | 20xx/8/16 10:10:00 | u001 | 1 |
| t00n+1 | Then, I wonder if face-to-face communication is better, or the way around | 20xx/8/16 10:10:30 | u002 | 2 |
| t00n+2 | Depending on what kind of gathering we are throwing | 20xx/8/16 10:11:00 | u003 | 0 |
| ... | ... | ... | ... | ... |

| CONTENT ID | TYPE | PAGE | COORDI- NATES | SIZE | FONT SIZE | ARRANGE- MENT TIME | LANGUAGE INFORMA- TION ID |
|---|---|---|---|---|---|---|---|
| 1 | HAND- DRAFTED | 1 | x1,y1 | W1,H1 | ... | 20xx/08/16 9:10:12 | — |
| 2 | LANGUAGE INFORMATION | 1 | x2,y2 | W2,H2 | 20 | 20xx/08/16 9:11:30 | t0n1 |
| 3 | SQUARE | 1 | x3,y3 | W3,H3 | ... | 20xx/08/16 9:11:55 | — |
| 4 | ILLUSTRA- TION | 1 | x4,y4 | W4,H4 | ... | 20xx/08/16 9:13:45 | t0n2 |
| 5 | TRIANGLE | 1 | x5,y5 | W5,H5 | ... | 20xx/08/16 9:15:20 | — |
| 6 | LANGUAGE INFORMATION | 1 | x6,y6 | W6,H6 | 20 | 20xx/08/16 9:18:32 | t0n4 |
| 7 | ILLUSTRA- TION | 1 | x7,y7 | W7,H7 | ... | 20xx/08/16 9:23:19 | t0n5 |
| ... | ... | ... | ... | ... | ... | ... | ... |

Group A 3002A
3002B
3002C
3002D

FIG. 11

| KEYWORD | ID | FILE NAME |
|---|---|---|
| "FACTORY", "FORKLIFT", "VEHICLE" | 101 | forklift1.bmp |
| "BUS", "PUBLIC TRANSPORTATION", "VEHICLE" | 102 | bus1.bmp |
| "TAXI", "PUBLIC TRANSPORTATION", "VEHICLE" | 103 | taxi1.bmp |
| ... | ... | ... |
| "PERSON", "STAND" | 201 | human1.bmp |
| "PERSON", "SIT DOWN" | 202 | human2.bmp |
| ... | ... | ... |
| "ANIMAL", "DOG" | 301 | dog1.bmp |
| "ANIMAL", "CAT" | 302 | cat1.bmp |
| ... | ... | ... |

FIG. 12

| MEETING ID | FACILITATOR | GROUP | PARTIC- IPANTS | TITLE | START DATE AND TIME | END DATE AND TIME | PLACE | PASS- WORD |
|---|---|---|---|---|---|---|---|---|
| 001 | U010 | GROUP A | U001 U002 | ABC MEETING | 20XX/1/5 10:00 | 20XX/1/5 11:00 | MEETING ROOM A | **** |
| 002 | | GROUP B | U001 U003 | DEF MEETING | 20XX/1/5 9:00 | 20XX/1/5 10:00 | MEETING ROOM B | Y*Y* |
| 003 | | GROUP C | U001 U008 U009 | GHI MEETING | 20XX/1/6 14:00 | 20XX/1/6 15:00 | MEETING ROOM A | X**X |
| ... | ... | ... | ... | ... | ... | ... | ... | ... |

| FIG. 13A |
|---|
| FIG. 13B |

GROUP A

| STATUS ID | CONVERSATION LOG AREA STATUS | WHITEBOARD WORK AREA STATUS ||||||||
|---|---|---|---|---|---|---|---|---|
| | | CONTENT ID | TYPE | PAGE | COORDINATES | SIZE | FONT SIZE | ARRANGMENT TIME | LANGUAGE INFORMATION ID |
| s001 | t001~t002 | 1 | HAND-DRAFTED | 1 | x1,y1 | W1,H1 | ... | 20xx/08/16 9:10:12 | - |
| s002 | t001~t003 | 1 | HAND-DRAFTED | 1 | x1,y1 | W1,H1 | ... | 20xx/08/16 9:10:12 | - |
| | | 2 | LANGUAGE INFORMATION | 1 | x2,y2 | W2,H2 | 20 | 20xx/08/16 9:11:30 | t0n1 |
| s003 | t001~t004 | 1 | HAND-DRAFTED | 1 | x1,y1 | W1,H1 | ... | 20xx/08/16 9:10:12 | - |
| | | 2 | LANGUAGE INFORMATION | 1 | x2,y2 | W2,H2 | 20 | 20xx/08/16 9:11:30 | t0n1 |
| | | 3 | SQUARE | 1 | x3,y3 | W3,H3 | ... | 20xx/08/16 9:11:55 | - |

FIG. 13B

| | | CONTENT ID | TYPE | PAGE | COORDINATES | SIZE | FONT SIZE | ARRANGEMENT TIME | LANGUAGE INFORMATION ID |
|---|---|---|---|---|---|---|---|---|---|
| s004 | t002–t005 | 1 | HAND-DRAFTED | 1 | x1,y1 | W1,H1 | ... | 20xx/08/16 9:10:12 | — |
| | | 2 | LANGUAGE INFORMATION | 1 | x2,y2 | W2,H2 | 20 | 20xx/08/16 9:11:30 | t0n1 |
| | | 3 | SQUARE | 1 | x3,y3 | W3,H3 | ... | 20xx/08/16 9:11:55 | — |
| | | 4 | ILLUSTRATION | 1 | x4,y4 | W4,H4 | ... | 20xx/08/16 9:13:45 | t0n2 |
| s005 | t003–t006 | 1 | HAND-DRAFTED | 1 | x1,y1 | W1,H1 | ... | 20xx/08/16 9:10:12 | — |
| | | 2 | LANGUAGE INFORMATION | 1 | x2,y2 | W2,H2 | 20 | 20xx/08/16 9:11:30 | t0n1 |
| | | 3 | SQUARE | 1 | x3,y3 | W3,H3 | ... | 20xx/08/16 9:11:55 | — |
| | | 4 | ILLUSTRATION | 1 | x4,y4 | W4,H4 | ... | 20xx/08/16 9:13:45 | t0n2 |
| | | 5 | TRIANGLE | 1 | x5,y5 | W5,H5 | ... | 20xx/08/16 9:15:20 | — |
| | | 6 | LANGUAGE INFORMATION | 1 | x6,y6 | W6,H6 | 20 | 20xx/08/16 9:18:32 | t0n4 |
| ... | | | | | | | | | |

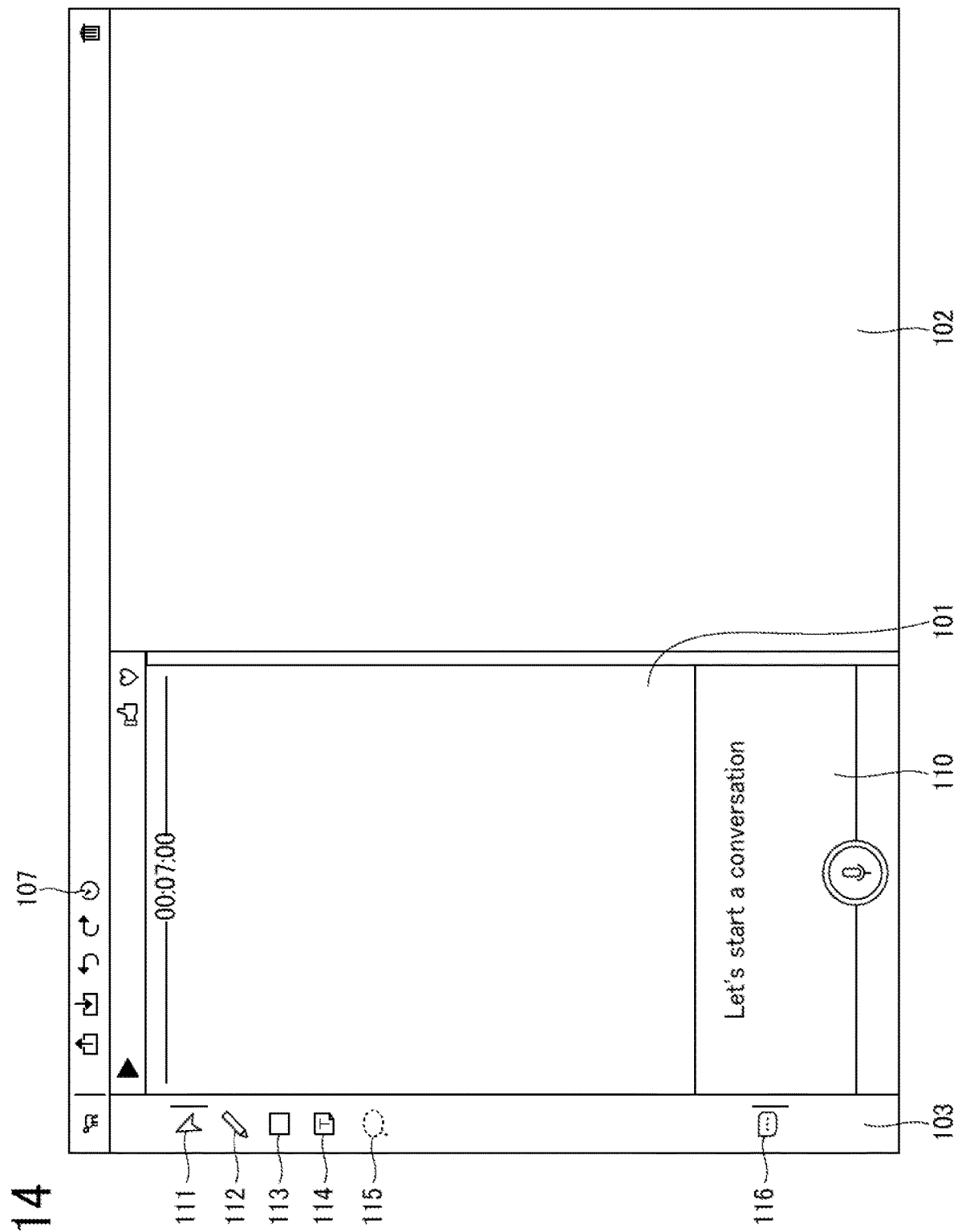

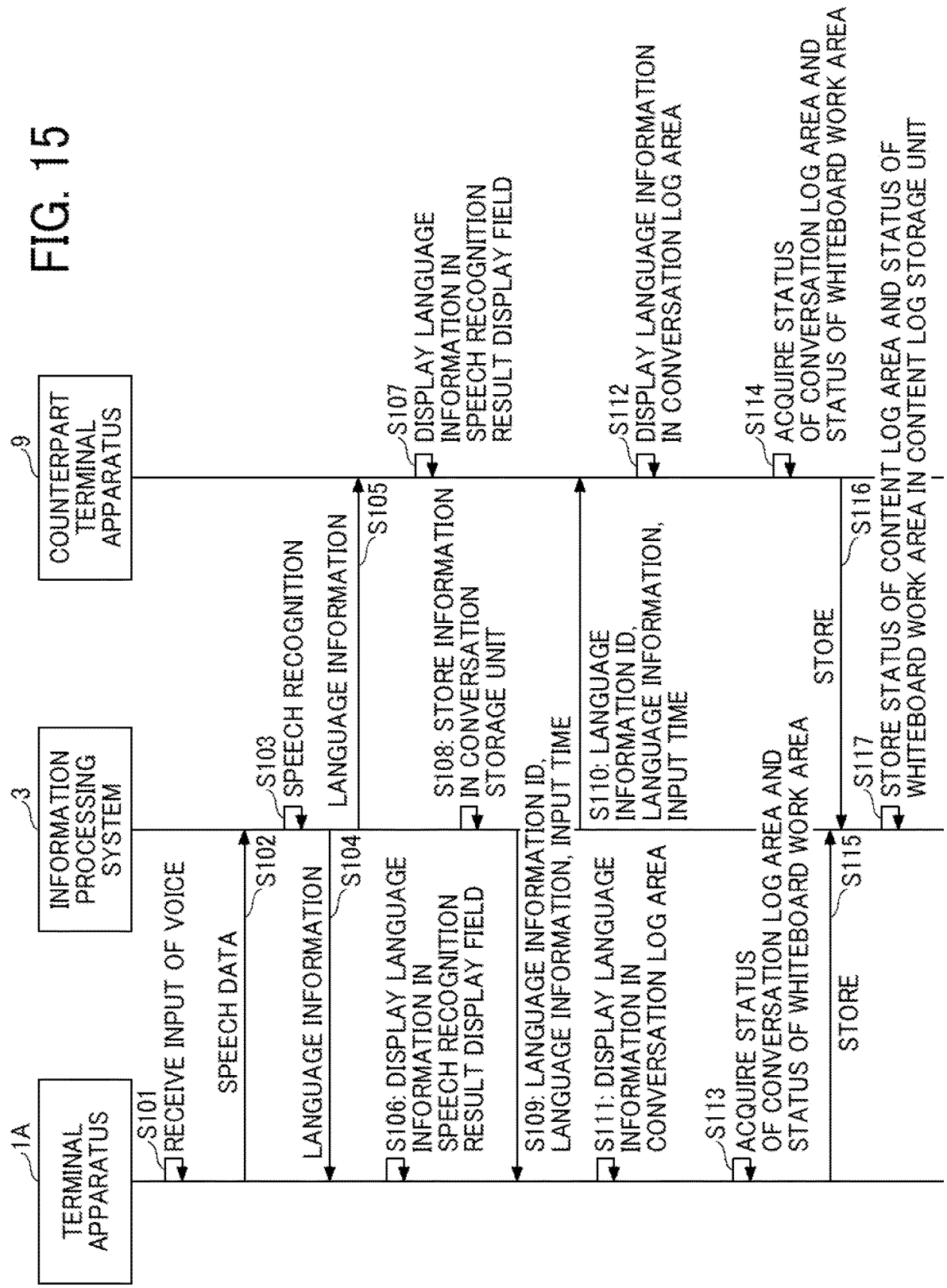

COMMUNICATION SYSTEM, TERMINAL APPARATUS, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2023-046427, filed on Mar. 23, 2023, in the Japan Patent Office, the entire disclosure of which is hereby incorporated by reference herein.

BACKGROUND

Technical Field

The present disclosure relates to a communication system, a terminal apparatus, and an information processing system.

Related Art

According to a technique of the related art, a display area for displaying text data converted from speech data generated at an event such as a meeting in which a display screen is shared, and a display area for displaying a screenshot of the display screen at a certain time point in the event are displayed in a chronological order. Participants of the event can grasp the status of communication at the event by viewing these display areas.

For example, when a plurality of groups are each having an event while sharing a display screen within the group, the technique of the related art does not allow a facilitator of the plurality of events to grasp the status of communication being performed with the display screen being shared at each of the plurality of events.

SUMMARY

Example embodiments include a system, apparatus, and method, each of which: displays, to a first user belonging to a particular group of a plurality of groups, an information display screen for the particular group, the information display screen including a first area and a second area. The first area includes a plurality of pieces of language information each converted from a speech in a chronological order. The second area includes contents based on the displayed plurality of pieces of language information. The system, apparatus, and method each further displays, to a second user who manages the plurality of groups, a status check screen including a list of a plurality of information display screens for the plurality of groups, the plurality of information display screens including the information display screen for the particular group.

Example embodiments include a non-transitory recording medium storing a program that causes the apparatus or the system to perform the above-described method.

Example embodiments include an information processing system communicably connected with a terminal apparatus. The information processing system includes circuitry that manages information to be displayed at the terminal apparatus according to a privilege of a user of the terminal apparatus, and causes the terminal apparatus to display the status check screen based on a determination that the terminal apparatus is associated with the second user who manages the plurality of groups

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a conceptual diagram illustrating an example of a conversation table;

FIG. 10 is a conceptual diagram illustrating an example of a content table;

FIG. 11 is a conceptual diagram illustrating an example of an illustration table;

FIG. 12 is a conceptual diagram illustrating an example of a meeting management table;

FIGS. 13A and 13B (FIG. 13) are a conceptual diagram illustrating an example of a content log table;

FIG. 14 is a diagram illustrating an example of an initial state of an information display screen displayed by the terminal apparatus;

FIG. 15 is a sequence diagram illustrating an example of processing of transmitting speech data from the terminal apparatus to an information processing system and sharing language information converted from the speech data at the information processing system with the counterpart terminal apparatus;

Figure 1:
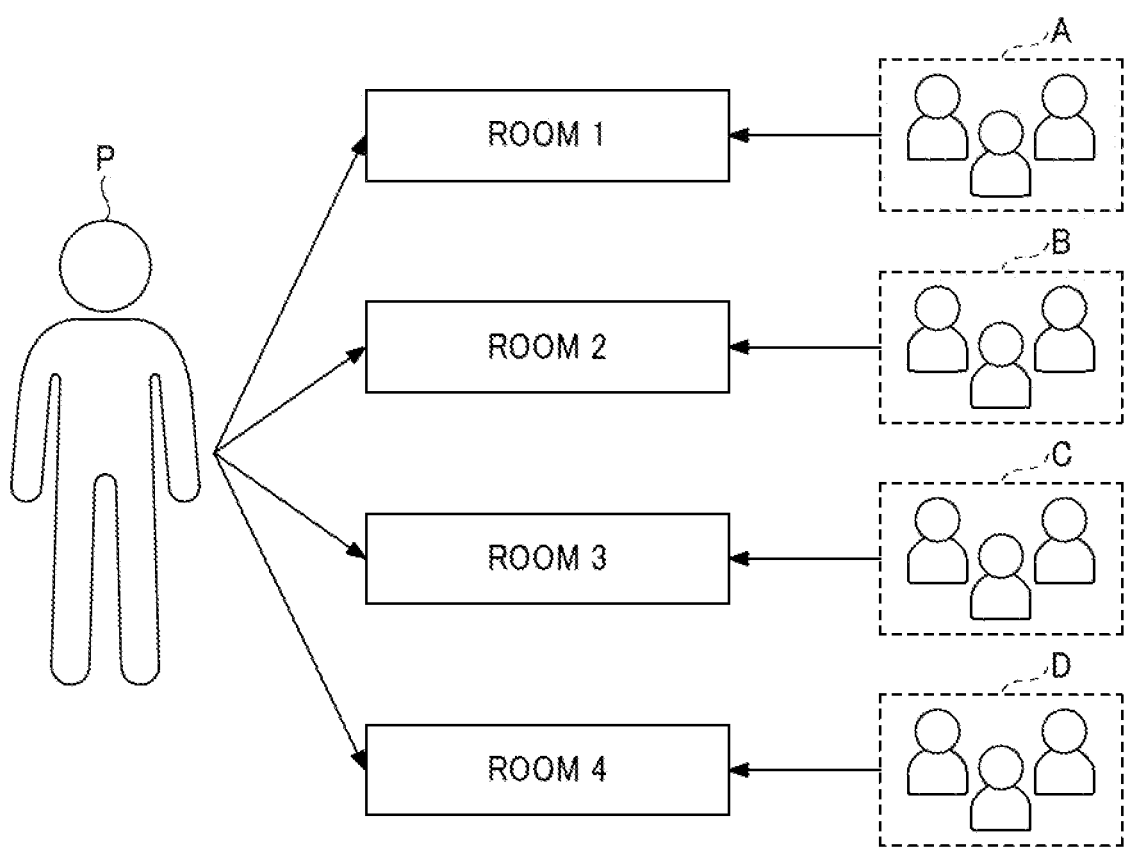
FIG. 1 is a diagram describing a use scene of a visual communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of an embodiment for carrying out the present disclosure, a visual communication system and a display method performed by the visual communication system will be described with reference to the drawings.

Communication using language information alone may be insufficient to efficiently convey information in a short time at a communication scene such as a meeting. For example, in a meeting to discuss a new plan or idea, use of visual information would be more effective in communication.

A workshop in which a plurality of users perform a group activity is an example of the communication scene. At a workshop, a plurality of users perform a group discussion (group work) or the like to discuss a new business model from different points of view or to give ideas to various issues.

In a group discussion, a large piece of paper, whiteboard, or the like is sometimes used to collaboratively form an idea of the group. In a face-to-face group discussion, both a facilitator and participants are in the same space. Thus, the facilitator can grasp the liveliness of each group or the status of the discussion.

In contrast, when a group discussion is held online, it is often the case that a breakout room function of a web meeting system divides the participants into a plurality of groups, and the participants perform a group work in units of groups using a display area (whiteboard work area) that allows editing by a plurality of people.

In this case, conceivably, the facilitator generally views the display areas of the respective groups without entering the breakout rooms of the groups in order to grasp the statuses of the discussions of the respective groups. However, there is a group which the facilitator has a difficulty in grasping the status of the discussion just by generally viewing the display area being edited. Specifically, for example, the facilitator has a difficulty in grasping the status of the discussion just by generally viewing the display area in the case of a group whose discussion is not visualized in the display area or a group whose display area have listed words alone. The facilitator can hardly recognize an amount of conversion in the discussion and contents of the conversation as well just by generally viewing the display area.

Accordingly, embodiments of the present disclosure allow the facilitator to intuitively grasp the status of the discussion of each of a plurality of groups. Note that the facilitator is an example of a person who assists the progress of the group discussion.

Use Scene

A use scene of a visual communication system according to the present embodiment will be described below with reference to FIG. 1. FIG. 1 is a diagram describing the use scene of the visual communication system.

FIG. 1 illustrates a case where the visual communication system is used to perform a group discussion. In the example of FIG. 1, participants of the group discussion are divided by a breakout room function of the visual communication system into a group A, a group B, a group C, and a group D. A facilitator P assists the progress of the group discussion.

The breakout room function is a function of an online communication tool that divides participants into groups and allows the participants to have conversion in units of groups. In the description below, the breakout room may be referred to simply as a "room".

In the example of FIG. 1, the group A performs a discussion in a room 1 formed online by the visual communication system, and the group B performs a discussion in a room 2 formed online by the visual communication system. The group C performs a discussion in a room 3 formed online by the visual communication system, and the group D performs a discussion in a room 4 formed online by the visual communication system.

Note that the rooms 1 to 4 according to the present embodiment may be set by a method other than the breakout room function of the visual communication system.

The present embodiment allows the facilitator P to intuitively grasp the status of the discussion of each of the groups A to D in real time.

System Configuration Example

Figure 2:
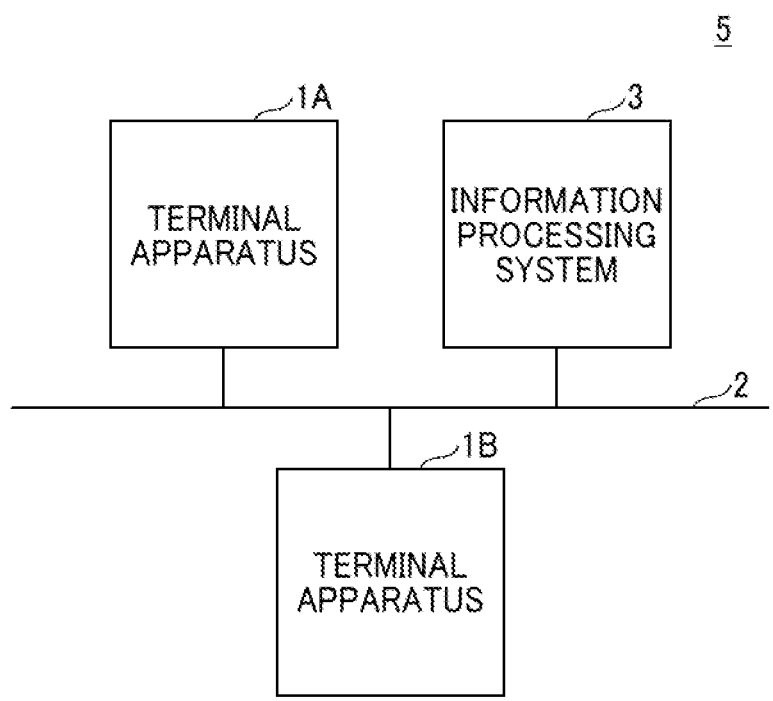
FIG. 2 is a diagram illustrating a configuration of the visual communication system according to the embodiment.

FIG. 2 is a diagram illustrating a configuration of a visual communication system 5 according to the exemplary embodiment. The visual communication system 5 includes a terminal apparatus 1A, a terminal apparatus 1B, and an information processing system 3 that communicate with one another via a network 2.

The network 2 may be implemented by any one or more of the Internet, a mobile communication network, and a local area network (LAN), for example. The network 2 may include a wireless communication network based on a wireless communication standard such as third generation (3G), fourth generation (4G), fifth generation (5G), Wireless Fidelity (Wi-Fi®), Worldwide Interoperability for Microwave Access (WiMAX), or Long Term Evolution (LTE), for example.

The terminal apparatus 1A (first terminal apparatus) is an information processing apparatus to be operated by participants. Specifically, for example, the terminal apparatus 1A is an information processing apparatus to be operated by participants included in the groups A to D. The terminal apparatus 1B is an information processing apparatus to be operated by the facilitator P. Note that the facilitator P may be one of the participants of the groups A to D.

Note that the terminal apparatus 1B is used by an administrator who manages a discussion of each group, and the administrator is not limited to the facilitator P. For example, if the group discussion is held as a class at an educational institution, the teacher may act as the administrator. When the group discussion is held at a department meeting, the department manager may act as the administrator.

The terminal apparatus 1A according to the present embodiment displays an information display screen. More specifically, the terminal apparatus 1A of the participants belonging to the group A displays an information display screen of the group A. The terminal apparatus 1A of the participants belonging to the group B displays an information display screen of the group B. The terminal apparatus 1A of the participants belonging to the group C displays an information display screen of the group C. The terminal apparatus 1A of the participants belonging to the group D displays an information display screen of the group D.

The information display screen is a screen displayed by the terminal apparatus 1A while the participants are having a discussion. The information display screen includes a conversation log area (first area) in which language information converted from a speech is displayed in a chronological order, and a whiteboard work area (second area) in which a content based on the language information is placed.

The terminal apparatus 1A transmits speech data representing utterances of the participants to the information processing system 3. The terminal apparatus 1A receives language information that is text converted from the speech data by the information processing system 3, and displays the language information in the conversation log area of the information display screen displayed by the terminal apparatus 1A.

The terminal apparatus 1A repeats this processing. The terminal apparatuses 1A to be operated by a plurality of participants who participate in the meeting are connected to the network 2. The terminal apparatuses 1A each perform the above-described processing, so that the language information input by each of the participants is displayed in the conversation log area of the information display screen in a chronological order.

Details of the information display screen will be described later.

The terminal apparatus 1B (second terminal apparatus) displays a status check screen that allows the facilitator P to grasp the status of the discussion of each group. The status check screen displays a list of the information display screens of the respective groups. Specifically, for example, the terminal apparatus 1B displays the information display screen of the group A, the information display screen of the group B, the information display screen of the group C, and the information display screen of the group D as a list. Details of the status check screen will be described later.

In the present embodiment, the terminal apparatus 1B displays the list of the information display screens of the respective groups in this manner. This allows the facilitator P to intuitively grasp the status of the discussion of each group.

Note that in the description below, when the terminal apparatuses 1A and 1B are not distinguished from each other, the terminal apparatuses 1A and 1B are each referred to simply as a terminal apparatus 1.

The terminal apparatus 1 may be, for example, a desktop personal computer (PC), a notebook PC, a smartphone, a tablet terminal, or the like, which operates on the general operating system (OS) such as Windows®, MAC® OS, Android®, or iOS®. In addition, the terminal apparatus 1 may be any apparatus on which an application such as a web browser can operate.

The terminal apparatus 1 may be an electronic whiteboard, an output device such as digital signage, a head-up display (HUD) device, an industrial machine, a medical device, a network home appliance, a connected car, a mobile phone, a smartphone, a tablet terminal, a game machine, a personal digital assistant (PDA), or the like.

The information processing system 3 is an example of an information processing apparatus having a function of providing information or a processing result in response to a request from the terminal apparatus 1. Such an information processing apparatus is called a server. In the visual communication system 5 of the present embodiment, the information processing system 3 may provide an image such as an illustration corresponding to language information to the terminal apparatus 1 in addition to performing speech recognition. The speech recognition may alternatively be performed by the terminal apparatus 1.

The information processing system 3 preferably has a function of a web server. The web server transmits various kinds of information such as a Hypertext Markup Language (HTML) document existing on the web server, which is specified by a Uniform Resource Locator (URL) instructed from a web browser as a client, according to the Hypertext Transfer Protocol (HTTP) used for connection with the terminal apparatus 1. A web application is executed, based on communication between the web browser and the web server. Specifically, the web application is an application that is executed, as a program on the web browser and a program on the web server operate in cooperation. The program on the web browser may be a program written in a programming language for web browser such as JavaScript®. In this disclosure, an application, which is not executed unless installed in the terminal apparatus 1, is referred to as a native application.

The information processing system 3 may support cloud computing. "Cloud computing" refers to internet-based computing where resources on a network are used without identifying specific hardware resources. For example, a web server function, a speech recognition function, and an illustration search function of the information processing system 3 may be separately implemented by a plurality of servers.

Hardware Configuration

Figure 3:
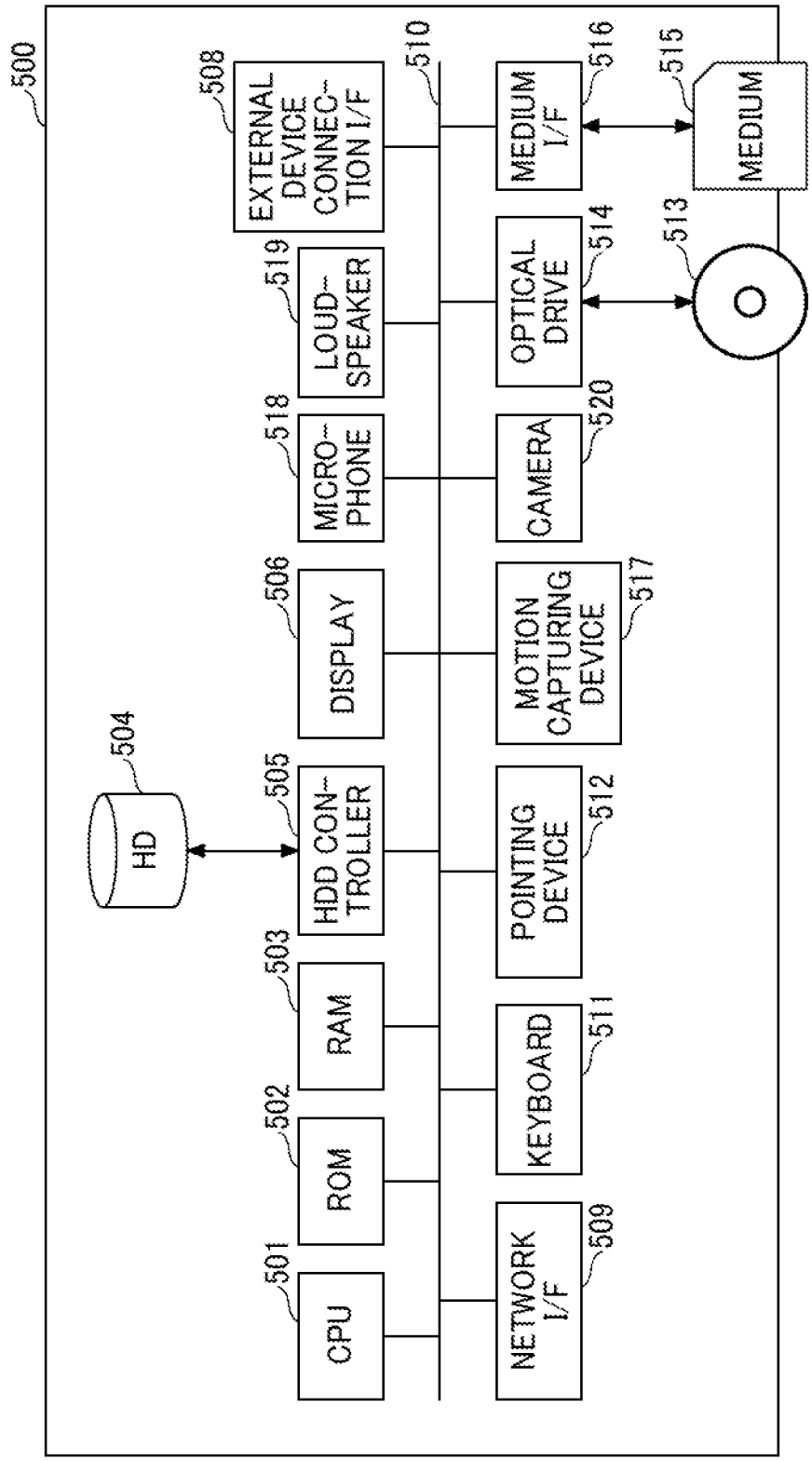
FIG. 3 is a block diagram illustrating an example of a hardware configuration of a computer according to the embodiment.

FIG. 3 is a diagram illustrating a hardware configuration of the terminal apparatus 1 and the information processing system 3. The terminal apparatus 1 and the information processing system 3 each have a hardware configuration of a computer 500 illustrated in FIG. 3.

As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, a medium I/F 516, a motion capturing device 517, a microphone 518, a loudspeaker 519, and a camera 520.

The CPU 501 controls the entire operation of the computer 500. The ROM 502 stores programs, such as an initial program loader (IPL), for driving the CPU 501. The RAM 503 is used as a work area for the CPU 501. The HD 504 stores various kinds of data such as a program. The HDD controller 505 controls reading and writing of various kinds of data from and to the HD 504 under control of the CPU 501. The display 506, as an example of display means, displays various kinds of information such as a cursor, menu, window, characters, or image. The external device connection I/F 508 is an interface that connects various external devices to the computer 500. Examples of the external devices include, but not limited to, a Universal Serial Bus (USB) memory and a printer. The network I/F 509 is an interface for communicating data via the network 2. The bus line 510 is, for example, an address bus or a data bus, which electrically connects the components or elements such as the CPU 501 illustrated in FIG. 3 to each other.

The keyboard 511 is an example of an input device including a plurality of keys used to input a character, a numerical value, various instructions, and the like. The pointing device 512 is an example of an input device used to select or execute a specific instruction, select a target for processing, or move a cursor. The optical drive 514 controls reading or writing of various kinds of data from or to an optical recording medium 513 that is an example of a removable recording medium. The optical drive 514 may be a drive for a compact disc (CD), a digital versatile disc (DVD), a Blu-ray recordable (R), or the like. The medium I/F 516 controls reading and writing (storing) of data from and to a recording medium 515 such as a flash memory.

The motion capturing device 517, which is an example of an input device, is a circuit that detects a motion of a user and converts the detected motion into an electrical signal. The motion of the user may be detected by any one of an optical system that detects reflection of light, a magnetic sensor attached to the user, a mechanical sensor, a system that uses a detection result of a magnetic sensor, a system that analyzes an image of the user, or the like, or a combination thereof.

The microphone 518 is a built-in circuit that converts sound into an electric signal. The loudspeaker 519 is a built-in circuit that generates sound such as music or voice by converting an electric signal into physical vibration. The microphone 518 and the loudspeaker 519 may be built-in or provided separately.

The camera 520 is an example of a built-in imaging device that captures a target to obtain image data.

In the computer 500 operating as the information processing system 3, the HDD controller 505 controls the HD 504 to store the program 500a. In the computer 500 operating as the terminal apparatus 1, the program 500a is downloaded from the information processing system 3 via the network 2 and stored in the HD 504. The CPU 501 then reads the program 500a from the HD 504 and executes the program 500a so as to deploy a functional configuration illustrated in FIG. 8 in the RAM 503 collectively at the time of compilation or sequentially in accordance with the progress of processing. Further, in the computer 500 operating as the information processing system 3, the CPU 501 executes the program 500a so as to deploy the functional configuration illustrated in FIG. 8 in the RAM 503 collectively at the time of compilation or in accordance with the progress of processing.

From the computer 500 operating as the information processing system 3, the configuration related to the user interface may be omitted. For example, at least one of the display 506, the keyboard 511, the pointing device 512, or the motion capturing device 517 may be omitted.

Overview of Operation of Terminal Apparatus 1A

Figure 4:
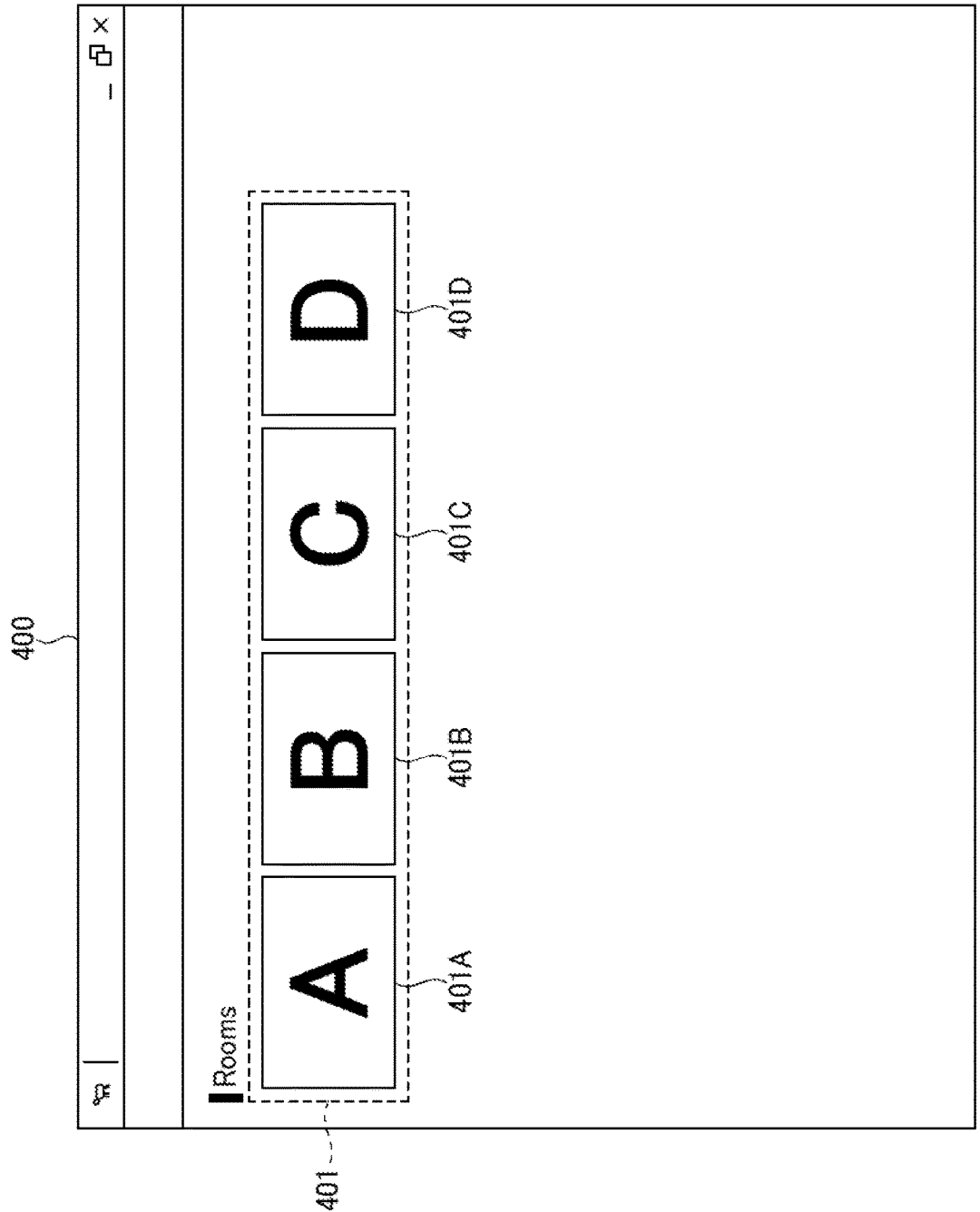
FIG. 4 is a diagram illustrating an example of a home screen displayed by a terminal apparatus operated by participants.
Figure 5:
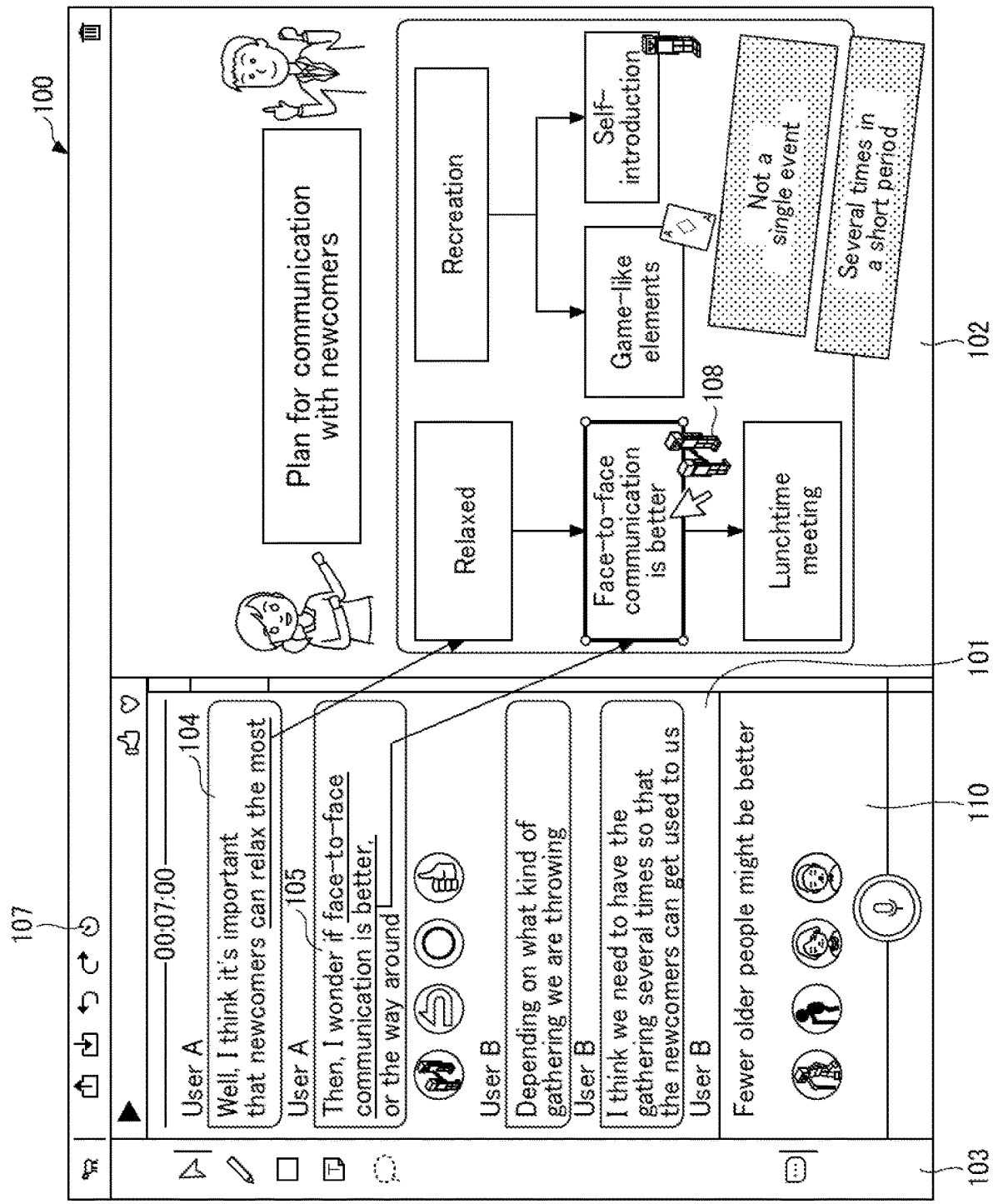
FIG. 5 is a diagram illustrating an information display screen displayed by the terminal apparatus during a meeting.

An overview of an operation of the terminal apparatus 1A will be described with reference to FIGS. 4 and 5. FIG. 4 is a diagram illustrating an example of a home screen displayed by the terminal apparatus operated by the participants.

A screen 400 illustrated in FIG. 4 is an example of a home screen for participants displayed on the terminal apparatus 1A in response to a participant operating the terminal apparatus 1A and logging into the visual communication system 5 according to the present embodiment, for example.

The screen 400 includes a display area 401. The display area 401 displays a list of operation buttons each for displaying the information display screen of a corresponding one of the groups. Specifically, the display area 401 includes operation buttons 401A, 401B, 401C, and 401D.

The operation button 401A is for causing the screen 400 to transition to the information display screen of the group A. The operation button 401B is for causing the screen 400 to transition to the information display screen of the group B. The operation button 401C is for causing the screen 400 to transition to the information display screen of the group C. The operation button 401D is for causing the screen 400 to transition to the information display screen of the group D.

The information display screen of each group will be described with reference to FIG. 5. FIG. 5 is a diagram illustrating the information display screen displayed by the terminal apparatus during a meeting. As illustrated in FIG. 5, an information display screen 100 includes a conversation log area 101 (an example of a first area) and a whiteboard work area 102 (an example of a second area). The whiteboard work area 102 is a display area of a touch panel, and is an area that allows meeting participants ("participants") to display hand-drafted data, directly input language information, or various images, substantially in the same manner as a display area of the ordinary electronic whiteboard. The conversation log area 101 is an area that displays a log of language information converted from contents of speech of the participants through speech recognition. The whiteboard work area 102 does not have to be implemented by a touch panel, and may be an ordinary display. For example, the user may input hand-drafted data using a mouse.

As described above, the whiteboard work area 102 and the conversation log area 101 are displayed on the same screen. The participant can relocate the language information displayed in the conversation log area 101, in the whiteboard work area 102 by clicking or dragging the language information. In FIG. 5, a character string 104 "relaxed" and a character string 105 "face-to-face communication is better" are displayed in the whiteboard work area 102.

The participant can also place an illustration in the whiteboard work area 102 based on the language information in the conversation log area 101 or the whiteboard work area 102. In FIG. 5, an illustration 108 based on the character string 105 "face-to-face communication is better" is displayed in the whiteboard work area 102.

As described above, the visual communication system 5 according to the present embodiment displays visual information such as an illustration in the whiteboard work area 102 based on language information converted from speech. This allows the users (participants) to easily visualize the communication during the meeting even if the user does not convert the contents of conversation into an illustration, draw the illustration in the whiteboard work area 102, or acquire the illustration from a network. The whiteboard work area 102 and the conversation log area 101 are displayed in the same screen. This allows the user to proceed communication while learning a flow of communication in which each content in the whiteboard work area 102 is placed.

Figure 6:
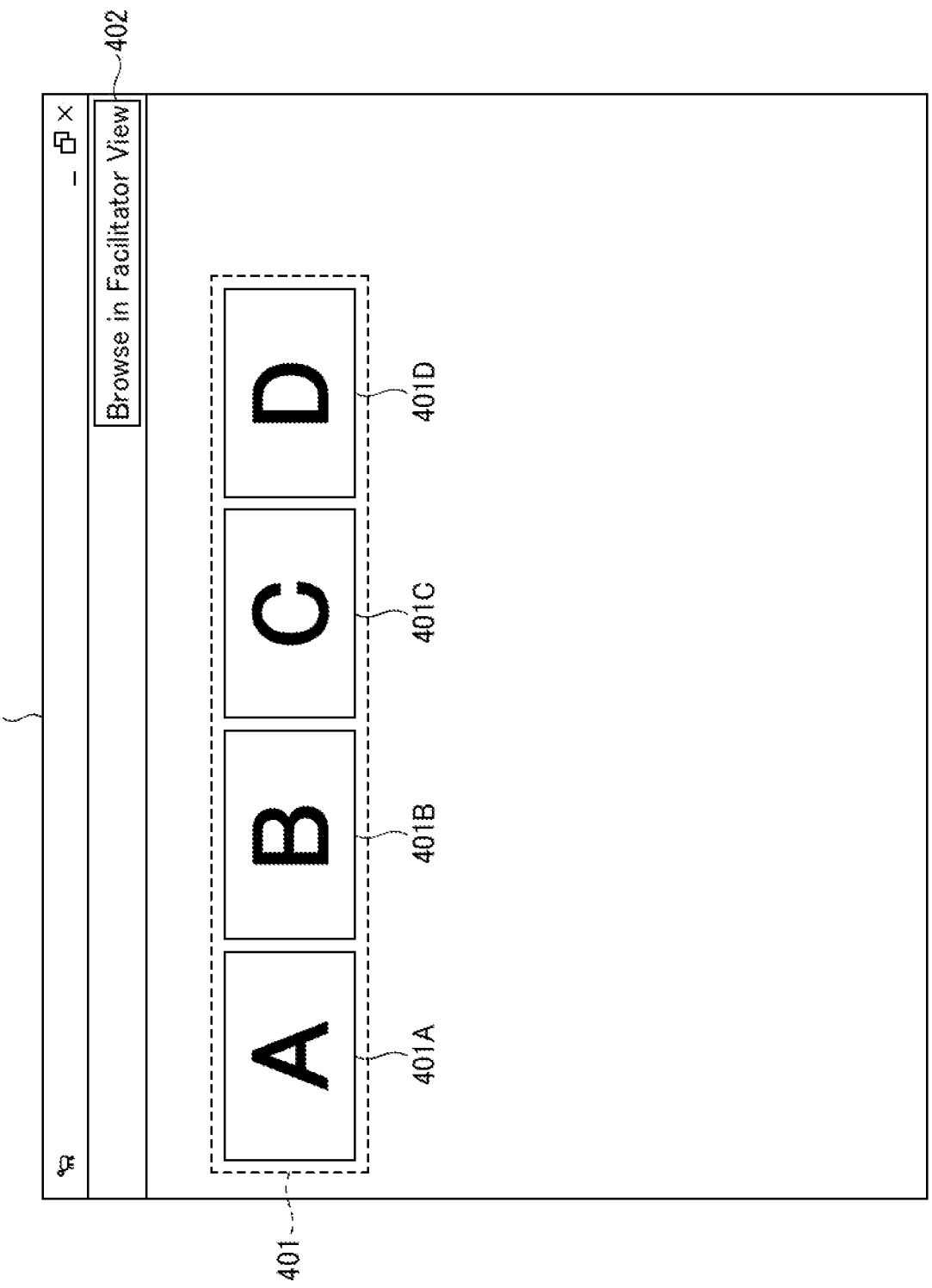
FIG. 6 is a diagram illustrating an example of a home screen displayed by a terminal apparatus operated by a facilitator.

FIG. 6 is a diagram illustrating an example of a home screen displayed by the terminal apparatus operated by the facilitator. A screen 400A illustrated in FIG. 6 is an example of a home screen for a facilitator displayed on the terminal apparatus 1B in response to the facilitator P operating the terminal apparatus 1B and logging into the visual communication system 5 according to the present embodiment, for example.

Note that the terminal apparatus 1B displays the screen for a facilitator in response to the facilitator P operating the terminal apparatus 1B and logging into the visual communication system 5 according to the present embodiment.

The screen 400A includes the display area 401 and an operation button 402. The operation button 402 is for causing the screen 400A to transition to the status check screen. That is, the operation button 402 is displayed in response to a participant having an authority of the facilitator P logging into the visual communication system 5 using the terminal apparatus 1B.

In response to the facilitator P operating the operation button 402, the terminal apparatus 1B displays the status check screen including a list of the information display screens of the respective groups.

Figure 7:
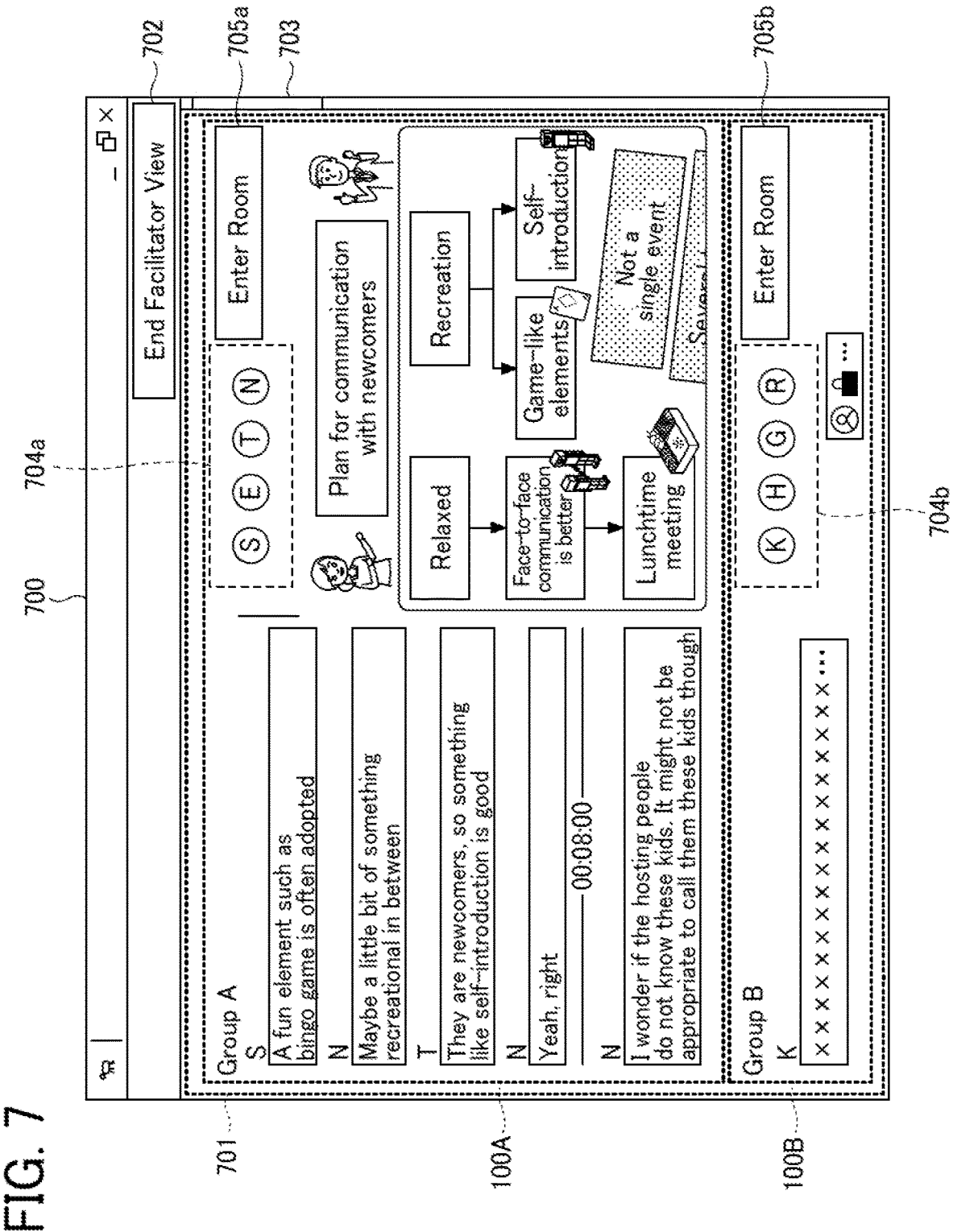
FIG. 7 is a first diagram illustrating an example of a status check screen displayed by the terminal apparatus operated by the facilitator.

FIG. 7 is a first diagram illustrating an example of the status check screen displayed by the terminal apparatus operated by the facilitator. A screen 700 illustrated in FIG. 7 is an example of the status check screen for a facilitator displayed by the terminal apparatus 1B.

The screen 700 includes a display area 701 and an operation button 702. The display area 701 displays a list of the information display screens of the respective groups. In the example of FIG. 7, the display area 701 displays an information display screen 100A of the group A and a portion of an information display screen 100B of the group B. In the screen 700, the display area 701 displays an information display screen 100C of the group C and an information display screen 100D of the group D in response to movement of a slider 703.

The information display screen 100A displayed in the display area 701 includes a display area 704a and an operation button 705a. The information display screen 100B displayed in the display area 701 includes a display area 704b and an operation button 705b.

The display area 704a displays icon images for identifying the participants belonging to the group A. The operation button 705a allows the facilitator P to enter a room 1 where the group A is having the discussion. The display area 704b displays icon images for identifying the participants belonging to the group B. The operation button 705b allows the facilitator P to enter a room 2 where the group B is having the discussion.

In response to the facilitator P operating the operation button 705a in the screen 700, the terminal apparatus 1B acts as one of the plurality of terminal apparatuses 1A sharing the information display screen 100A of the group A, and the screen displayed by the terminal apparatus 1B transitions from the screen 700 to the information display screen 100A.

The operation button 702 is for causing the screen 700 to transition to the screen 400A illustrated in FIG. 6.

Note that the screen 700 may provide, for example, a function of reviewing the conversion and the visualization so far as a short animation. In response to selection of an illustration or text in the information display screen of each group, the terminal apparatus 1B may identify a participant who has operated the selected illustration or text and display the identified participant in a visually recognizable manner. In response to selection of an illustration, the terminal apparatus 1B may display text associated with the selected illustration in an identifiable manner.

Terms

The language information is made up of words in any desired language such as Japanese or English. In the present embodiment, the language information includes not only information obtained by speech recognition of utterance by a speaker but also information input from a keyboard or the like. The language information includes information to be displayed by a computer based on character codes, such as characters, figures, numbers, and alphabets.

Storing language information in a chorological order means that the language information is displayed in the order of utterance and the past language information can be viewed any time.

The work area is an area on a computer screen where the user can edit arrangement or contents of the language information, or arrangement or contents of any other content. An example work area is an area that can be as an electronic whiteboard. The electronic whiteboard is a device, which allows a user to write hand-drafted data using a touch panel in a similar manner as the conventional whiteboard, while displaying a screen or data available from any device such as a PC. The whiteboard may be referred to as an electronic blackboard, an electronic information board, or an electronic whiteboard, etc.

The content is a display object displayed in the work area. The content may be any object that can be displayed by a computer such as language information, illustrations, figures, tables, and any other data such as screen data of a PC, or information on the Internet.

Functional Configuration of Visual Communication System

Figure 8:
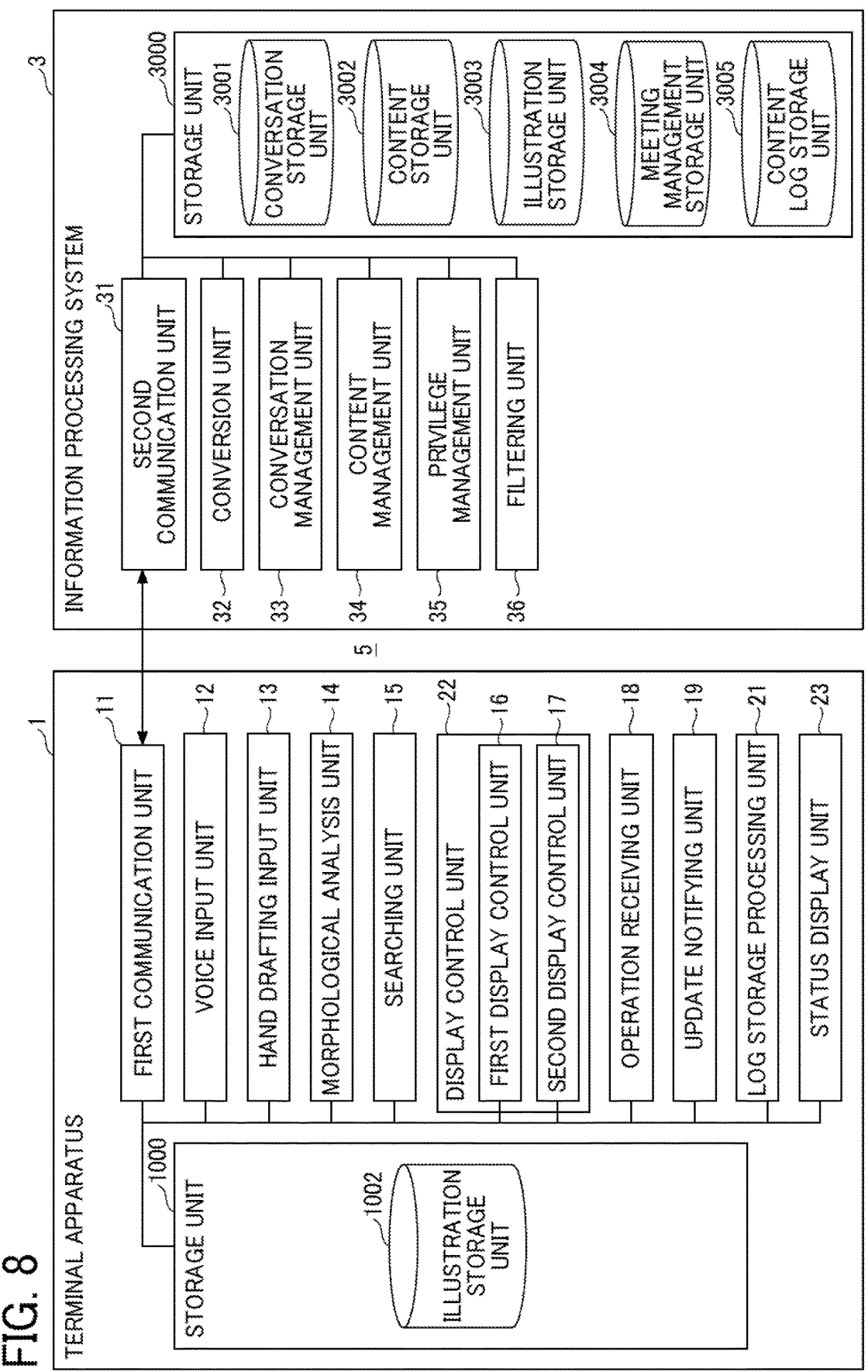
FIG. 8 is a block diagram illustrating a functional configuration of the visual communication system according to the embodiment.

A functional configuration of the visual communication system according to the present embodiment will be described with reference to FIGS. 8 to 13. FIG. 8 is a block diagram illustrating a functional configuration of the visual communication system 5.

Functional Configuration of Information Processing System

As illustrated in FIG. 8, the information processing system 3 includes a second communication unit 31, a conversion unit 32, a conversation management unit 33, a content management unit 34, a privilege management unit 35, and a filtering unit 36. These units of the information processing system 3 are functions or units implemented by or caused to function by operating one or more hardware components illustrated in FIG. 3 in cooperation with instructions of the CPU 501 according to the program loaded from the HD 504 to the RAM 503. The information processing system 3 also includes a storage unit 3000 implemented by the RAM 503 and the HD 504 illustrated in FIG. 3.

The second communication unit 31 communicates with the terminal apparatus 1 via the network 2. The second communication unit 31 receives speech data or hand-drafted data from the terminal apparatus 1, and transmits language information converted from the speech data or hand-drafted data to the terminal apparatus 1.

The conversion unit 32 performs recognition processing on speech data representing utterances by the user, or one or more pieces of stroke data (example of hand-drafted data) drafted by the user, to convert such speech data or hand-drafted data into language information.

The instance of the language information is a character code. The conversion unit 32 recognizes characters (multiple languages such as not only Japanese but also English), numbers, symbols (such as %, $, and &), figures (such as line, circle, and triangle), etc., concurrently with the user's utterance or the user's operation with a pen. Although various algorithms have been proposed for the recognition method, a detailed description is omitted, as any desired known technique can be used in the present embodiment. Note that an algorithms suitable to recognition of speech data and an algorithm suitable to recognition of hand-drafted data are used.

The conversion by the conversion unit 32 may be alternatively performed at the terminal apparatus 1. The conversion unit 32 may be provided in another server independent of the information processing system 3.

The conversation management unit 33 stores the language information, which is converted by the conversion unit 32 from the speech data obtained from each terminal apparatus 1, in a conversation storage unit 3001. The conversation storage unit 3001 stores a log of conversations in a chorological order.

The content management unit 34 manages language information, illustrations, and the like, displayed in the whiteboard work area 102. The content is stored in a content storage unit 3002 (described later). Since the whiteboard work area 102 is shared between the terminal apparatuses 1, the content storage unit 3002 includes a plurality of contents placed (arranged) by a user of each terminal apparatus 1.

The privilege management unit 35 manages information to be displayed by the terminal apparatus 1 in accordance with the privilege of the user of the terminal apparatus 1. Specifically, if the user having a facilitator privilege has logged into the visual communication system 5, the privilege management unit 35 performs processing of displaying the home screen and status check screen for a facilitator on the terminal apparatus 1B associated with this user.

If the user who is a general participant not having the facilitator privilege has logged into the visual communication system 5, the privilege management unit 35 performs processing of displaying the home screen and information display screen for participants on the terminal apparatus 1A associated with this user. Note that the privilege of the user is determined with reference to a meeting management table (described later).

The filtering unit 36 filters the language information displayed in the conversation log area 101 by a user ID or the like. This reduces the number of pieces of language information displayed in the conversation log area 101, thus allowing the user to easily search for language information of the user's interest.

The filtering unit 36 may filter the language information displayed in the conversation log area 101 by the user ID, and display the number of utterances of each user in the status check screen displayed by the terminal apparatus 1B. The filtering unit 36 may filter the illustrations displayed in the whiteboard work area 102 by a specific element, and display the filtered illustrations with emphasis in the status check screen.

Note that the privilege management unit 35 and the filtering unit 36 may be provided in the terminal apparatus 1 as functions of the terminal apparatus 1.

Conversation Table

FIG. 9 is a conceptual diagram illustrating an example of a conversation table. The storage unit 3000 includes the conversation storage unit 3001, implemented by a conversation table as illustrated in FIG. 9. The conversation table stores a plurality of items including "language information ID", "language information", "input time", "speaker", and "number of likes" in association with one another.

The conversation table is stored for each group. A conversation table 3001A is a conversation table for the group A. A conversation table 3001B is a conversation table for the group B. A conversation table 3001C is a conversation table for the group C. A conversation table 3001D is a conversation table for the group D.

The item "language information ID" is identification information of the language information displayed in the conversation log area 101. The conversation management unit 33 assigns a language information ID to each language information without any overlap.

The item "language information" is language information that is converted from speech data by the conversion unit 32 and is displayed in the conversation log area 101.

The item "input time" is a time when the language information was input, and is, for example, a time when the conversion unit 32 completed conversion from the speech data to the language information.

The item "speaker" is identification information of a user (speaker) who has uttered the language information as speech data. Hereinafter, the identification information of the user may be referred to as a user ID. The identification information of the user is transmitted to the information processing system 3 together with the speech data.

The item "number of likes" is the number of times the "like" button is pressed for particular language information. The "like" button means a favorable response, and the number of likes is the number of favorable responses.

Content Table

FIG. 10 is a conceptual diagram illustrating an example of a content table. The storage unit 3000 includes the content storage unit 3002, implemented by a content table as illustrated in FIG. 10. The content table stores a plurality of items including "content ID", "type", "page", "coordinates", "size", "font size", "arrangement time", and "language information ID" in association with one another.

The content table is stored for each group. A content table 3002A is a content table for the group A. A content table 3002B is a content table for the group B. A content table 3002C is a content table for the group C. A content table 3002D is a content table for the group D.

The item "content ID" is identification information for identifying a content. The content management unit 34 assigns a content ID to each content.

The item "type" indicates a type of a content. Examples of the type includes "hand-drafted", "language information", "figure" (square, triangle, or the like), "illustration", and "table". The type "hand-drafted" indicates stroke data (coordinate point sequence). The type "language information" indicates one or more characters, symbols, etc. (referred to as character codes) arranged in the whiteboard work area 102. The type "figure" indicates a geometric shape such as a triangle or quadrangle converted from the hand-drafted data or the language information. The type "illustration" indicates image data in any desired data format such as JPEG, Png, or Tiff, which is retrieved using language information or directly placed by the user. The type "table" indicates a one-dimensional or two-dimensional table content.

In this disclosure, one screen of the whiteboard work area 102 is referred to as one page. The item "page" indicates the page number.

The item "coordinates" indicates a position of the content with respect to a predetermined origin of the whiteboard work area 102. The position of the content corresponds to, for example, the upper left vertex of the circumscribed rectangle of the content. The coordinates are expressed, for example, in units of pixels of a display.

The item "size" indicates a width and a height of the circumscribed rectangle of the content.

The item "font size" indicates a size of one character set for a content of the "language information" type. For the language information, in addition to the font size, any other property such as a color or a font may be set.

The item "arrangement time" indicates a date and time when the content was first placed in the whiteboard work area 102. The content may be placed by copying the content from the conversation log area 101, or by a user directly hand-drafting the content in the whiteboard work area 102. The term "first" indicates the arrangement time that is kept unchanged even when the language information is decomposed by morphological analysis or the size of the illustration is changed. This is to maintain the association between the arrangement time with the input time of the language information in the conversation log area 101.

The item "language information ID" is the same as the language information ID of specific language information when the language information or the illustration is derived from the specific language information in the conversation log area 101 (for example, when the illustration is copied or searched from the conversation log area 101). That is, the language information ID of the content tables associates each content with the language information in the conversation log area 101. In other words, the language information ID is not set to the content that is not derived from the language information in the conversation log area 101.

Illustration Table

FIG. 11 is a conceptual diagram illustrating an example of an illustration table. The storage unit 3000 includes an illustration storage unit 3003, implemented by an illustration table as illustrated in FIG. 11. The illustration table stores a plurality of items including "keyword", "ID", and "file name" in association with one another.

The item "keyword" indicates a character string to be searched for, which corresponds to a name or appellation of an illustration. In this example, the illustration having a file name, which is associated with a keyword at least partially matching the words included in the language information, is displayed by the terminal apparatus 1. The keyword may be represented by a word, phonogram, ideogram, sentence, number, or any combination thereof.

The item "ID" is identification information for identifying an illustration.

The item "file name" is a name of a file storing the illustration.

The illustration table as illustrated in FIG. 11 is registered in advance in the information processing system 3 by an administrator or the like. Alternatively, a searching unit 15 may search an illustration on the Internet without preparing the illustration table. Alternatively, the information processing system 3 may generate an illustration corresponding to a word included in language information using the technology such as a generative adversarial network (GAN).

The illustration may also include a three-dimensional (3D) model or a three-dimensional illustration. The 3D model or the three-dimensional illustration is a virtual three-dimensional object in a three-dimensional space. The user can view the 3D model or the three-dimensional illustration from any direction within 360 degrees. The information processing system 3 may also convert the 3D model or the three-dimensional illustration into an illustration on a two-dimensional plane. The illustration table may be held by the terminal apparatus 1.

Meeting Management Table

FIG. 12 is a conceptual diagram illustrating an example of a meeting management table. The storage unit 3000 includes a meeting management storage unit 3004, implemented by a meeting management table as illustrated in FIG. 12. The meeting management table stores a plurality of items including "facilitator", "group", "participants", "title (meeting name)", "start date and time", "end date and time", "place (location)", and "password" in association with "meeting ID". The item "meeting ID" is identification information for identifying a group discussion (discussion) performed by each group.

The meeting management table is stored for each group. A meeting management table 3004A is a meeting management table for the group A. A meeting management table 3004B is a meeting management table for the group B. A meeting management table 3004C is a meeting management table for the group C. A meeting management table 3004D is a meeting management table for the group D.

The item "facilitator" indicates identification information for identifying the facilitator (user ID of the facilitator) who assists the progress of the meeting held by each group. The user ID of the facilitator may be associated with the terminal apparatus 1B.

The item "group" indicates information for identifying a group. The information for identifying a group may be a group ID, a group name, or the like.

The item "participants" indicates identification information for identifying participants of the meeting (user IDs of the participants). That is, the participants of the meeting are participants belonging to the group having the meeting. The user IDs of the participants may be associated with the terminal apparatus 1A.

The item "title" indicates a content of the meeting such as a name of the meeting or an agenda of the meeting.

The item "start date and time" indicates the date and time when the meeting is scheduled to be started.

The item "end date and time" indicates the date and time when the meeting is scheduled to be ended.

The item "place" indicates a place where the meeting is held such as a name of a meeting room, a name of a branch office, or a name of a building.

The item "password" indicates authentication information for allowing participation in the meeting, and is distributed to the participants in advance.

Content Log Table

FIG. 13 is a conceptual diagram illustrating an example of a content log table. The storage unit 3000 includes a content log storage unit 3005, implemented by a content log table as illustrated in FIG. 13.

The content log table is stored for each group. A content log table 3005A is a content log table for the group A. A content log table 3005B is a content log table for the group B. A content log table 3005C is a content log table for the group C. A content log table 3005D is a content log table for the group D.

The content log table stores a status of the conversation log area 101 and a status of the whiteboard work area 102 in a chronological order, each in association with a status ID.

The item "status ID" is identification information for identifying the status of the conversation log area 101 and the status of the whiteboard work area 102.

The status of the conversation log area 101 indicates which language information is displayed in the conversation log area 101 by the language information ID. For example, when the status ID is s001, the pieces of language information t001 to t002 are displayed in the conversation log area 101. In the corresponding whiteboard work area 102, the content indicated in the whiteboard work area status field identified by the status ID s001 is displayed. Language information t003 is then added to the conversation log area 101. Accordingly, in the whiteboard work area 102 in which the pieces of language information t001 to t003 are displayed, the content indicated in the whiteboard work area status field identified by the status ID s002 is displayed. In this way, the status of the conversation log area 101 and the status of the whiteboard work area 102 are associated with each other.

As described above, the state of the whiteboard work area 102 is indicated by the content table. This allows the terminal apparatus 1 to reproduce the whiteboard work area 102 reflecting the previous status as it is without using an image such as a snapshot. However, the status of the whiteboard work area 102 may be stored as an image such as a snapshot. The entire information display screen 100 may be recorded as a moving image.

Note that the terminal apparatus 1 may record the information stored in the content log storage unit 3005 and transmit the information to the information processing system 3.

Functional Configuration of Terminal Apparatus

Referring back to FIG. 8, a functional configuration of the terminal apparatus 1 will be described. The terminal apparatus 1 includes a first communication unit 11, a voice input unit 12, a hand drafting input unit 13, a morphological analysis unit 14, the searching unit 15, an operation receiving unit 18, an update notifying unit 19, a log storage processing unit 21, a display control unit 22, and a status display unit 23. These units of the terminal apparatus 1 are functions or units implemented by or caused to function by operating one or more hardware components illustrated in FIG. 3 in cooperation with instructions of the CPU 501 according to the program loaded from the HD 504 to the RAM 503. The terminal apparatus 1 also includes a storage unit 1000 implemented by the RAM 503 and the HD 504 illustrated in FIG. 3.

The first communication unit 11 communicates with the information processing system 3 via the network 2. The first communication unit 11 transmits speech data or hand-drafted data to the information processing system 3, and receives language information converted from the speech data or hand-drafted data.

The voice input unit 12 receives input of speech collected at the microphone 518, and acquires speech data as speech information based on the received speech. That is, the voice input unit 12 performs pulse code modulation (PCM) on speech (that is, voice), which is an analog signal, and converts the speech into speech data which is digital data.

The hand drafting input unit 13 detects coordinates of a position where an input device such as a pen is in contact with the touch panel to receive input of stroke data (coordinate point sequence). The hand drafting input unit 13 may receive input of stroke data (coordinate point sequence) in response to an operation with a mouse. The hand drafting input unit 13 connects a plurality of contact coordinates by interpolation into a coordinate point sequence, to generate stroke data. The stroke data is information displayed on a display based on a trajectory of coordinates input with the input device. The stroke data may be interpolated appropriately. The "hand-drafted data" refers to data having one or more pieces of stroke data.

The morphological analysis unit 14 performs morphological analysis on language information with the information processing system 3, and decomposes the language information into words with parts of speech. The morphological analysis is a process of decomposing language information into meaningful minimum units and determining a meaning, a part of speech, etc.

The searching unit 15 searches an illustration storage unit 1002 using a character string of a word or the like obtained by the morphological analysis unit 14 through decomposition. The searching unit 15 acquires an illustration matching the character string from the illustration storage unit 1002.

The display control unit 22 causes the terminal apparatus 1A to display the information display screen 100. The display control unit 22 includes a first display control unit 16 and a second display control unit 17.

The first display control unit 16 displays language information, a list of illustrations, menu icons, etc., in the conversation log area 101 of the information display screen 100. The second display control unit 17 displays language information, a list of illustrations, illustrations, menu icons, etc., in the whiteboard work area 102 of the information display screen 100. The second display control unit 17 of the present embodiment may display a resultant image converted from the language information (text data) in the whiteboard work area 102. Note that the first display control unit 16 and the second display control unit 17 perform similar display control on the information display screen 100 included in the status check screen displayed by the terminal apparatus 1B.

The operation receiving unit 18 receives various operations on the conversation log area 101 or the whiteboard work area 102. Examples of such operations include pressing a menu icon, selecting content, editing content, moving content, and deleting content. Note that the operation receiving unit 18 also receives an operation on the information display screens 100 of the respective groups displayed as a list in the status check screen.

In response to a change in content in the whiteboard work area 102, the update notifying unit 19 notifies the information processing system 3 of information related to the content to share the change with a counterpart terminal apparatus 9. The change in content may include a to-be-shared change related to content such as a location, a size, a color, etc. The counterpart terminal apparatus 9 is an example of the terminal apparatus 1A used by a participant belonging to the same group as the participant associated with the terminal apparatus 1A.

The log storage processing unit 21 stores, in the content log storage unit 3005, the language information in the conversation log area 101 in association with the content in the whiteboard work area 102. That is, the language information displayed in the conversation log area 101 at a certain time is associated with the content in the whiteboard work area 102 by the information processing system 3.

The status display unit 23 displays the home screen and the status check screen for a facilitator in response to login of a user having the facilitator privilege.

Note that the display control unit 22 and the status display unit 23 may be provided in the information processing system 3.

Illustration Table

The illustration storage unit 1002 included in the terminal apparatus 1 may have the same structure as the illustration storage unit 3003 included in the information processing system 3. If the terminal apparatus 1 executes a web application, information to be managed by the illustration storage unit 1002 is downloaded from the information processing system 3 to the terminal apparatus 1 via connection of the terminal apparatus 1 to the information processing system 3. If the terminal apparatus 1 executes a native application, information to be managed by the illustration storage unit 1002 is stored at the native application in advance. If the terminal apparatus 1 executes a native application, information to be managed by the illustration storage unit 1002 may be downloaded.

Example of Information Display Screen

The information display screen 100 displayed by the terminal apparatus 1 will be described with reference to FIG. 14. FIG. 14 is a diagram illustrating an example of an initial state of the information display screen 100 displayed by the terminal apparatus 1A. The information display screen 100 may be of a web application or a native application.

The information display screen 100 includes the conversation log area 101, the whiteboard work area 102, a tool display field 103, and a speech recognition result display field 110.

The tool display field 103 displays various tools. The tools include a content selection tool 111, a pen tool 112 for hand-drafting input, a graphic tool 113 for drawing figures, a text tool 114 for inputting characters, and a lasso tool 115. The above-described tools are merely examples. The tools also include a display switch tool 116 for switching display or non-display of the conversation log area 101. When the display switch tool 116 is pressed, the conversation log area 101 is closed, and the whiteboard work area 102 is displayed in larger size.

The conversation log area 101 displays the language information converted from the speech data in a chronological order.

When new language information is added to the conversation log area 101, the old language information is moved from an upper position to a lower position. The language information that has reached the bottom of the conversation log area 101 is scrolled out. Even if the language information is scrolled out, the previous language information is displayed in response to the user operating the scroll bar.

The speech recognition result display field 110 displays, in real time therein, language information converted from speech data acquired by the voice input unit 12 of the terminal apparatus 1A. The language information being displayed in the speech recognition result display field 110 may also be shared with the counterpart terminal apparatus 9. For the language information being displayed in the speech recognition result display field 110, an illustration is automatically displayed. For example, when the status where no speech is detected continues for a predetermined time period, the language information being displayed in the speech recognition result display field 110 is transmitted to the information processing system 3. The information processing system 3 transmits an instruction to display the converted language information in the conversation log area 101 to each terminal apparatus 1A, such that the language information is shared with the other terminal apparatuses.

The user can input any content to the whiteboard work area 102. That is, the user can use the whiteboard work area 102, as an electronic whiteboard. As will be described later, the user can copy the language information displayed in the conversation log area 101 to the whiteboard work area 102.

The user may adjust the positions or sizes of the conversation log area 101 and the whiteboard work area 102. For example, the user may switch the positions of the conversation log area 101 and the whiteboard work area 102, between left and right of the screen. When the user increases the display size of the whiteboard work area 102, the conversation log area 101 may be reduced in size accordingly. The same applies when the user changes the display size of the conversation log area 101. The whiteboard work area 102 may be larger than the display 506 in displayable size. In such case, the display 506 displays a part of the whiteboard work area 102 on the display 506 in response to an operation of the user.

Speech Recognition and Sharing of Language Information

Processing of sharing language information converted from speech data, by each terminal apparatus 1A participating in a meeting, will be described with reference to FIG. 15. FIG. 15 is a sequence diagram illustrating an example of processing of transmitting speech data from the terminal apparatus 1A to the information processing system 3 and sharing language information converted from the speech data at the information processing system 3 with the counterpart terminal apparatus 9. The terminal apparatus 1A and the counterpart terminal apparatus 9 participate in the same meeting, for example, by each connecting to a URL transmitted by an e-mail invitation or the like. The information processing system 3 manages the plurality of terminal apparatuses 1A participating in the same meeting, by using user IDs, IP addresses, or the like. Alternatively, each user at the terminal apparatus 1 may select a particular meeting registered in the meeting management table and input a preset password, to participate in the same meeting. In such case, the information processing system 3 also manages the plurality of terminal apparatuses 1A participating in the same meeting, by using user IDs, IP addresses, or the like.

S101: The voice input unit 12 of the terminal apparatus 1A receives input of voice (speech) uttered by the user.

S102: The voice input unit 12 transmits speech data, which is digital data converted from the voice, to the information processing system 3 via the first communication unit 11.

S103: The second communication unit 31 of the information processing system 3 receives the speech data. The conversion unit 32 performs speech recognition on the speech data to convert the speech data into language information.

S104, S105: The second communication unit 31 transmits the language information to the terminal apparatus 1A and the counterpart terminal apparatus 9 participating in the meeting. Since the speech recognition is performed in real time, the content of the speech may not be determined at this time.

S106, S107: The first communication unit 11 of the terminal apparatus 1A and the first communication unit 11 of the counterpart terminal apparatus 9 each receive the language information. At each of the terminal apparatus 1A and the counterpart terminal apparatus 9, the first display control unit 16 displays the undetermined language information in the speech recognition result display field 110 upon receipt of the language information.

S108: The conversation management unit 33 stores the language information ID (newly assigned number), the language information, the input time, the speaker (the user who has logged in), and the number of likes (the initial value is 0) in the conversation table, in response to detection of a break of the utterance by the user based on a period of time for not receiving any voice or the like.

S109, S110: The second communication unit 31 transmits the language information ID, the language information, and the input time to the terminal apparatus 1A and the counterpart terminal apparatus 9.

S111, S112: The first communication unit 11 of the terminal apparatus 1A and the first communication unit 11 of the counterpart terminal apparatus 9 each receive the language information ID, the language information, and the input time. At each of the terminal apparatus 1A and the counterpart terminal apparatus 9, the first display control unit 16 additionally displays new language information in the conversation log area 101.

S113, S114: As the display of the conversation log area 101 has changed, the log storage processing unit 21 acquires the language information ID of the language information currently displayed in the conversation log area 101, as the status of the conversation log area 101. In addition, the log storage processing unit 21 acquires the content data being displayed in the whiteboard work area 102, as the status of the whiteboard work area 102. The content data may be acquired from the information processing system 3, or may be acquired from the content being displayed by the terminal apparatus 1A.

S115, S116: At each of the terminal apparatus 1A and the counterpart terminal apparatus 9, the log storage processing unit 21 requests the information processing system 3 to store the status of the conversation log area 101 and the status of the whiteboard work area 102 in association with each other in the content log storage unit 3005.

S117: The content management unit 34 stores the status of the conversation log area 101 and the status of the whiteboard work area 102 in the content log storage unit 3005 in association with each other.

Copying of Language Information from Conversation Log Area to Whiteboard Work Area An example display of content in the whiteboard work area 102 using language information in the conversation log area 101 will be described with reference to FIGS. 16A to 16D. FIGS. 16A to 16D are schematic diagrams illustrating an example of processing of copying language information from the conversation log area 101 to the whiteboard work area 102, performed by the terminal apparatus 1A in response to a user operation.

Figure 16A:
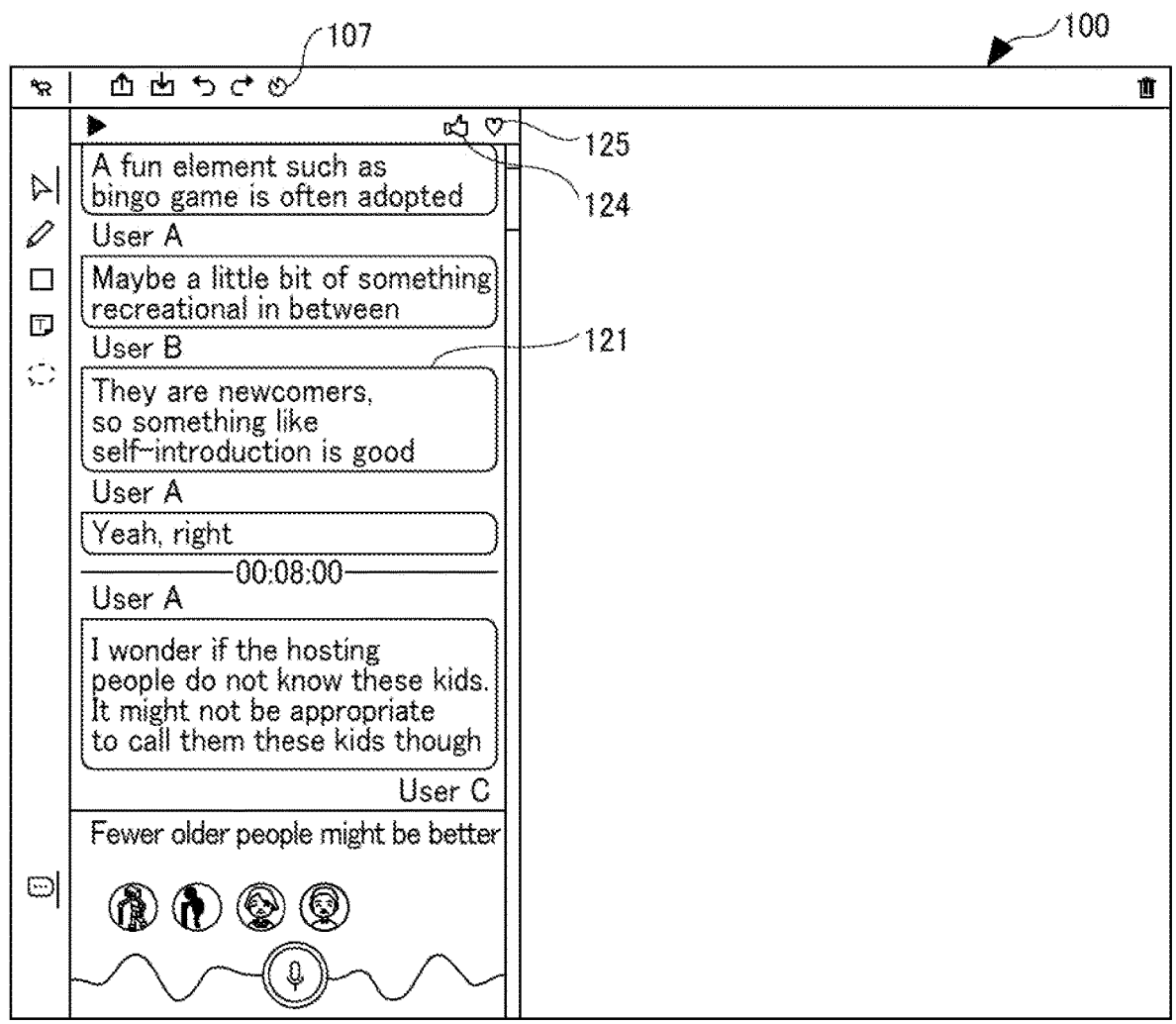
FIGS. 16A to 16D are schematic diagrams illustrating an example of processing of copying language information from a conversation log area to a whiteboard work area, performed by the terminal apparatus in response to a user operation.

FIG. 16A illustrates the conversation log area 101 displaying some pieces of language information. While the whiteboard work area 102 does not display any content in this example, the whiteboard work area 102 may display any content. The user selects (taps or clicks) any language information (for example, language information 121) in the conversation log area 101 to use the language information in the whiteboard work area 102. The selected language information 121 is decomposed into character strings one by one by morphological analysis. The searching unit 15 searches the illustration storage unit 1002 using the decomposed character strings.

Figure 16B:
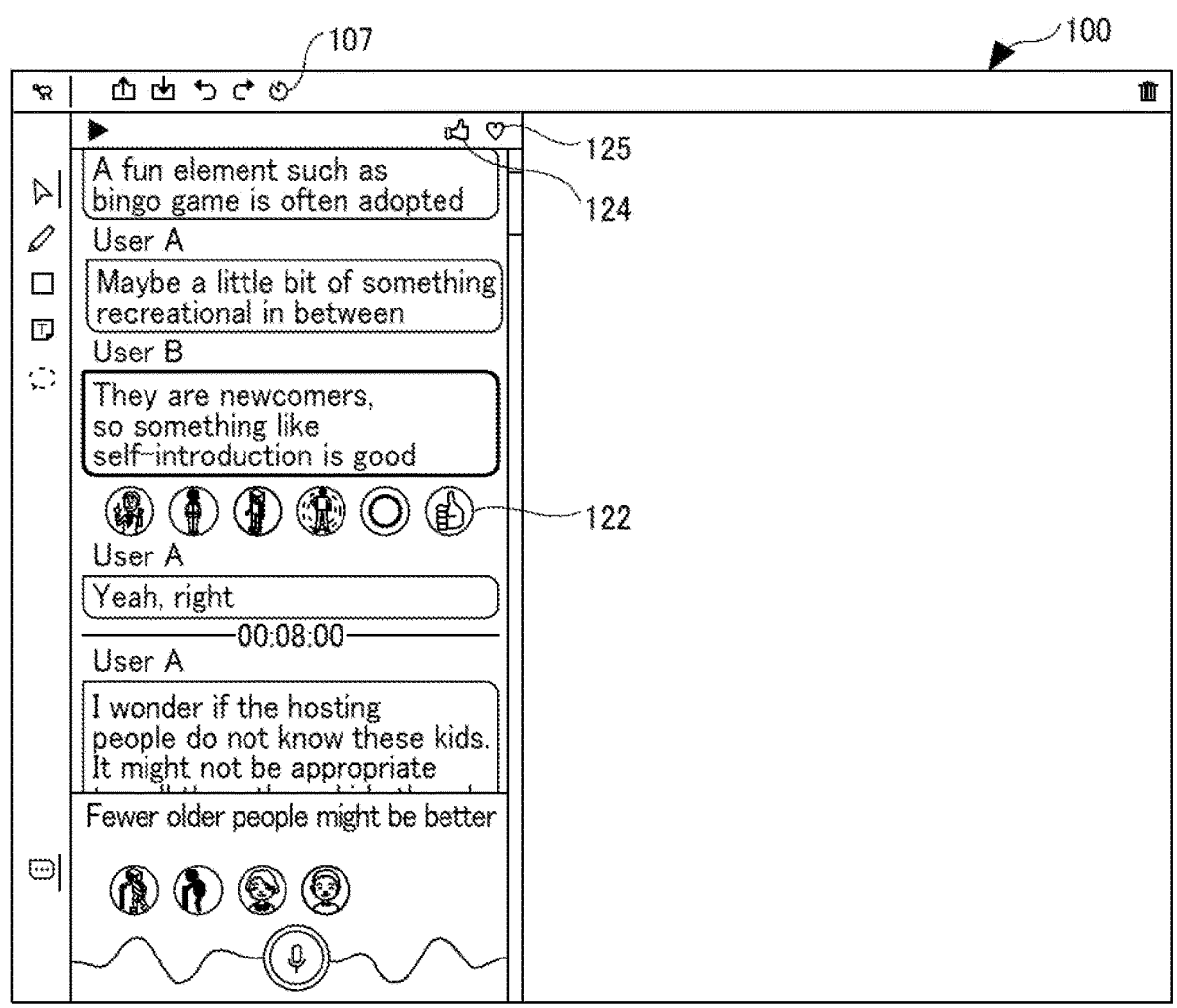

As illustrated in FIG. 16B, the first display control unit 16 displays a list 122 of illustrations (illustration list 122) related to the selected language information 121, near the selected language information 121 in the conversation log area 101. The illustration list 122 includes thumbnails of a plurality of illustrations or a thumbnail of one illustration. The user can select an illustration to be displayed in the whiteboard work area 102 from the illustration list 122. The user may drag and drop the selected illustration into the whiteboard work area 102. Alternatively, the user may simply select an illustration from the illustration list 122, so that the selected illustration is displayed in the whiteboard work area 102.

The illustration displayed in the whiteboard work area 102 is an example of content based on a user selection.

The user may select an illustration from the illustration list 122, which is generated in response to an utterance of another user, in addition to or in alternative to the illustration list 122 generated based on the utterance of the user himself or herself. With this selection, the other user knows that his or her utterance has been referred to, and can feel that he or she actively participates in the meeting. It is assumed that the user does not select any illustration in FIG. 16B.

The terminal apparatus 1A may store illustrations corresponding to the language information displayed in the speech recognition result display field 110, and display the illustrations in the form of the illustration list 122. This can shorten a period of time from the time when the user selects the language information 121, to the time when the illustration list 122 is displayed.

Figure 16C:
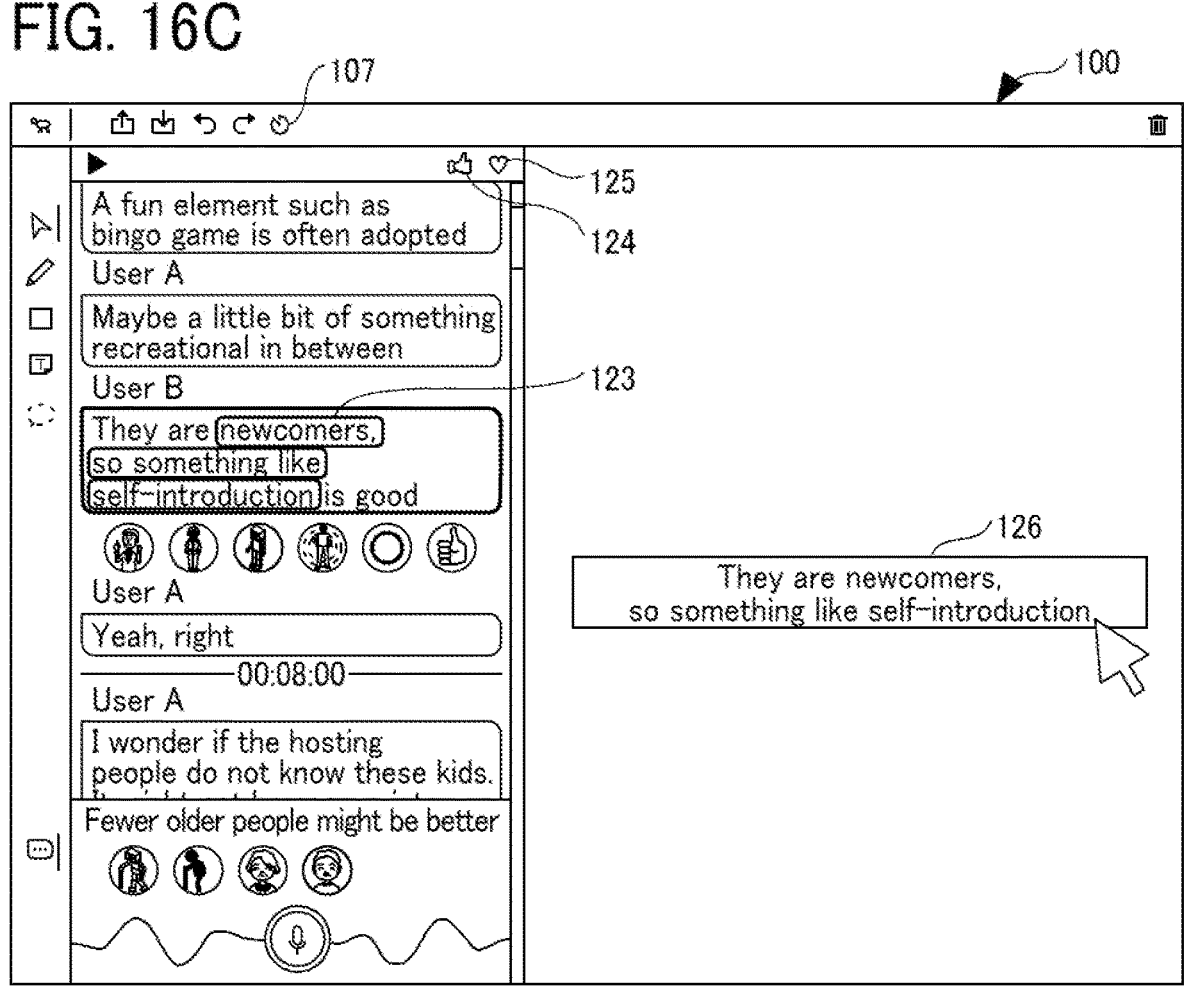
Figure 16D:
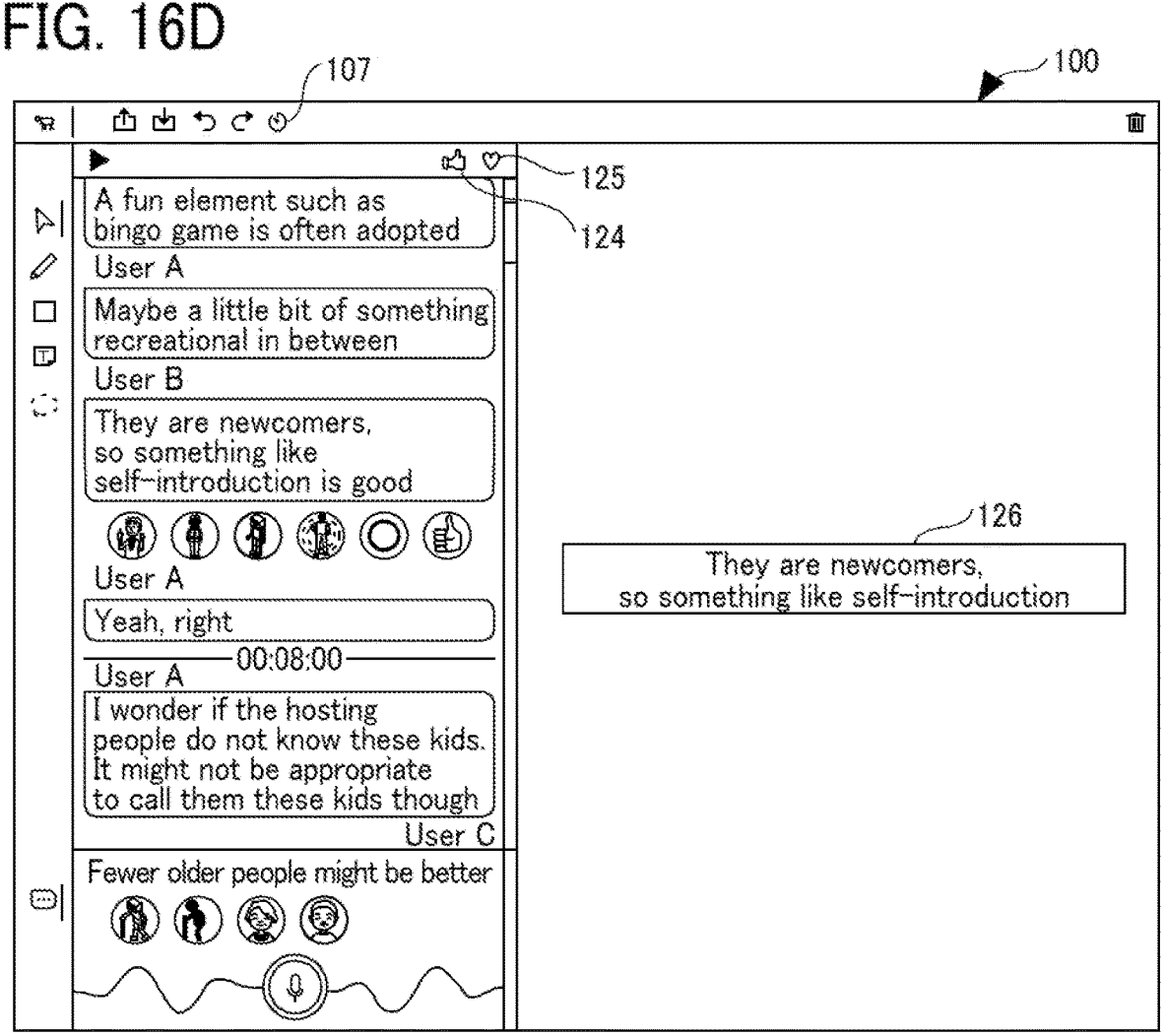

As illustrated in FIG. 16C, the user selects a character string 123 which is a part of the language information, and drags and drops a copy of the character string 123 (hereinafter referred to as a character string 126) from the conversation log area 101 to the whiteboard work area 102. FIG. 16D illustrates the character string 126 displayed in the whiteboard work area 102. The character string 126 is an example of content based on a user selection on the language information. This allows the user to understand how his or her utterance affects the content of the whiteboard work area 102.

The user can also cause the character string 123 to be displayed in the whiteboard work area 102, by clicking on a part of or entire character string 126 and then clicking on the whiteboard work area 102. The illustrations in the illustration list 122 may also be displayed in the whiteboard work area 102, by either dragging and dropping or by clicking by the user.

As described above, input operation to the whiteboard work area 102 is reduced, as the user can use the language information in the conversation log area 101. The user can further move the character string 126 to a different position, or rotate the character string by any angle.

As illustrated in FIG. 16A, a like button 124 and a favorite button 125 are displayed for each language information in the conversation log area 101. The like button 124 and the favorite button 125 may be displayed at all times, or may be displayed when the user selects particular language information or performs mouse-over operation on particular language information. When the user presses the like button 124, the language information ID and information indicating that the like button has been pressed are transmitted to the information processing system 3, and the number of likes in the conversation table is increased by one.

As illustrated in FIG. 16D, when content is added to the whiteboard work area 102, the update notifying unit 19 transmits the type, page, coordinates, size, font size, and language information ID of the content to the information processing system 3 via the first communication unit 11. Since the content management unit 34 transmits one record of the content table, which is newly added, to the counterpart terminal apparatus 9, the terminal apparatus 1A can share the current status of the whiteboard work area 102 with the counterpart terminal apparatus 9.

Figure 17:
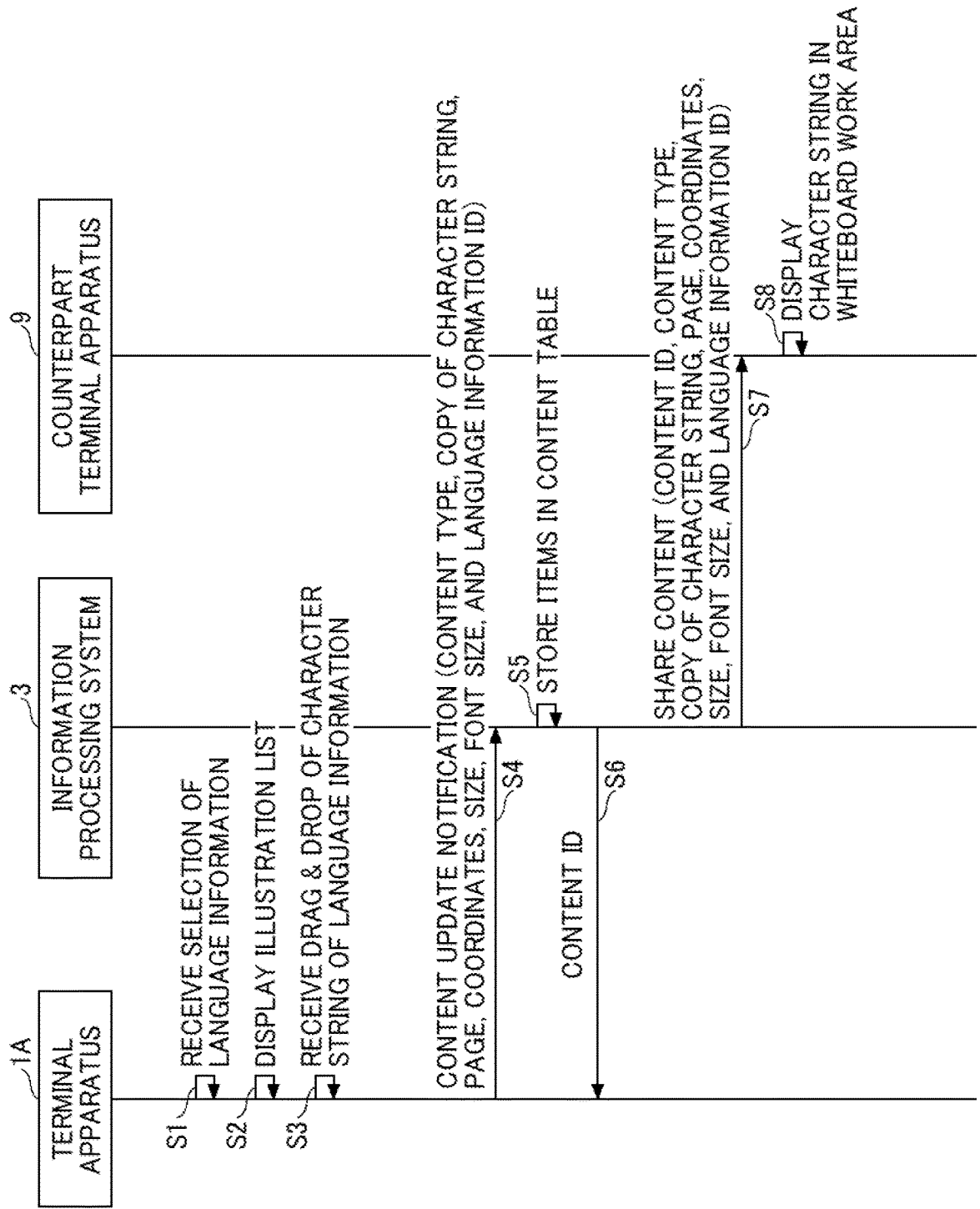
FIG. 17 is a sequence diagram illustrating an example of processing of copying language information from the conversation log area to the whiteboard work area, performed by the terminal apparatus in response to a user operation.

FIG. 17 is a sequence diagram illustrating an example of processing of copying language information from the conversation log area 101 to the whiteboard work area 102, performed by the terminal apparatus 1A in response to a user operation.

S1: In response to the user selecting the language information 121 in the conversation log area 101, the operation receiving unit 18 receives the selection by the user.

S2: The morphological analysis unit 14 performs morphological analysis on the language information 121, and decomposes the language information 121 into character strings. The morphological analysis does not have to be performed, such that the morphological analysis unit 14 may extract just Chinese characters from the language information, if the language information is written in Japanese written in mixture of "Kana" characters and Chinese characters. The searching unit 15 searches the illustration storage unit 1002 using each character string as a keyword. The first display control unit 16 displays the illustration list 122, which lists illustrations associated with each keyword used for the search, near the selected language information 121.

S3: The user drags and drops a copy of a part of the character string 123 of the language information, to the whiteboard work area 102, as the character string 126. The operation receiving unit 18 receives this user operation, and the second display control unit 17 displays the character string 126 at a dropped destination.

S4: The update notifying unit 19 detects that the status of the whiteboard work area 102 has been changed. The update notifying unit 19 transmits a content update notification (content type, character string 126, page, coordinates, size, font size, and language information ID) to the information processing system 3 via the first communication unit 11.

S5: The second communication unit 31 of the information processing system 3 receives the content update notification. The content management unit 34 assigns a content ID to the copied content and stores the content ID in the content table for the corresponding group together with items of the content update notification.

S6: The second communication unit 31 of the information processing system 3 transmits the content ID to the terminal apparatus 1A.

S7: As a change has occurred in the content table, the content management unit 34 transmits a content sharing request (content ID, content type, character string 126, page, coordinates, size, font size, and language information ID) to the counterpart terminal apparatus 9 participating in the same meeting.

S8: The first communication unit 11 of the counterpart terminal apparatus 9 receives the content sharing request. The second display control unit 17 displays the character string 126 at the position indicated by the coordinates, in a font having the specified font size.

Full Text Copy of Language Information from Conversation Log Area to Whiteboard Work Area An example display of content in the whiteboard work area 102 using language information in the conversation log area 101 will be described with reference to FIGS. 18A to 18D. FIGS. 18A to 18D are schematic diagrams illustrating an example of processing of copying full text of language information from the conversation log area 101 to the whiteboard work area 102, performed by the terminal apparatus 1A in response to a user operation. Note that differences of FIGS. 18A to 18D from FIGS. 16A to 16D are mainly described.

Figure 18A:
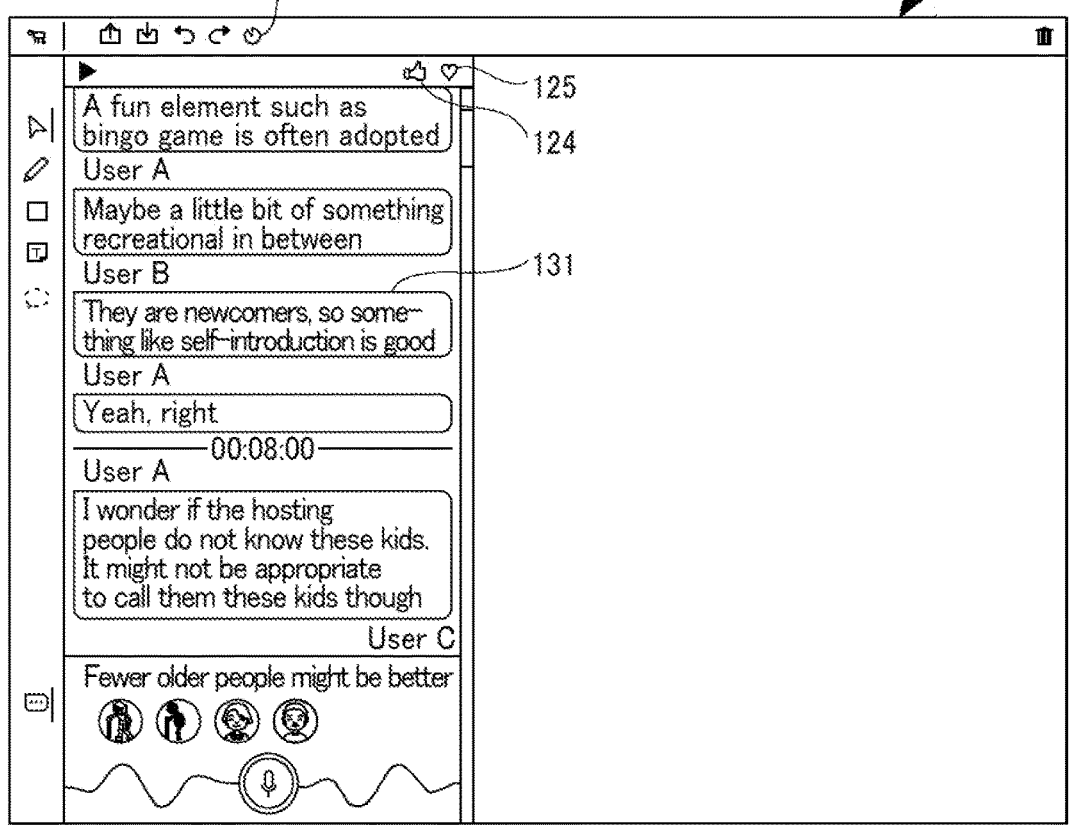
FIGS. 18A to 18D are schematic diagrams illustrating an example of processing of copying full text of language information from the conversation log area to the whiteboard work area, performed by the terminal apparatus in response to a user operation.
Figure 18B:
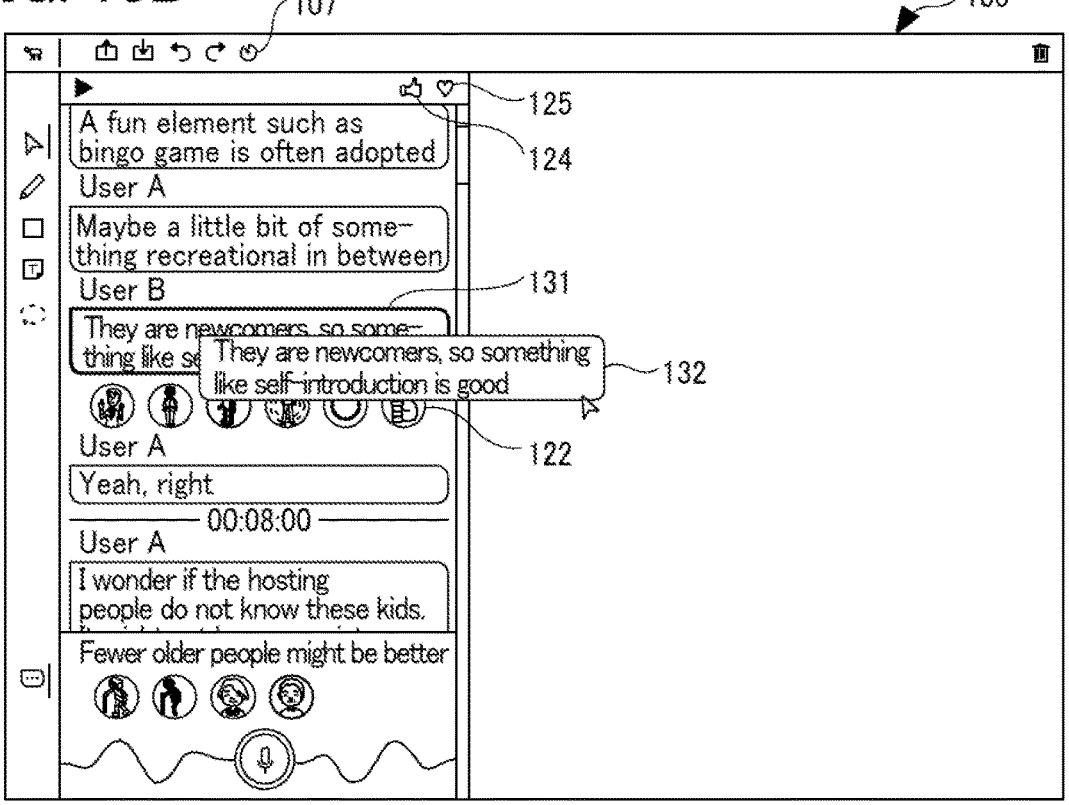

FIG. 18A is substantially the same as FIG. 16A. In FIG. 18B, the entire copy of one language information 131 (hereinafter referred to as language information 132) is dragged. When the user hovers a mouse pointer, the first display control unit 16 does not move the language information in the conversation log area 101. This prevents the language information 131 to be copied, from moving, thus preventing operability from decreasing.

Figure 18C:
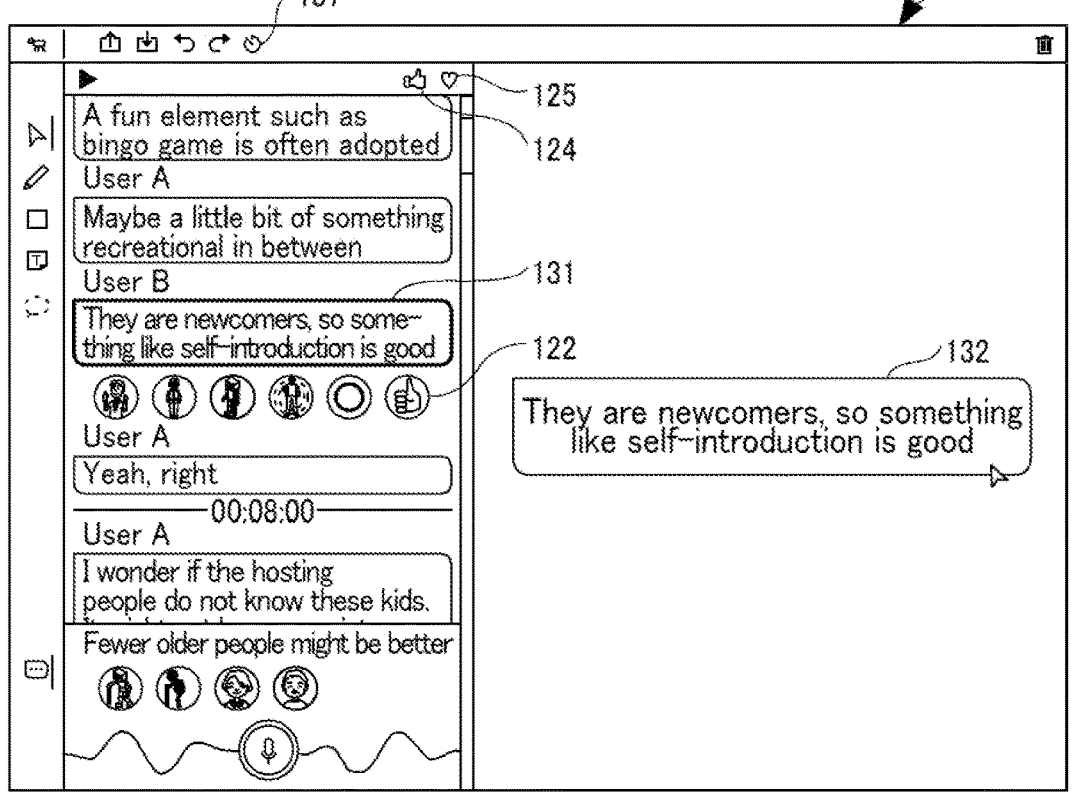
Figure 18D:
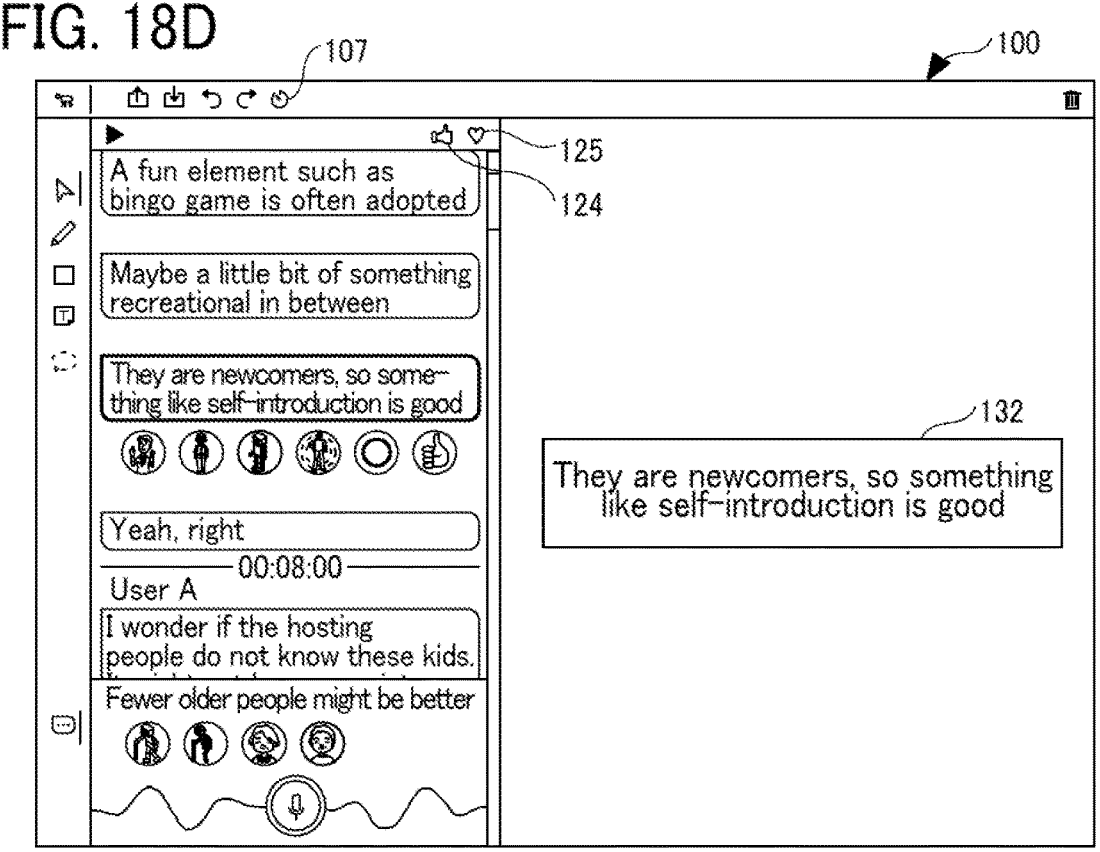

In FIG. 18C, one language information 132 is continuously dragged. FIG. 18D illustrates a state in which the user has dropped the language information 132. In this way, the user can copy the entire language information 131 in the conversation log area 101 to the whiteboard work area 102. As will be described later, since the user can also perform morphological analysis on the language information in the whiteboard work area 102, the user can use the character strings included in the language information 131, without dragging and dropping a desired character string alone.

The processing flow of FIGS. 18A to 18D may be substantially the same as that of FIG. 17 except that the number of characters copied to the whiteboard work area 102 is different.

Figure 19A:
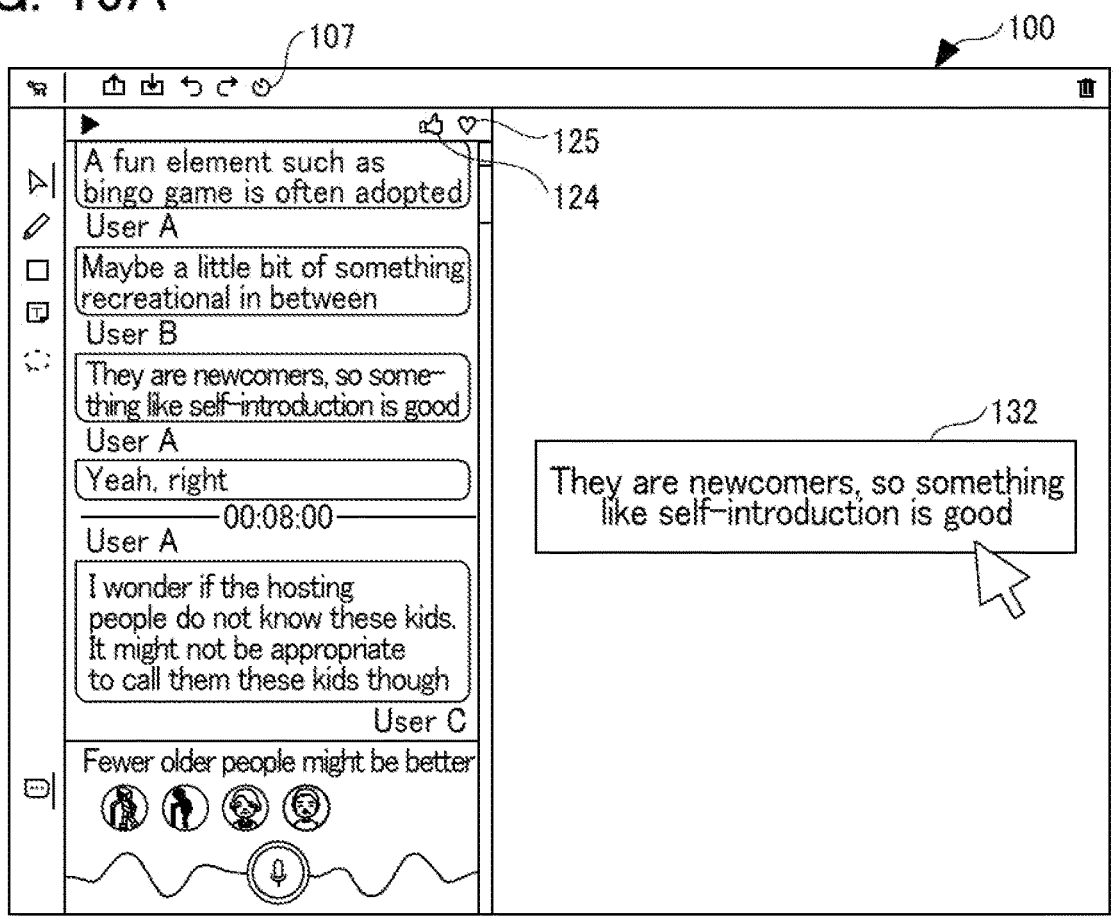
FIGS. 19A to 19C are diagrams illustrating a display example of an illustration obtained by a search based on the language information copied to the whiteboard work area.
Figure 19B:
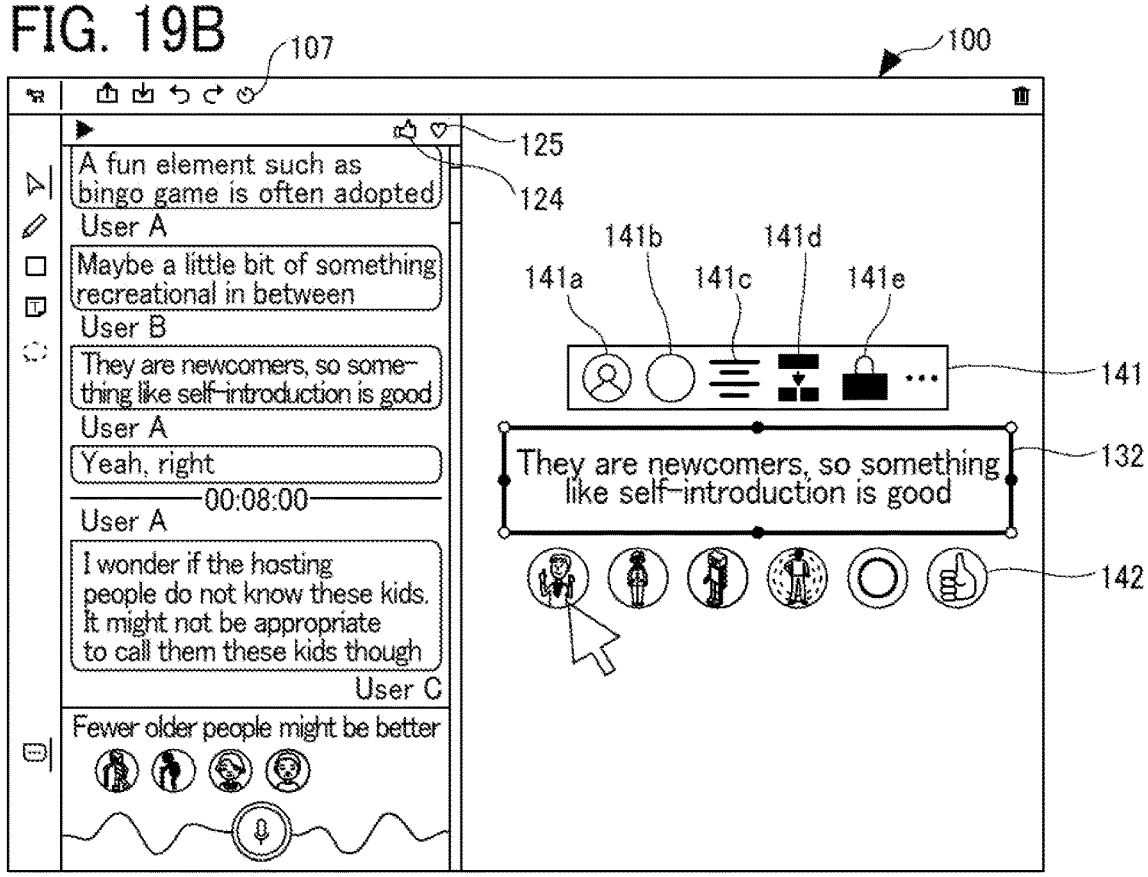
Figure 19C:
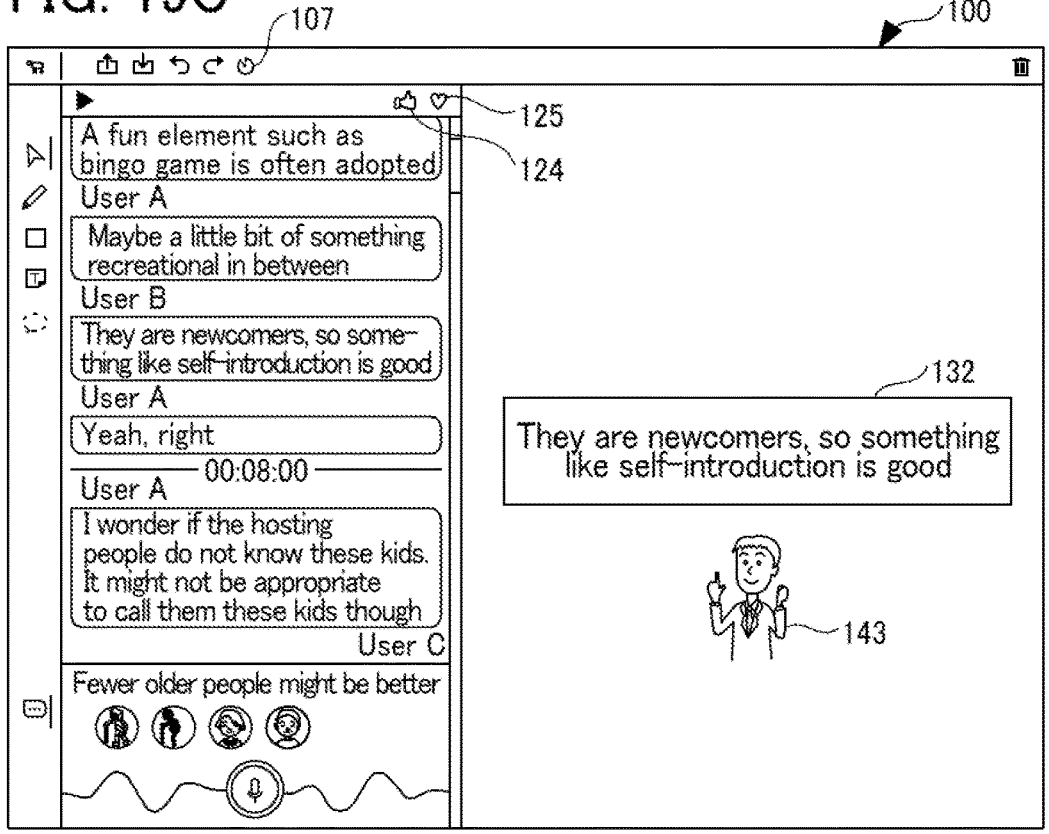

Displaying Illustration Based on Language Information in Whiteboard Work Area A display example of an illustration based on language information in the whiteboard work area 102 will be described with reference to FIGS. 19A to 19C according to the embodiment. FIGS. 19A to 19C are diagrams illustrating a display example of an illustration obtained by the search based on the language information copied to the whiteboard work area 102.

During the discussion in the meeting, the user directly inputs language information to the whiteboard work area 102, or places language information selected from the conversation log area 101 in the whiteboard work area 102. If the illustration related to the language information is displayed along the language information, the content of the language information becomes easy to understand.

As illustrated in FIG. 19A, the user selects (taps or clicks) the language information 132 in the whiteboard work area 102. The selected language information 132 is decomposed into character strings one by one by morphological analysis. The searching unit 15 searches the illustration storage unit 1002 using the decomposed character strings.

As illustrated in FIG. 19B, the second display control unit 17 displays a list 142 of illustrations (illustration list 142) related to the language information 132 and menu icons 141, near the selected language information 132 in the whiteboard work area 102. The menu icons 141 include a user ID display icon 141a, a color setting icon 141b for setting language information and frames, a language information centering icon 141c, a morphological analysis icon 141d, and a language information fixing icon 141e, etc. The above-described icons are merely examples.

The user can select an illustration to be displayed in the whiteboard work area 102 from the illustration list 142. As illustrated in FIG. 19C, the second display control unit 17 displays a selected illustration 143. The illustration 143 is an example of content based on a user selection on language information. The size of the illustration 143 is determined in advance, but can be changed as appropriate by the user.

By selecting the illustration 143 from the displayed illustration list 142, the user can smoothly add visual information to help convey the content during the meeting, without searching for a suitable illustration by himself or herself. The user can move the illustration 143 to a different position, or rotate the illustration 143 by any angle.

Figure 20:
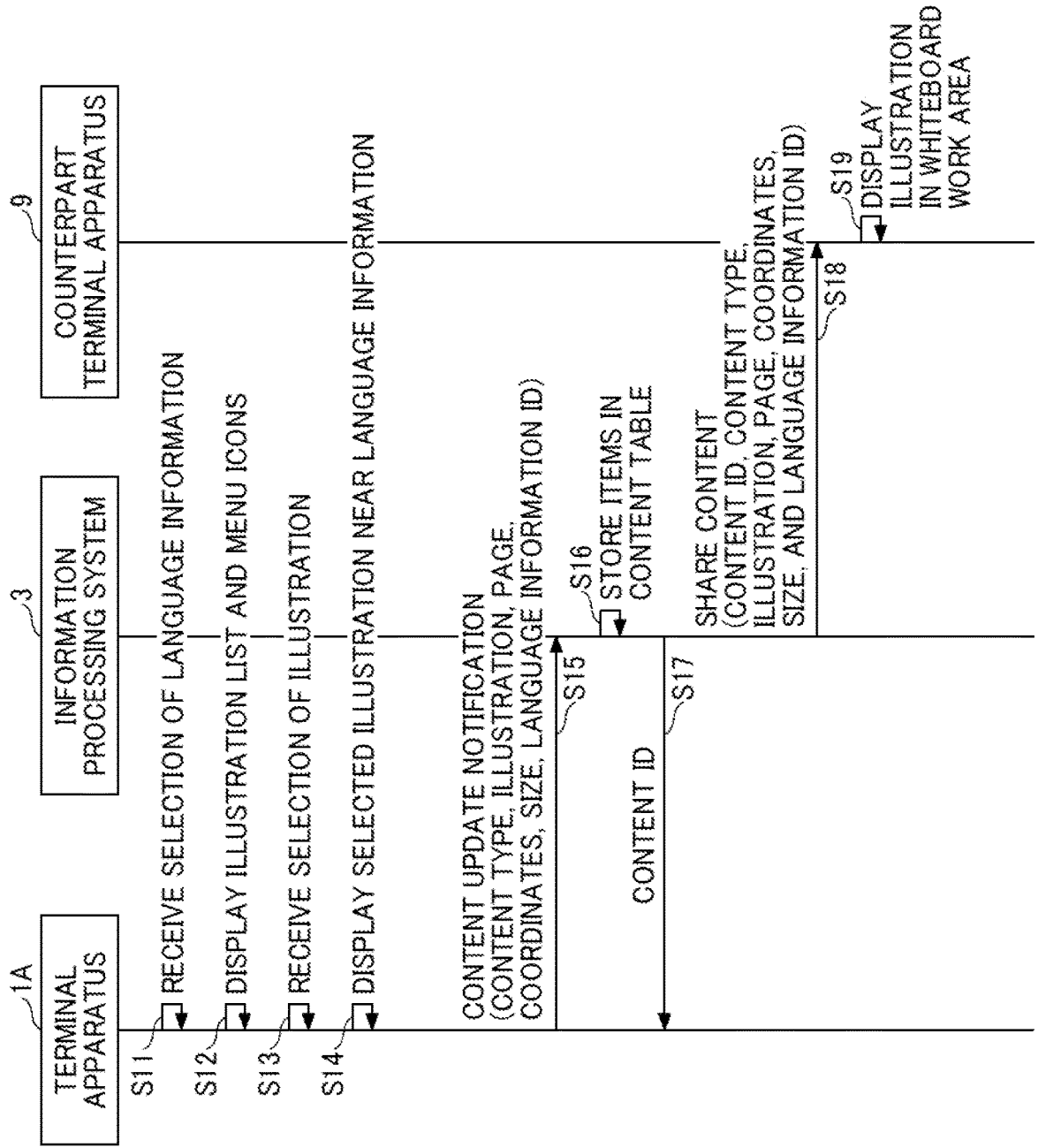
FIG. 20 is a sequence diagram illustrating an example of processing of displaying an illustration based on language information in the whiteboard work area, performed by the terminal apparatus in response to a user operation.

FIG. 20 is a sequence diagram illustrating an example of processing of displaying an illustration based on language information in the whiteboard work area 102, performed by the terminal apparatus 1A in response to a user operation.

S11: In response to the user selecting the language information 132 in the whiteboard work area 102, the operation receiving unit 18 receives the selection by the user.

S12: The morphological analysis unit 14 performs morphological analysis on the language information 132, and decomposes the language information 132 into character strings.

The morphological analysis does not have to be performed, such that the morphological analysis unit 14 may extract just Chinese characters from the language information, if the language information is written in Japanese written in mixture of "Kana" characters and Chinese characters. The searching unit 15 searches the illustration storage unit 1002 using each character string as a keyword. The second display control unit 17 displays the menu icons 141 and the illustration list 142, which lists illustrations associated with each keyword used for the search, near the selected language information 132.

S13: The user selects any illustration from the illustration list 142. The operation receiving unit 18 receives the selection of the illustration.

S14: The second display control unit 17 displays the selected illustration 143, near the language information 132 in the whiteboard work area 102.

S15: The update notifying unit 19 detects that the status of the whiteboard work area 102 has been changed. The update notifying unit 19 transmits a content update notification (content type, illustration, page, coordinates, size, and language information ID) to the information processing system 3 via the first communication unit 11.

S16: The second communication unit 31 of the information processing system 3 receives the content update notification. The content management unit 34 assigns a content ID to the content, and stores the content ID in the content table together with items of the content update notification.

S17: The second communication unit 31 of the information processing system 3 transmits the content ID to the terminal apparatus 1A.

S18: As a change has occurred in the content table, the content management unit 34 transmits a content sharing request (content ID, content type, illustration, page, coordinates, size, and language information ID) to the counterpart terminal apparatus 9 participating in the same meeting.

S19: The first communication unit 11 of the counterpart terminal apparatus 9 receives the content sharing request. The second display control unit 17 displays the illustration 143 at a position indicated by the coordinates.

Reference to Conversation Log Area from Content in Whiteboard Work Area

Figure 21A:
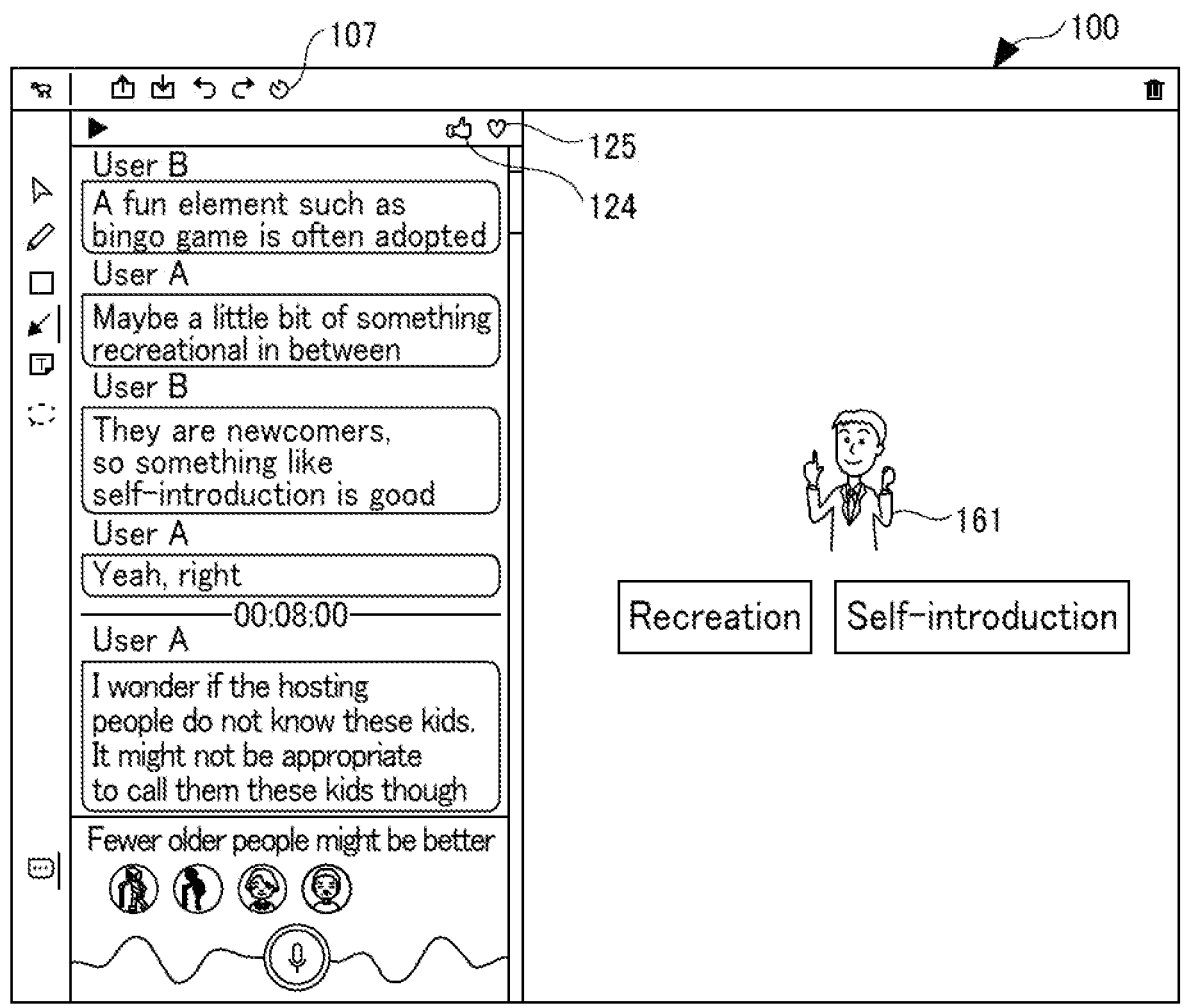
FIGS. 21A to 21C are diagrams illustrating an example of language information in the conversation log area, which is displayed with emphasis when the corresponding content in the whiteboard work area is selected.
Figure 21B:
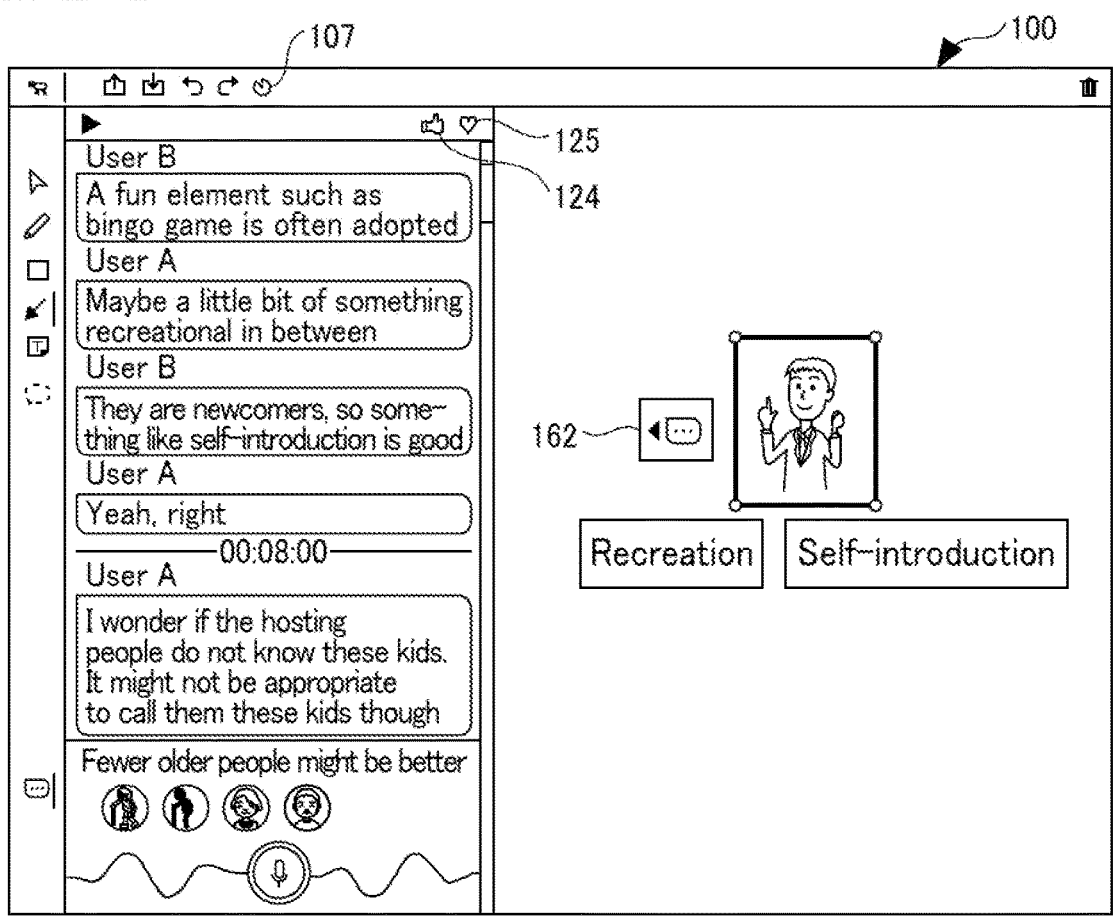
Figure 21C:
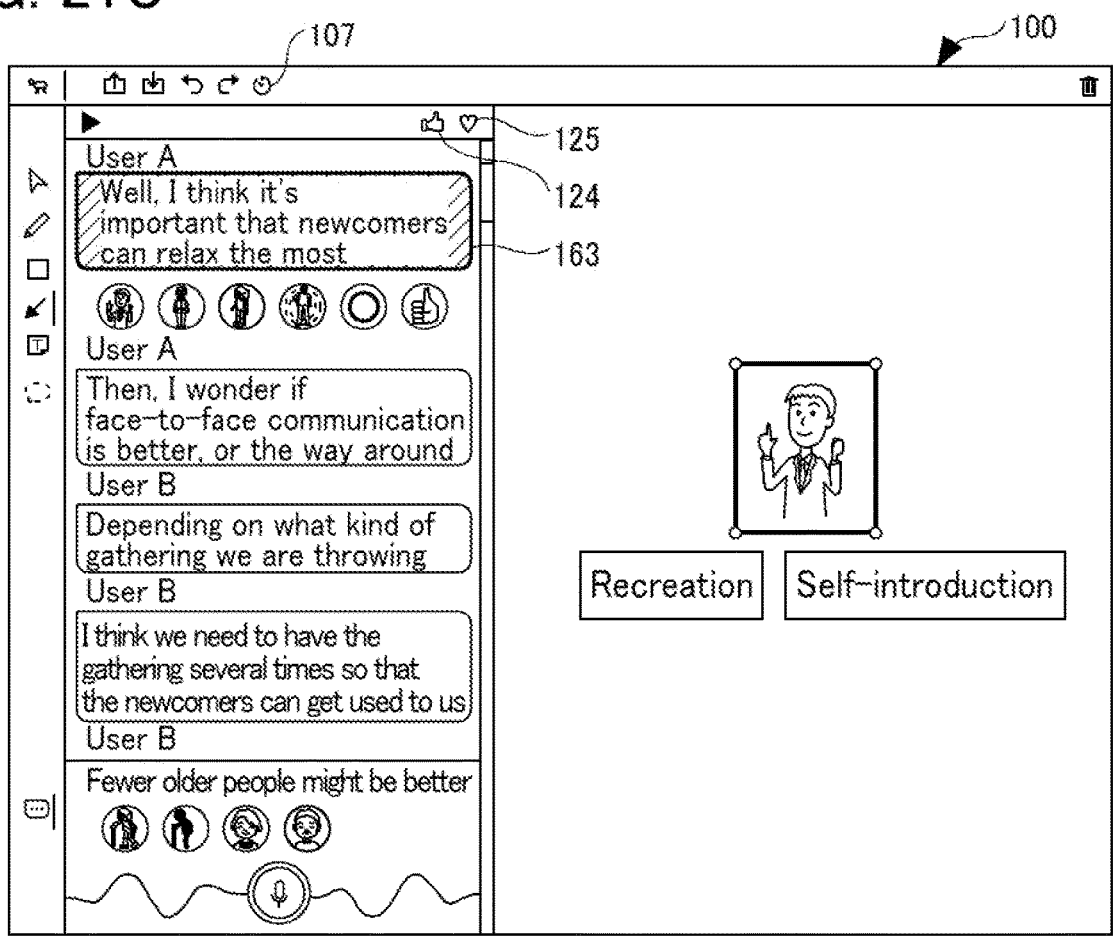

A method of referring to the conversation log area 101 from the content in the whiteboard work area 102 will be described with reference to FIGS. 21A to 21C. FIGS. 21A to 21C are diagrams illustrating an example of language information in the conversation log area 101, which is displayed with emphasis when the corresponding content in the whiteboard work area 102 is selected.

As the discussion progresses, it would be helpful to review at which scene during the meeting each content in the whiteboard work area 102 was generated. The first display control unit 16 displays the language information associated with the content selected in the whiteboard work area 102, with emphasis in the conversation log area 101.

First, as illustrated in FIG. 21A, the user selects content in the whiteboard work area 102. In this example, it is assumed that the user selects (taps or clicks) an illustration 161. Accordingly, as illustrated in FIG. 21B, the second display control unit 17 displays a related information check icon 162 near the illustration 161. The user presses the related information check icon 162. Consequently, as illustrated in FIG. 21C, the first display control unit 16 displays language information 163 having the language information ID of the selected illustration 161 in the conversation log area 101 with emphasis. If the language information 163 is scrolled out, the first display control unit 16 scrolls back to display the language information 163 in the vicinity of the center of the conversation log area 101 with emphasis.

The selected illustration 161 may not have a language information ID, if the user directly inputs the illustration 161 to the whiteboard work area 102. In such case, the first display control unit 16 displays with emphasis the language information having the date and time near the date and time when the selected illustration 161 is arranged (or within a certain period of time from the date and time when the selected illustration 161 is arranged).

Note that displaying the language information with emphasis means to display the language information in bold font, display the language information in different color, or scrolling a display area to make the language information visible.

Figure 22:
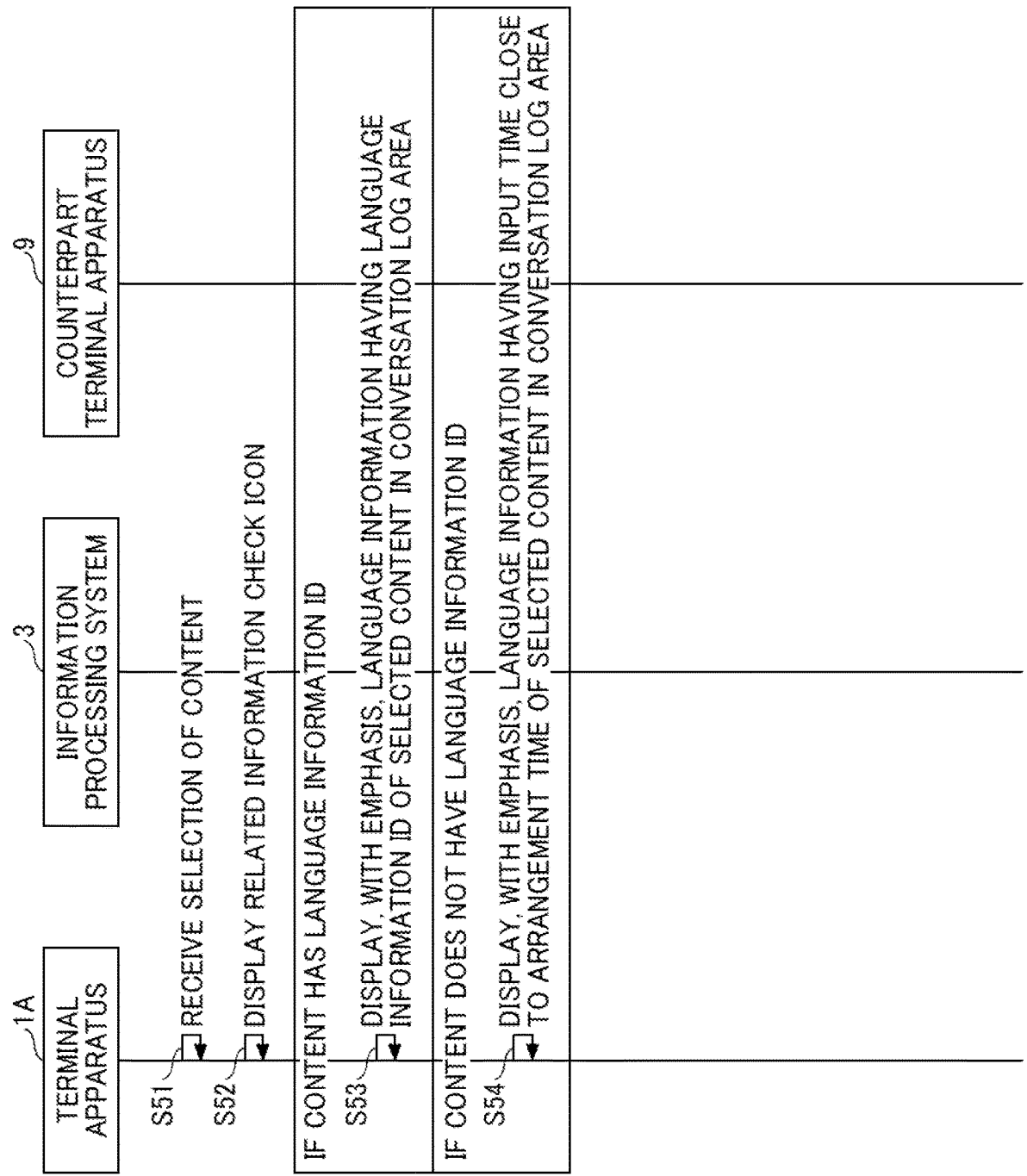
FIG. 22 is a sequence diagram illustrating an example of processing of displaying, with emphasis, the language information corresponding to the content in the whiteboard work area, performed by the terminal apparatus in response to a user operation.

FIG. 22 is a sequence diagram illustrating an example of processing of displaying, with emphasis, the language information corresponding to the content in the whiteboard work area 102, performed by the terminal apparatus 1A in response to a user operation.

S51: In response to the user selecting the content (illustration 161) in the whiteboard work area 102, the operation receiving unit 18 receives the selection by the user.

S52: The second display control unit 17 displays the related information check icon 162 for the selected illustration 161.

S53: If the selected illustration 161 has the language information ID in the content table, the first display control unit 16 displays, with emphasis, the language information 163 having the language information ID of the selected illustration 161 in the conversation log area 101.

S54: If the selected illustration 161 does not have the language information ID in the content table, the first display control unit 16 displays, with emphasis, the language information associated with an input time close to the arrangement time of the selected illustration 161 in the conversation log area 101. The phrase "time close to the arrangement time of the selected content" may be the input time within a predetermined period of time from a time immediately before the arrangement time.

This is because the content derived from the language information in the conversation log area 101 is arranged in the whiteboard work area 102 after the language information. The predetermined period of time from the time immediately before the arrangement time may be a period of time, at the maximum, from the time when one piece of language information is displayed to the time when this language information is scrolled out, but may be set to about ½ to ¼ of the maximum value, for example.

Note that the status of the conversation log area 101 is not shared with the counterpart terminal apparatus 9. This is because if the status of the conversation log area 101 is shared, the language information may be scrolled, against the intension of the user viewing the conversation log area 101 at the counterpart terminal apparatus 9. However, when the plurality of users review the meeting together or the like, the status of the conversation log area 101 may be shared with the counterpart terminal apparatus 9 according to the user settings.

Filtering by Terminal Apparatus

The number of pieces of language information in the conversation log area 101 increases as the discussion progresses. This makes reviewing difficult. Therefore, the first display control unit 16 has a function of filtering the language information in the conversation log area 101. Examples of a filtering method include followings.

One method is to filter the pieces of language information by the name of the user (user ID) (filtering by the speaker of the language information).

Another method is to filter the pieces of language information for which the number of times the like button is pressed in the conversation log area 101 exceeds a certain number. Another method is to filter the pieces of language information that are registered in a favorite language information table of the user. Another method is to filter the pieces of language information by the input times (uttered times) of the pieces of language information in the conversation log area 101.

A the time of filtering, it is also effective that the second display control unit 17 limits the content to be displayed in the whiteboard work area 102 to the content derived from the language information filtered in the conversation log area 101. The second display control unit 17 displays the content associated with the language information ID of the filtered language information, and does not display the other content.

Alternatively, the second display control unit 17 may decrease the saturation or transmittance of the content that is not associated with the language information ID of the filtered language information to make the content less recognizable.

Figure 23:
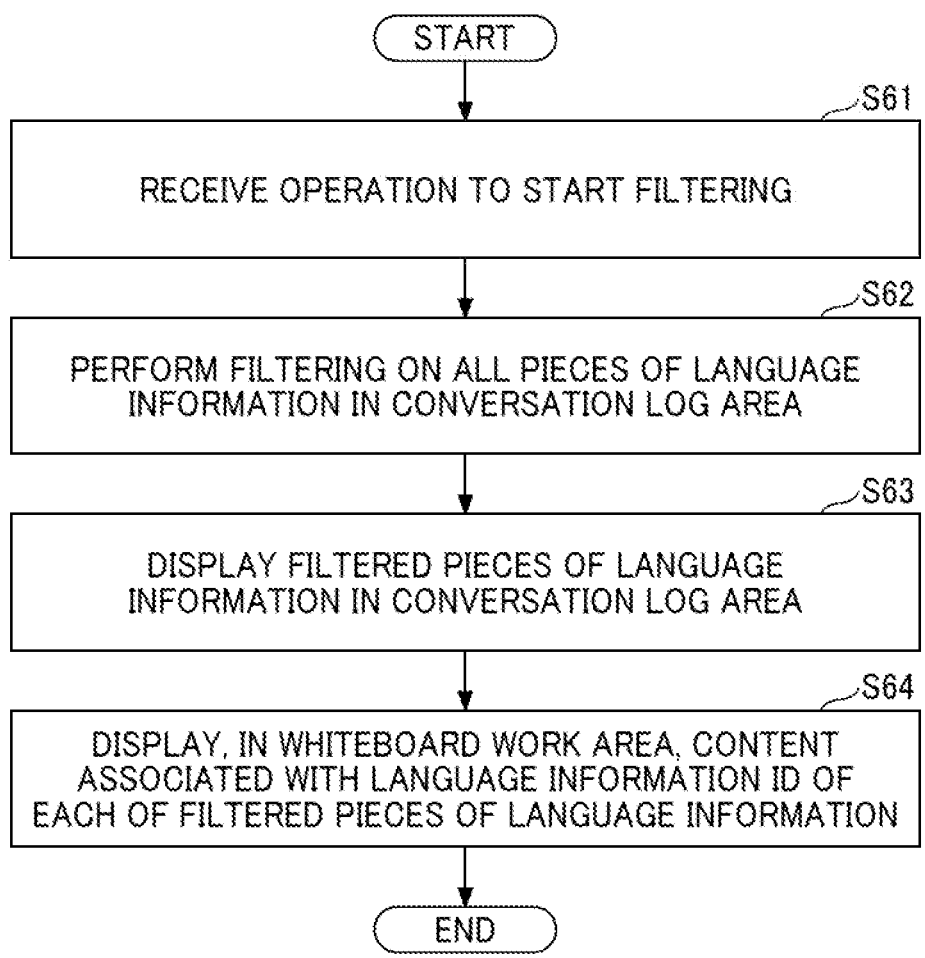
FIG. 23 is a flowchart illustrating an example of processing of filtering language information in the conversation log area, performed by the terminal apparatus.

FIG. 23 is a flowchart illustrating an example of processing of filtering language information in the conversation log area 101, performed by the terminal apparatus 1A.

First, the operation receiving unit 18 of the terminal apparatus 1A receives an operation to start filtering (S61). The operation receiving unit 18 also receives selection of a filtering method, for example, by a radio button or the like.

The filtering unit 36 performs filtering on all pieces of language information in the conversation log area 101 (S62).

The first display control unit 16 displays the filtered pieces of language information in the conversation log area 101 (S63). The pieces of language information that falls out of a display range of the conversation log area 101 can be displayed by scrolling.

The second display control unit 17 displays, in the whiteboard work area 102, the content associated with the language information ID of each of the filtered pieces of language information (S64).

This makes reviewing easy even if the number of pieces of language information in the conversation log area 101 increases as the discussion progresses.

Operation in Information Display Screen

In FIGS. 16A to 16D through FIG. 23 above, the operations performed in the information display screen displayed on the terminal apparatus 1A have been mainly described.

Similar operations are also performed in each information display screen included in the status check screen displayed by the terminal apparatus 1B.

Specifically, for example, suppose that in the information display screen 100A displayed in the display area 701 of the screen (status check screen) 700 illustrated in FIG. 7, the facilitator P performs an operation to copy language information from the conversation log area to the whiteboard work area.

In this case, the consequence of this operation may be reflected in the information display screen displayed by the terminal apparatus 1A associated with the user belonging to the group A.

In the present embodiment, this allows the facilitator P to operate the information display screen of each group without causing the status check screen to transition to the information display screen of each group.

Filtering by Information Processing System 3

The information processing system 3 may reflect the result of filtering performed by the filtering unit 36 in the status check screen for a facilitator displayed by the terminal apparatus 1B.

Figure 24:
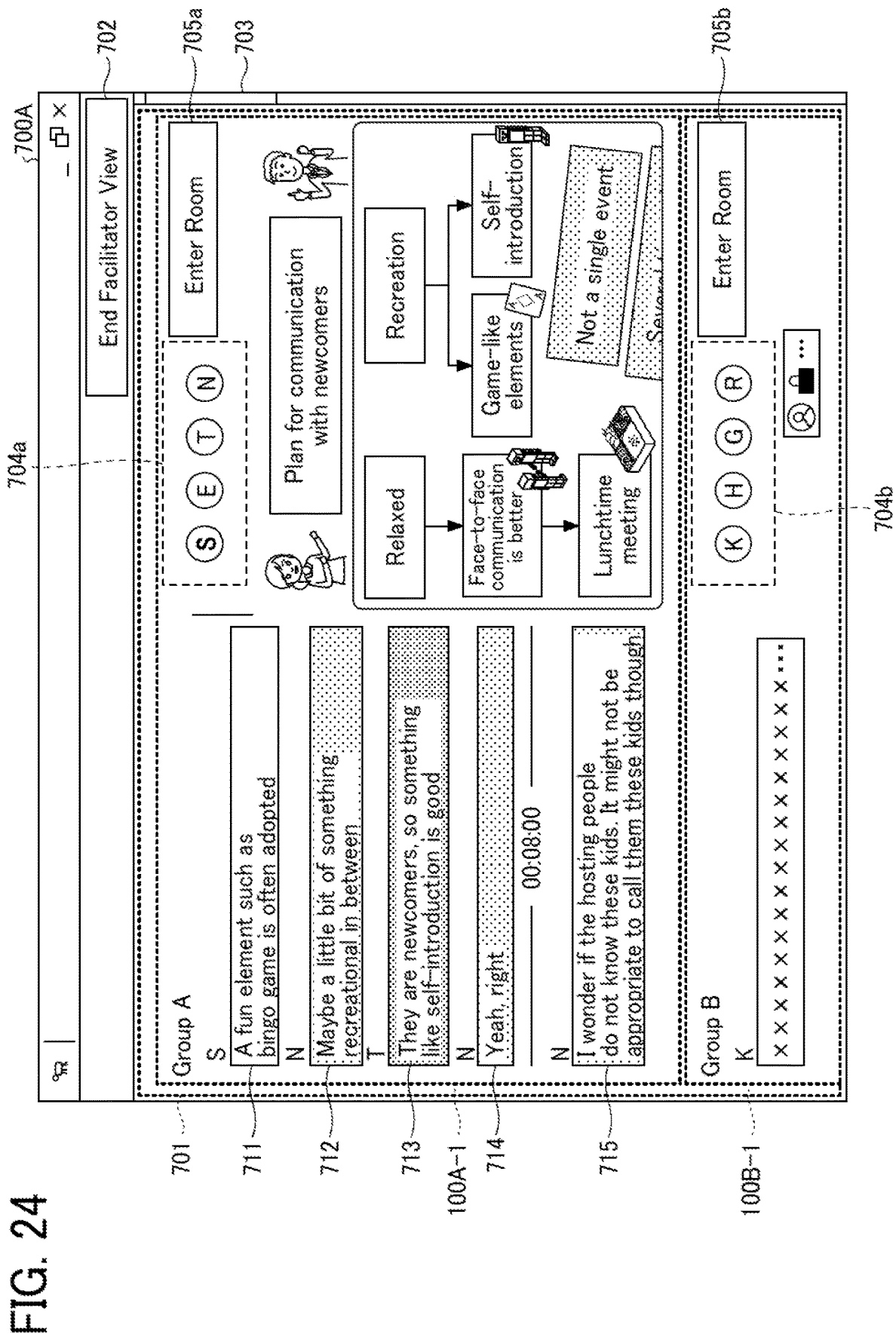
FIG. 24 is a second diagram illustrating an example of the status check screen displayed by the terminal apparatus operated by the facilitator.

FIG. 24 is a second diagram illustrating an example of the status check screen displayed by the terminal apparatus operated by the facilitator.

In a screen (status check screen) 700A illustrated in FIG. 24, a result of filtering performed based on the user ID on pieces of language information in the conversation log area 101 for each group by the filtering unit 36 is reflected.

Specifically, the filtering unit 36 refers to the conversation table for each group, and displays the status check screen such that pieces of language information corresponding to a language information ID associated with the same user ID are displayed in the same color to make the display manner of the corresponding pieces of language information different for each user ID.

The display area 701 of the screen 700A displays an information display screen 100A-1 for the group A. In the information display screen 100A-1 for the group A, pieces of language information of participants belonging to the group A are displayed in different colors for different participants.

In the information display screen 100A-1, pieces of language information 712, 714, and 715 are displayed in the same color. Thus, the language information 711, the pieces of language information 712, 714, and 715, and the language information 713 are different from one another in color. This thus indicates that the language information 711, the pieces of language information 712, 714, and 715, and the language information 713 are utterances made by different participants. The pieces of language information 712, 714, and 715 are displayed in the same color. This thus indicates that the pieces of language information 712, 714, and 715 are speeches made by the same participant.

In the present embodiment, in the list of information display screens for respective groups displayed in the status check screen, the pieces of language information are displayed in different colors for different users in each of the information display screens.

The present embodiment thus allows the facilitator P who browses the status check screen to grasp an amount of utterance made by each participant in each group in a short time.

Figure 25:
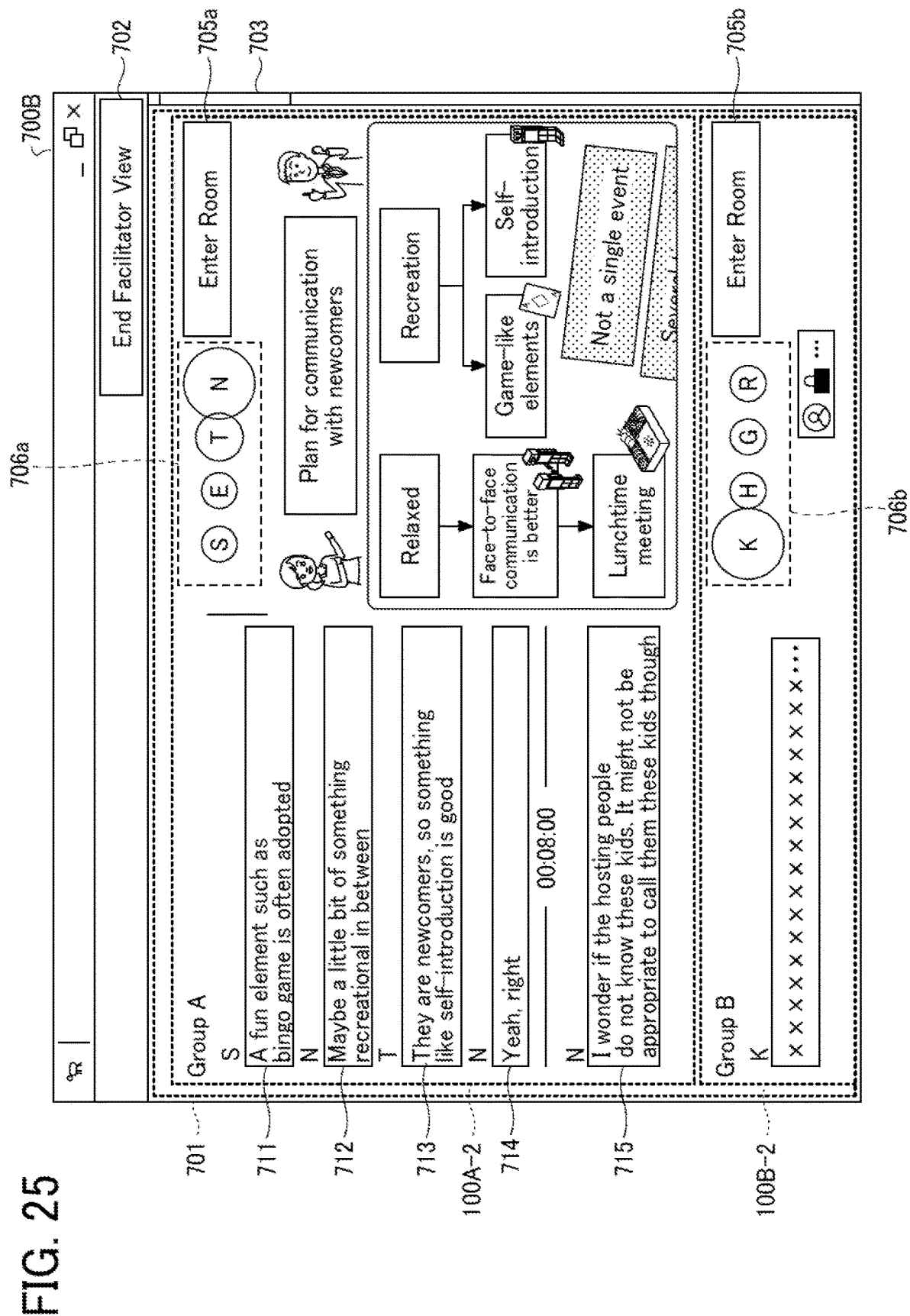
FIG. 25 is a third diagram illustrating an example of the status check screen displayed by the terminal apparatus operated by the facilitator.

FIG. 25 is a third diagram illustrating an example of the status check screen displayed by the terminal apparatus operated by the facilitator.

In a screen (status check screen) 700B illustrated in FIG. 25, a result of filtering performed based on the user ID on pieces of language information in the conversation log area 101 for each user by the filtering unit 36 and a result of counting the number of utterances for each user ID are also reflected.

The display area 701 of the screen 700B displays an information display screen 100A-2 for the group A. In the information display screen 100A-2 for the group A, pieces of language information of participants belonging to the group A are displayed in different colors for different participants.

The information display screen 100A-2 also includes a display area 706a. The display area 706a displays a list of icon images for identifying the respective participants of the group A. The display area 706a also displays the sizes of the image icons for the respective participants in sizes corresponding to the numbers of utterances made by the respective participants. Specifically, the size of the icon image for each participant displayed in the display area 706a is determined based on the number of utterances associated with the user ID of the participant.

The information display screen 100A-2 indicates that the number of utterances of a participant "N" is the largest among the participants belonging to the group A and that the participant with the next largest number of utterances is a participant "T".

In the screen 700B, the information display screen 100B-2 also includes a display area 706b. The display area 706b displays the sizes of the image icons for the respective participants belonging to the group B in sizes corresponding to the numbers of utterances made by the respective participants.

Figure 26:
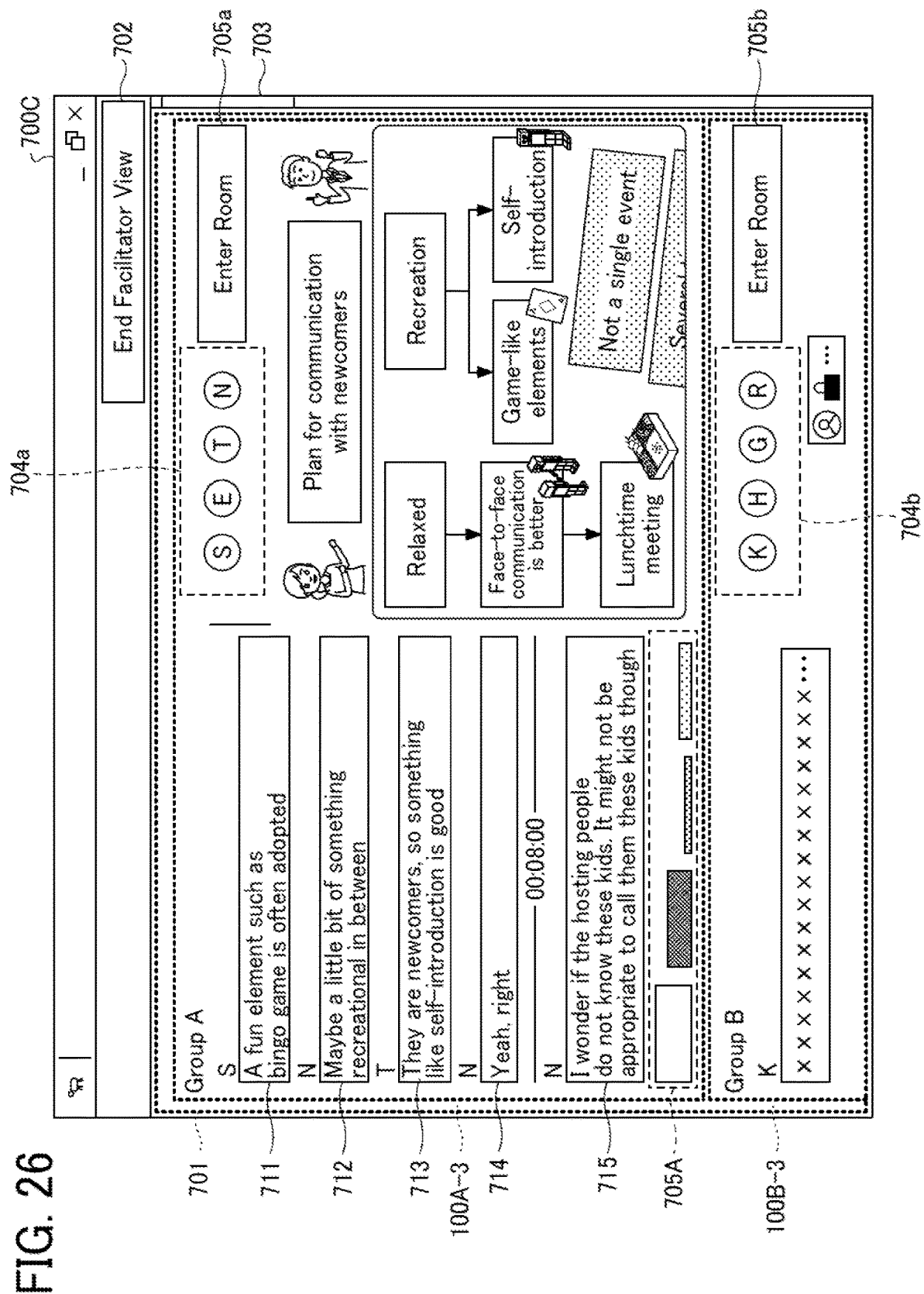
FIG. 26 is a fourth diagram illustrating an example of the status check screen displayed by the terminal apparatus operated by the facilitator.

FIG. 26 is a fourth diagram illustrating an example of the status check screen displayed by the terminal apparatus operated by the facilitator.

In a screen (status check screen) 700C illustrated in FIG. 26, counted results of the numbers of utterances obtained by the filtering unit 36 for the respective user ID are displayed as bar graph for each group.

The display area 701 of the screen 700C displays an information display screen 100A-3 for the group A. The information display screen 100A-3 for the group A also includes a display area 705A. The display area 705A displays, as a bar graph, the number of utterances made by the respective participants belonging to the group A.

As described above, in the present embodiment, the status check screen displays images indicating the numbers of utterances made by the respective participants belonging to the group. This thus allows the facilitator P to visually grasp the proportion of the numbers of utterances made by the respective participants in the group.

Figure 27:
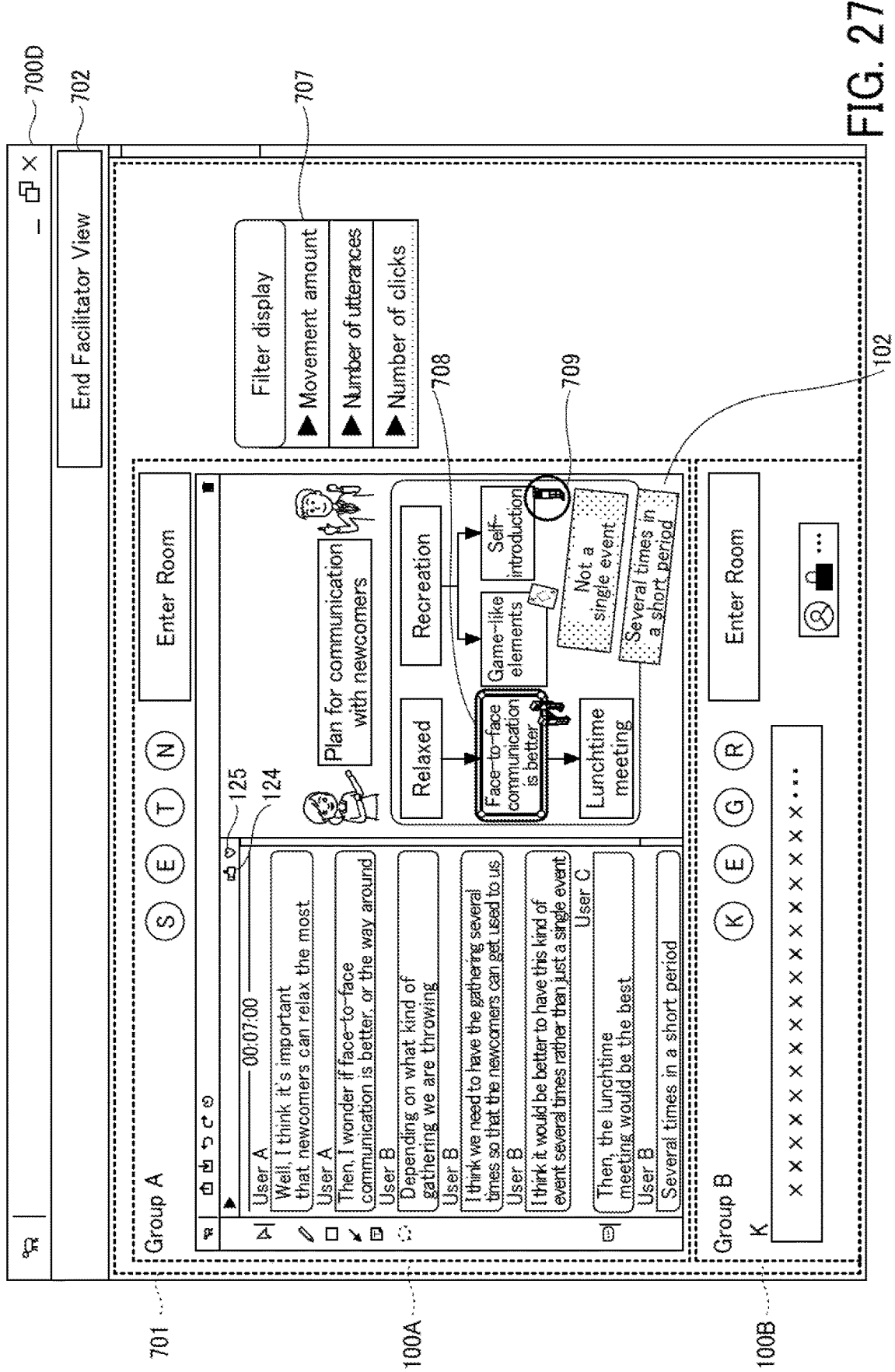
FIG. 27 is a fifth diagram illustrating an example of the status check screen displayed by the terminal apparatus operated by the facilitator.

FIG. 27 is a fifth diagram illustrating an example of the status check screen displayed by the terminal apparatus operated by the facilitator.

In a screen (status check screen) 700D illustrated in FIG. 27, a result of filtering performed by the filtering unit 36 based on a specific element on illustrations displayed in the whiteboard work area 102 of the information display screen 100A is reflected.

In this case, in response to the element used in the filtering being specified, the filtering unit 36 may perform filtering on pieces of contents identified by the content ID corresponding to the element with reference to the content table for each group.

The display area 701 of the screen 700D includes a display area 707 in addition to the information display screen 100A and the information display screen 100B. The display area 707 displays a selection field in which the element used in the filtering the illustrations displayed in the whiteboard work area 102 is to be selected.

The display area 707 displays, as a list, candidates for the element used in the filtering the illustrations. In the present embodiment, the candidates for the element include a movement amount of the illustration, the number of times of clicking on the illustration, and the number of utterances related to the illustrator, and so on.

If the movement amount of the illustration is selected in the selection field displayed in the display area 707, the filtering unit 36 may display, with emphasis, illustrations whose movement amount in the whiteboard work area 102 by the participants are greater than or equal to a threshold value or a plurality of selected illustrations in descending order of the movement distance. Note that the movement amount may be the sum of lengths over which the illustration is moved in the whiteboard work area 102.

If the number of utterances on the illustration is selected in the selection field displayed in the display area 707, the filtering unit 36 may display, with emphasis, illustrations for which the related number of utterances is greater than or equal to a threshold value or a plurality of selected illustrations in descending order of the number of utterances.

If the number of clicks on the illustration is selected in the selection field displayed in the display area 707, the filtering unit 36 may display, with emphasis, illustrations for which the number of clicks is greater than or equal to a threshold value or a plurality of selected illustrations in descending order of the number of number of clicks.

In the example of FIG. 27, the number of clicks on the illustration is selected in the selection field displayed in the display area 707, and illustrations 708 and 709 are displayed with emphasis in the descending order of the number of clicks in the whiteboard work area 102 of the information display screen 100A.

As described above, in the present embodiment, illustrations according to the selected element can be displayed with emphasis in the whiteboard work area of the information display screen for each group.

In the present embodiment, the element used in filtering is selected in the selection field displayed in the display area 707 but the configuration is not limited to this. The element used in filtering to be used may be biometric information acquired by a camera or the like of the terminal apparatus 1A, for example. Specifically, for example, the candidates for the element used in filtering may include the number of times an attention is paid to each illustration detected with a camera or the like based on a line of sight of the participants belonging to the group.

Another Example of Whiteboard Work Area 102

In the terminal apparatus 1A according to the present embodiment, the second display control unit 17 may have a function of displaying a resultant image converted from the language information (text data) in the whiteboard work area 102. Examples of a method of converting language information (text data) into image includes: acquiring a frequency of appearance for each word obtained by the morphological analysis unit 14 through decomposition; determining, in accordance with the frequency of appearance for each word, a size, a font, a color, and an arrangement of a text image representing the word; and displaying the text image (content) representing each work in the determined size, font, color, and arrangement.

Figure 28:
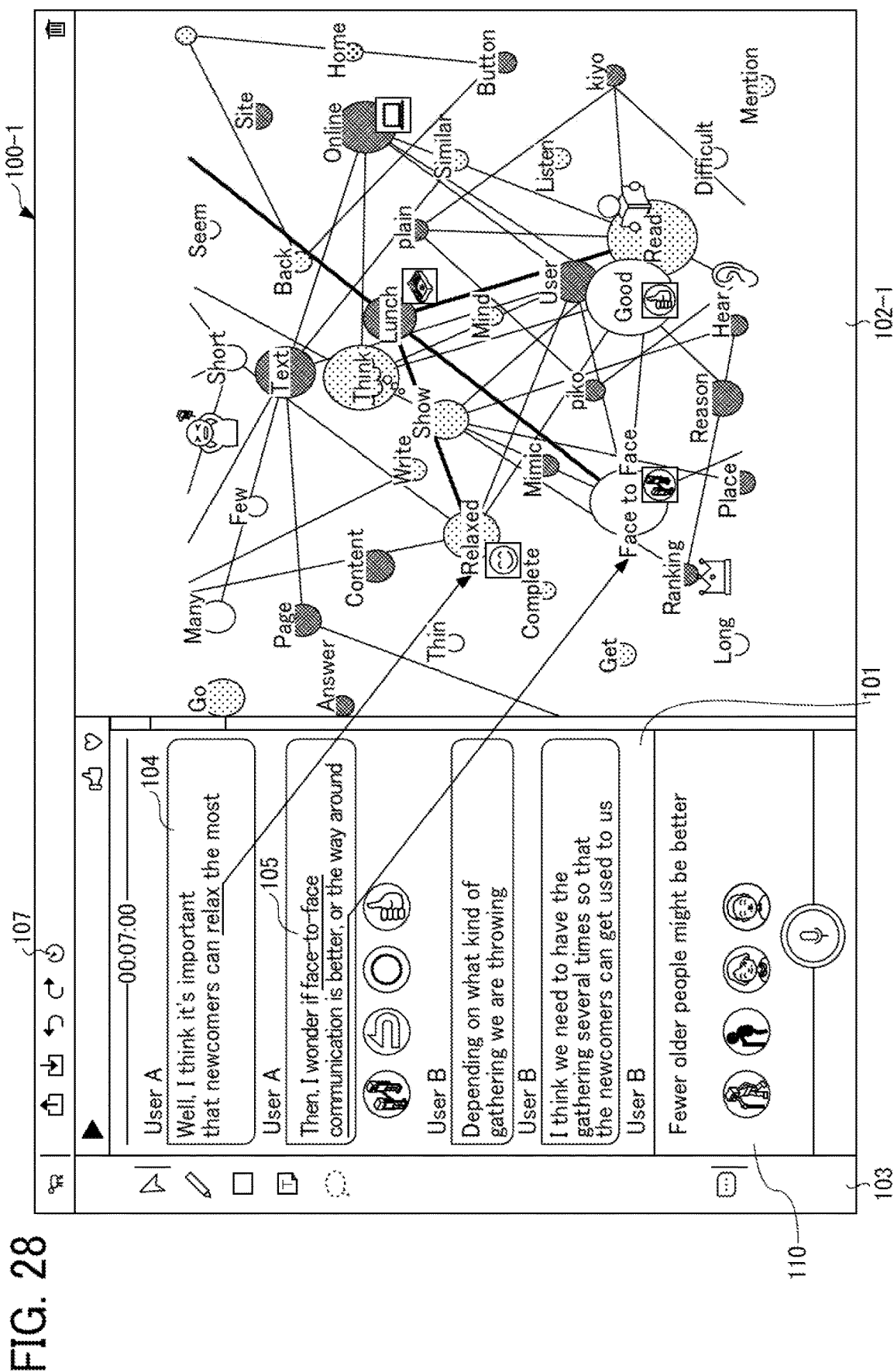
FIG. 28 is a diagram illustrating another example of the information display screen displayed by the terminal apparatus during a meeting.

FIG. 28 is a diagram illustrating another example of the information display screen displayed by the terminal apparatus during a meeting. In a whiteboard work area 102-1 in an information display screen 100-1 illustrated in FIG. 28, pieces of language information accumulated in the conversation log area 101 are displayed as images. In the example of FIG. 28, a relationship between words may be displayed by links as in a vector diagram. That is, in FIG. 28, lines linking the text images representing the words may be displayed in accordance with the relationships between the words. Displaying such text images allows the relationships between the words to be visually recognized. In the example of FIG. 28, words having the frequency of appearance less than a certain frequency may be omitted, and the pieces of language information may be converted into images.

In the present embodiment, the whiteboard work area 102-1 is displayed in this manner, so that for example, when a participant of a certain group enters a room of another group, the participant can grasp the summary of the conversation in the other group. Note that the situation where a participant of a certain group enters a room of another group indicates that a participant of a certain group performs an operation to select a group other than the group the participant belongs to in the screen 400 displayed by the terminal apparatus 1A which the participant is using and cause the terminal apparatus 1A to display the information display screen of the other group.

Another Example of Home Screen for Facilitator

Figure 29:
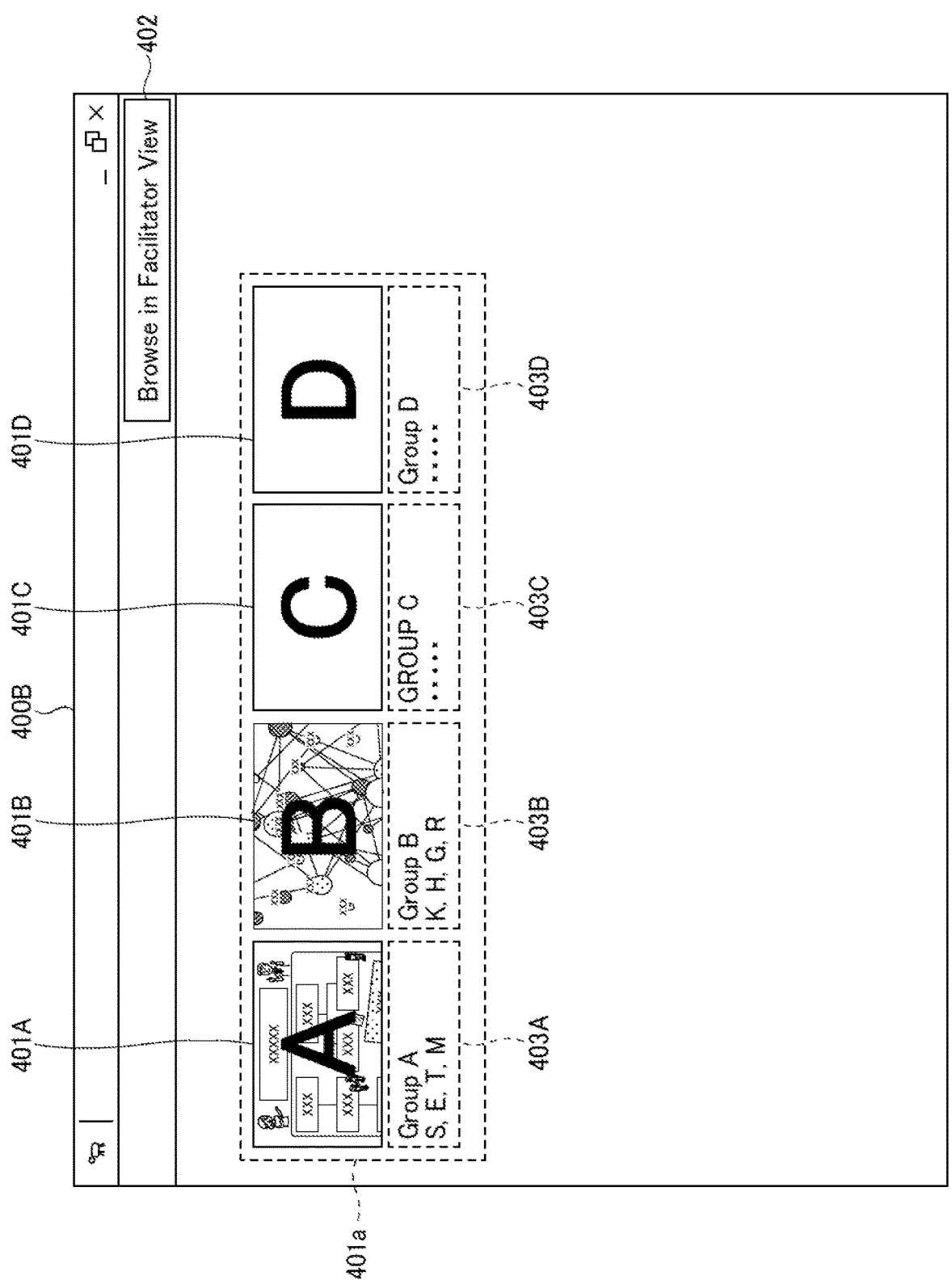
FIG. 29 is a diagram illustrating another example of the home screen displayed by the terminal apparatus operated by the facilitator.

In the present embodiment, the information display screen 100-1 illustrated in FIG. 29 may be displayed in the home screen for a facilitator.

FIG. 29 is a diagram illustrating another example of the home screen displayed by the terminal apparatus operated by the facilitator. A display area 401a of a screen 400B illustrated in FIG. 29 displays operation buttons 401A, 401B, 401C, and 401D.

In the display area 401a, the operation button 401A is associated with a display area 403A located below the operation button 401A, and the operation button 401b is associated with a display area 403B located below the operation button 401B. In the display area 401a, the operation button 401C is associated with a display area 403C located below the operation button 401C, and the operation button 401D is associated with a display area 403D located below the operation button 401D.

The operation button 401A displays therein the whiteboard work area 102 (see FIG. 5) in the information display screen 100A for the group A. The operation button 401B displays therein the whiteboard work area 102-1 (see FIG. 28) in the information display screen 100B of the group B.

As described above, in the present embodiment, the operation buttons 401A and 401B are displayed. This allows the facilitator P to grasp the summary of the conversation of each group by just viewing the screen 400B. The facilitator P can intuitively understand the conversation developed in the group in a short time in the status check screen without loading the content of the conversation log area displayed in the information display screen of each group.

In the present embodiment, the display area 403A displays the group name "Group A" corresponding to the operation button 401A and a list of icon images for identifying the participants belonging to the group A. The display area 403B displays the group name "Group B" corresponding to the operation button 401B and a list of icon images for identifying the participants belonging to the group B. The display area 403C displays the group name "Group C" corresponding to the operation button 401C and a list of icon images for identifying the participants belonging to the group C. The display area 403D displays the group name "Group D" corresponding to the operation button 401D and a list of icon images for identifying the participants belonging to the group D.

As described above, in the present embodiment, the group name and the list of icon images for identifying the participants belonging to the group are displayed. This allows the facilitator P to grasp the participants of each group in the screen 400B.

Variations

Figure 30:
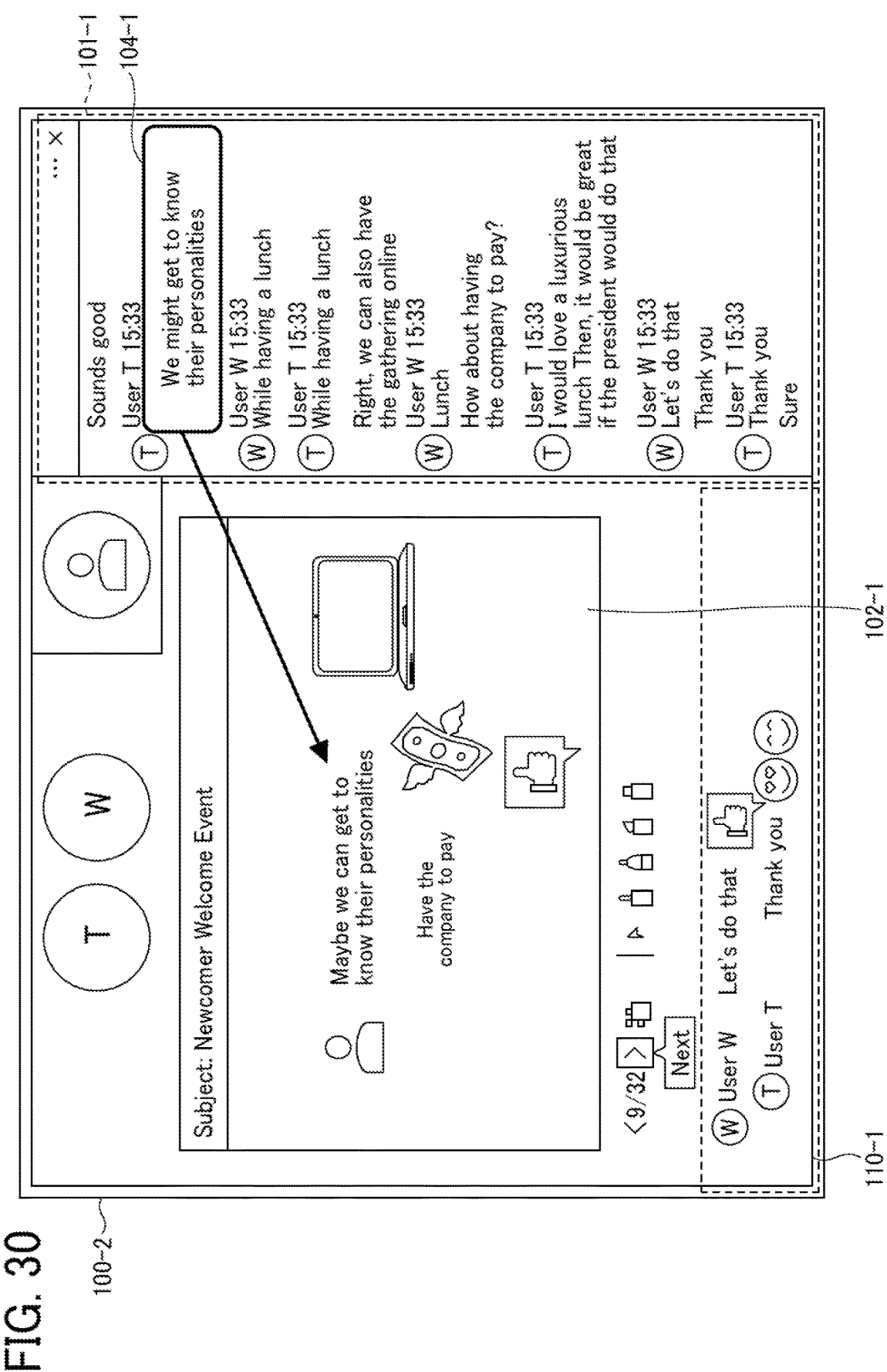
FIG. 30 is a diagram illustrating another display manner of the information display screen.

FIG. 30 is a diagram illustrating another display manner of the information display screen. The display manner of the information display screen in the present embodiment is not limited to the above-described examples presented by the drawings.

A screen 100-2 illustrated in FIG. 30 is an example of the information display screen displayed by the terminal apparatus 1 during an online meeting.

In the screen 100-2, the arrangement of a conversation log area 101-1, a speech recognition result display field 110-1, and the whiteboard work area 102-1 is different from that in each of the above-described information display screens.

In the example of FIG. 30, a character string 104-1 displayed in the conversation log area 101-1 is displayed as an image in the whiteboard work area 102-1 using the above-described method.

As described above, the function of the present embodiment can be implemented regardless of the display manner of the information display screen.

As described above, the visual communication system 5 according to the present embodiment allows the facilitator to easily grasp the state of the discussion of each group.

In the present embodiment, visual information such as illustrations can be displayed in the whiteboard work area 102 based on language information converted from speech. The users can easily visualize the communication during the meeting even if the user does not convert the contents of conversation into an illustration, draw the illustration in the whiteboard work area 102, or acquire the illustration from a network. The whiteboard work area 102 and the conversation log area 101 are displayed in the same screen. This allows the user to perform communication while learning a flow of communication in which each content in the whiteboard work area 102 is placed.

Other Application Examples

While the present disclosure has been described above using the embodiments, the embodiments do not limit the present disclosure in any way. Various variations and replacements may be made within a scope not departing from the gist of the present disclosure.

In the above-described embodiments, the information display screen 100 is displayed on the display 506. However, the information display screen 100 may be displayed by a projector, for example. In this case, the visual communication system 5 detects the coordinates of the pen tip for hand-drafting by ultrasonic waves. The pen emits an ultrasonic wave in addition to light, and the terminal apparatus 1 calculates a distance based on an arrival time of the ultrasonic wave. The terminal apparatus 1 determines the position of the pen based on the direction and the distance, and a projector draws (projects) the trajectory of the pen based on stroke data.

The number of terminal apparatuses 1 may be one. In this case, the user can use the terminal apparatus 1 as a tool for summarizing or recording his or her own idea.

In the configuration example illustrated in FIG. 8 and so on, functional units are divided into blocks in accordance with main functions of the terminal apparatus 1 and the information processing system 3, in order to facilitate understanding the operation by the terminal apparatus 1 and the information processing system 3. No limitation to the scope of the present disclosure is intended by how the processing units are divided or by the names of the processing units. The processes implemented by the terminal apparatus 1 and the information processing system 3 may be divided to a larger number of processes depending on the contents of processes. In addition, a single processing unit can be divided to include a greater number of processing units.

The apparatuses or devices described in the above-described embodiments are merely one example of plural computing environments that implement the embodiments disclosed herein. In some embodiments, the information processing system 3 includes multiple computing devices, such as a server cluster. The multiple computing devices communicate with one another through any type of communication link including, for example, a network or a shared memory, and perform the operations disclosed herein.

Further, the information processing system 3 can be configured to share the processing steps disclosed in the embodiments described above, for example, the processing steps illustrated in FIG. 15 and so on, in various combinations. For example, a process executed by a predetermined unit may be executed by a plurality of information processing apparatuses included in the information processing system 3. The information processing system 3 may be integrated into one server device or may be divided into a plurality of devices.

As described above, according to one or more embodiments, the state of communication being performed with a display screen, which is shared within each group, can be easily recognized.

Each of the functions of the above-described embodiments of the present disclosure may be implemented by one or more pieces of processing circuitry. Herein, the "processing circuit" includes a processor programmed to execute each function by software such as a processor implemented by an electronic circuit, and a device such as an application specific integrated circuit (ASIC), a digital signal processor (DSP), a field programmable gate array (FPGA), or a conventional circuit module designed to execute each function described above.

The tables described herein may be generated as a result of machine learning.

In the present disclosure, the machine learning is defined as a technology that makes a computer to acquire human-like learning ability. In addition, the machine learning refers to a technology in which a computer autonomously generates an algorithm for determination such as data identification from learning data loaded in advance and applies the generated algorithm to new data to make a prediction. The method for machine learning may be any suitable method such as one of supervised learning, unsupervised learning, semi-supervised learning, reinforcement learning, or deep learning, or a combination of two or more of these learning methods. That is, any machine learning method may be used.

Aspect 1

According to Aspect 1, a communication system includes a display control unit and a status display unit. The display control unit to displays an information display screen for each group to a first user belonging to the group. The information display screen includes an area in which pieces of language information each converted from a speech are displayed in a chronological order, and an area in which contents based on the displayed pieces of language information are displayed. The status display unit displays a status check screen to a second user who manages a plurality of groups including the group. The status check screen includes a list of a plurality of information display screens for the plurality of groups. The plurality of information display screens includes the information display screen for the group.

Aspect 2

According to Aspect 2, in the communication system of Aspect 1, the display control unit causes a first terminal apparatus associated with the first user belonging to one group among the plurality of groups to display the information display screen corresponding to the one group. The status display unit causes a second terminal apparatus associated with the second user who manages the plurality of groups to display the status check screen.

Aspect 3

According to Aspect 3, in the communication system of Aspect 1 or 2, the area in which the pieces of language information are displayed in the chronological order is a first area. The area in which the contents based on the displayed pieces of language information are displayed is a second area. The communication system further includes an operation receiving unit. The operation receiving unit receives selection of a piece of language information among the pieces of language information displayed in the first area. The display control unit displays, in the second area, a content based on the piece of language information for which the operation receiving unit has received the selection.

Aspect 4

According to Aspect 4, in the communication system of any one of Aspects 1 to 3, the area in which the pieces of language information are displayed in the chronological order is a first area. The area in which the contents based on the displayed pieces of language information are displayed is a second area. The communication system further includes a filtering unit. The filtering unit performs filtering on the pieces of language information displayed in the first area. The display control unit displays, in the first area, a piece of language information obtained from the pieces of language information by the filtering unit through the filtering, and displays, in the second area, a content based on the piece of language information obtained by the filtering unit through the filtering among the contents.

Aspect 5

According to Aspect 5, in the communication system of Aspect 4, the content displayed in the second area based on the piece of language information in the first area is associated with identification information of the piece of language information. In response to displaying, in the first area, the piece of language information obtained by the filtering unit through the filtering, the display control unit displays, in the second area, the content associated with the identification information of the piece of language information displayed in the first area.

Aspect 6

According to Aspect 6, the communication system of any one of Aspects 1 to 5 includes a filtering unit. The filtering unit performs filtering on the displayed contents. The status display unit displays, in the status check screen, a selection field in which an element used in the filtering performed by the filtering unit is to be selected, and displays a content obtained from the contents by the filtering unit through the filtering based on the element selected in the selection field, with emphasis in the information display screen included in the status check screen.

Aspect 7

According to Aspect 7, in the communication system of any one of Aspects 1 to 6, the status display unit makes display manners of the pieces of language information different for different speakers who have uttered the pieces of language information, in the area in which the pieces of language information are displayed in the chronological order in the information display screen included in the status check screen.

Aspect 8

According to Aspect 8, in the communication system of any one of Aspects 1 to 7, the status display unit displays an image indicating a number of utterances of each speaker, based on the pieces of language information displayed in the area in which the pieces of language information are displayed in the chronological order in the information display screen included in the status check screen.

Aspect 9

According to Aspect 9, in the communication system of any one of Aspects 1 to 8, the area in which the pieces of language information are displayed in the chronological order is a first area. The area in which the contents based on the displayed pieces of language information are displayed is a second area. The display control unit determines a size and an arrangement of a text image indicating each word included in each of the pieces of language information in the first area, in accordance with a frequency of appearance of the word, and displays the text image indicating the word in the second area, based on the size and the arrangement.

Aspect 10

According to Aspect 10, in the communication system of Aspect 9, the display control unit displays, in the second area, a line connecting the text image indicating the word and another text image indicating another word to each other in accordance with a relationship between the word and said another word, the said another word being included in the pieces of language information in the first area.

Aspect 11

According to Aspect 11, a program causing a terminal apparatus to function as a display control unit and a status display unit. The display control unit to displays an information display screen for each group to a first user belonging to the group. The information display screen includes an area in which pieces of language information each converted from a speech are displayed in a chronological order, and an area in which contents based on the displayed pieces of language information are displayed. The status display unit displays a status check screen to a second user who manages a plurality of groups including the group. The status check screen includes a list of a plurality of information display screens for the plurality of groups. The plurality of information display screens includes the information display screen for the group.

Aspect 12

According to Aspect 12, a terminal apparatus includes a display control unit and a status display unit. The display control unit displays an information display screen to a first user belonging to a group. The information display screen includes an area in which pieces of language information each converted from a speech are displayed in a chronological order, and an area in which contents based on the displayed pieces of language information are displayed. The status display unit displays a status check screen to a second user who manages a plurality of groups including the group. The status check screen includes a list of a plurality of information display screens for the plurality of groups. The plurality of information display screens includes the information display screen for the group.

Aspect 13

According to Aspect 13, an information processing system communicates with a terminal apparatus via a network. The terminal apparatus includes a display control unit and a status display unit. The display control unit displays an information display screen to a first user belonging to a group. The information display screen includes an area in which pieces of language information each converted from a speech are displayed in a chronological order, and an area in which contents based on the displayed pieces of language information are displayed. The status display unit displays a status check screen to a second user who manages a plurality of groups including the group. The status check screen includes a list of a plurality of information display screens for the plurality of groups. The plurality of information display screens includes the information display screen for the group. The information processing system includes a privilege management unit. The privilege management unit manages information to be displayed at the terminal apparatus in accordance with a privilege of a user of the terminal apparatus. The privilege management unit causes a terminal apparatus associated with the second user who manages the plurality of groups to display the status check screen.

According to Aspect 14, a non-transitory recording medium storing a plurality of instructions which, when executed by one or more processors, causes the processors to perform a method is provided. The method includes: displaying, to a first user belonging to a particular group of a plurality of groups, an information display screen for the particular group, the information display screen including a first area and a second area, the first area including a plurality of pieces of language information each converted from a speech in a chronological order, and the second area including contents based on the plurality of pieces of language information; and displaying, to a second user who manages the plurality of groups, a status check screen including a list of a plurality of information display screens for the plurality of groups, the plurality of information display screens including the information display screen for the particular group.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A communication system comprising circuitry configured to:
 display, to a first user belonging to a particular group of a plurality of groups, an information display screen for the particular group, the information display screen including a first area and a second area, the first area including a plurality of pieces of language information each converted from a speech in a chronological order, and the second area including contents based on the plurality of pieces of language information; and display, to a second user who manages the plurality of groups, a status check screen including a list of a plurality of information display screens for the plurality of groups, the plurality of information display screens including the information display screen for the particular group, wherein the circuitry is further configured to cause a first terminal apparatus associated with the first user belonging to the particular group to display the information display screen corresponding to the particular group, and cause a second terminal apparatus associated with the second user who manages the plurality of groups to display the status check screen in which the plurality of information display screens for the plurality of groups including the information display screen for the particular group are displayed simultaneously in a display area of the status check screen.

2. The communication system according to claim 1, wherein the circuitry is further configured to receive selection of language information from among the plurality of pieces of language information displayed in the first area, and display the contents based on the language information that is selected in the second area.

3. The communication system according to claim 1, wherein the circuitry is further configured to:

filter the plurality of pieces of language information displayed in the first area to display, in the first area, language information that is filtered; and display, in the second area, contents based on the language information that is filtered.

4. The communication system according to claim 3, wherein the contents displayed in the second area based on the plurality of pieces of language information in the first area are each associated with identification information identifying a corresponding one of the plurality of pieces of language information, and in a case where only the language information that is filtered is displayed in the first area, the circuitry displays, in the second area, only the contents each associated with the identification information identifying each piece of the language information that is filtered and displayed in the first area.

5. The communication system according to claim 1, wherein the circuitry is further configured to:

display, in the status check screen, a selection field for selecting an element for filtering;

filter the contents displayed in the second area based on the element selected in the selection field; and display, in the status check screen, the information display screen in which the contents that are filtered are displayed with emphasis.

6. The communication system according to claim 1, wherein the circuitry is configured to display, in the information display screen of the status check screen, the first area including the plurality of pieces of language information in the chronological order, such that display manners of the pieces of language information are displayed differently by different speakers who have made utterances.

7. The communication system according to claim 1, wherein the circuitry is configured to display an image indicating a number of utterances of each speaker, based on the plurality of pieces of language information displayed in the first area of the information display screen in the status check screen.

8. The communication system according to claim 1, wherein the circuitry is configured to determine, for each word included in each of the plurality of pieces of language information in the first area, a size and an arrangement of a text image indicating the word according to a frequency of appearance of the word, and display, in the second area, the text image indicating the word based on the size and the arrangement, for each word in the first area.

9. The communication system according to claim 8, wherein the circuitry is configured to display, in the second area, a line connecting the text image indicating the word and another text image indicating another word to each other according to a relationship between the word and the other word.

10. A terminal apparatus comprising circuitry configured to:

receive a plurality of information display screens for a plurality of groups, each information display screen including a first area and a second area, the first area including a plurality of pieces of language information each converted from a speech in a chronological order, and the second area including contents based on the plurality of pieces of language information; and display, to a user who manages the plurality of groups, a status check screen including a list of the plurality of information display screens for the plurality of groups, wherein the circuitry is further configured to display the status check screen in which the plurality of information display screens for the plurality of groups are displayed simultaneously in a display area of the status check screen.

11. An information processing system communicably connected with a terminal apparatus via a network, the terminal apparatus including first circuitry configured to:

receive a plurality of information display screens for a plurality of groups, each information display screen including a first area and a second area, the first area including a plurality of pieces of language information each converted from a speech in a chronological order, and the second area including contents based on the plurality of pieces of language information; and display, to a user who manages the plurality of groups, a status check screen including a list of the plurality of information display screens for the plurality of groups, the information processing system comprising second circuitry configured to:

manage information to be displayed at the terminal apparatus according to a privilege to use the terminal apparatus; and cause the terminal apparatus to display the status check screen based on a determination that the terminal apparatus is associated with the user who manages the plurality of groups, wherein the second circuitry is further configured to cause the terminal apparatus to display the status check screen in which the plurality of information display screens for the plurality of groups are displayed simultaneously in a display area of the status check screen.

* * * * *